(12) United States Patent
Testardi

(10) Patent No.: US 7,280,536 B2
(45) Date of Patent: *Oct. 9, 2007

(54) FAST PATH FOR PERFORMING DATA OPERATIONS

(75) Inventor: Richard Testardi, Boulder, CO (US)

(73) Assignee: Incipient, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/522,260

(22) Filed: Sep. 15, 2006

(65) Prior Publication Data

US 2007/0016754 A1 Jan. 18, 2007

Related U.S. Application Data

(63) Continuation of application No. 10/218,098, filed on Aug. 13, 2002, now Pat. No. 7,173,929.

(60) Provisional application No. 60/340,050, filed on Dec. 10, 2001, provisional application No. 60/368,940, filed on Mar. 29, 2002.

(51) Int. Cl.
*H04L 12/00* (2006.01)
*H04L 12/56* (2006.01)
*G06F 12/00* (2006.01)
*G06F 15/173* (2006.01)

(52) U.S. Cl. ............... 370/355; 711/150; 711/202; 711/206; 711/203; 370/380; 370/389; 370/353; 709/229; 709/223

(58) Field of Classification Search .............. None
See application file for complete search history.

(56) References Cited

U.S. PATENT DOCUMENTS

| | | | |
|---|---|---|---|
| 4,654,778 A | 3/1987 | Chiesa et al. | |
| 5,430,855 A | 7/1995 | Walsh et al. | |
| 5,497,469 A | 3/1996 | Sakata et al. | |
| 5,566,331 A | 10/1996 | Irwin, Jr. et al. | |
| 5,634,028 A | 5/1997 | Brady et al. | |

(Continued)

FOREIGN PATENT DOCUMENTS

EP 1 117 028 A2 7/2001

(Continued)

OTHER PUBLICATIONS http://www.software.hp.com/cgi-bin/swdepot_parser.cgi/cgi/displayProductInfo.pl?productNumber+Judy, Software Depot, Judy Libraries, 2 pgs.

(Continued)

*Primary Examiner*—Kevin L. Ellis
*Assistant Examiner*—Mardochee Chery
(74) *Attorney, Agent, or Firm*—Proskauer Rose LLP

(57) ABSTRACT

Described are techniques used in a computer system for handling data operations to storage devices. A switching fabric includes one or more fast paths for handling lightweight, common data operations and at least one control path for handling other data operations. A control path manages one or more fast paths. The fast path and the control path are utilized in mapping virtual to physical addresses using mapping tables. The mapping tables include an extent table of one or more entries corresponding to varying address ranges. The size of an extent may be changed dynamically in accordance with a corresponding state change of physical storage. The fast path may cache only portions of the extent table as needed in accordance with a caching technique. The fast path may cache a subset of the extent table stored within the control path. A set of primitives may be used in performing data operations. A locking mechanism is described for controlling access to data shared by the control paths.

18 Claims, 37 Drawing Sheets

U.S. PATENT DOCUMENTS

| | | |
|---|---|---|
| 5,712,976 A | 1/1998 | Falcon, Jr. et al. |
| 5,729,685 A | 3/1998 | Chatwani et al. |
| 2001/0023463 A1 | 9/2001 | Yamamoto et al. |
| 2001/0049779 A1 | 12/2001 | Shimada et al. |
| 2002/0091844 A1 | 7/2002 | Craft et al. |

FOREIGN PATENT DOCUMENTS

| | | | |
|---|---|---|---|
| GB | 2 357 171 A | 6/2001 |
| WO | WO 01/33361 A1 | 5/2001 |

OTHER PUBLICATIONS http://www.cs.tcd.ie/Fergal.Shevlin/courses/cs2/Java/trans/Tries.pdf, TRIES, pp. 1-11.

http://www.cise.ufl.edu~Sahni/dsagj/enrich/c16/tries.htm, Data Structures, Algorithms, & Applications in Java, TRIES, 1999, pp. 1-21.

Aho, et al., "Data Structures and Algorithms," pp. 163-169, Addison-Wesley, 1983.

| VDEVICE 402 | 406 TYPE |
|---|---|
| 404 LBA | 408 SIZE |

FAST PATH FOR PERFORMING DATA OPERATIONS

CROSS-REFERENCE TO RELATED APPLICATIONS

This application is a continuation of U.S. Ser. No. 10/218,098, filed on Aug. 13, 2002 now U.S. Pat. No. 7,173,929, which claims priority to U.S. Provisional Patent Application No. 60/340,050, filed on Dec. 10, 2001, and U.S. Provisional Patent Application No. 60/368,940, filed on Mar. 29, 2002, both of which are incorporated by reference herein.

BACKGROUND

1. Technical Field

This application generally relates to computer data storage, and more particularly to performing data operations in connection with computer data storage.

2. Description of Related Art

Computer systems may include different resources used by one or more host processors. Resources and host processors in a computer system may be interconnected by one or more communication connections. These resources may include, for example, data storage devices such as disk drives. These data storage systems may be coupled to one or more host processors and provide storage services to each host processor. An example data storage system may include one or more data storage devices that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks, such as data backup and mirroring operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units or logical volumes. The logical disk units may or may not correspond to the actual disk drives. Allowing multiple host systems to access the single storage device unit allows the host systems to share data stored therein.

Data operations issued from a host may utilize switching fabric comprising a combination of hardware and/or software in routing a data operation and associated communications between a host and a target data storage device. The switching fabric may include hardware, such as switching hardware, and software. Software used in routing operations between a host and a data storage device may utilize a layered approach. Calls may be made between multiple software layers in the switching fabric in connection with routing a request to a particular device. One drawback with the layering approach is the overhead in performing the calls that may result in increasing the amount of time to dispatch the data operation to the data storage device.

Thus, it may be desirous and advantageous to utilize a technique that efficiently dispatches a data operation to a data storage device. In particular, it may be advantageous to utilize this technique in connection with more commonly performed data operations.

SUMMARY OF THE INVENTION

In accordance with one aspect of the invention is a method for processing a data operation. It is determined if the data operation has at least one predetermined criteria characterizing the data operation as being a commonly performed non-complex data operation using a primitive operation. The data operation is routed to a fast path for processing if the data operation has the at least one predetermined criteria, and routing the data operation to a general control path for processing otherwise.

In accordance with another aspect of the invention is a computer program product that processes a data operation. Machine executable code determines if the data operation has at least one predetermined criteria characterizing the data operation as being a commonly performed non-complex data operation using a primitive operation. Machine executable code routes the data operation to a fast path for processing if the data operation has the at least one predetermined criteria, and routing the data operation to a general control path for processing otherwise.

In accordance with another aspect of the invention is a method executed in a computer system for performing a data operation. The data operation is received by a switching fabric. At least one processing step for performing the data operation is determines in accordance with a current state of at least one mapping table. At least one mapping primitive operation for processing the data operation is determined. The mapping primitive is used to perform virtual to physical address translation by the switching fabric using at least one mapping table. The mapping primitive operation is executed and a physical address associated with the data operation is obtained.

In accordance with yet another aspect of the invention is a computer program product that performs a data operation. Machine executable code receives, by a switching fabric, the data operation. Machine executable code determines at least one processing step for performing the data operation in accordance with a current state of at least one mapping table. Machine executable code determines at least one mapping primitive operation for processing the data operation. The mapping primitive is used to perform virtual to physical address translation by the switching fabric using at least one mapping table. Machine executable code executes the mapping primitive operation and obtains a physical address associated with the data operation.

In accordance with another aspect of the invention is a method executed in a computer system for performing virtual to physical address mapping of a virtual address. A volume descriptor associated with said virtual address is determined. The volume descriptor includes a variable size extent table. The variable size extent table includes a plurality of portions. Each of the portions is associated with a varying range of virtual addresses. A first extent included in the variable size extent table corresponding to the virtual address is determined. A corresponding physical address is determined for the virtual address using mapping table information associated with the first extent.

In accordance with another aspect of the invention is a computer program product that performs virtual to physical address mapping of a virtual address. Machine executable code determines a volume descriptor associated with the virtual address. The volume descriptor includes a variable size extent table. The variable size extent table includes a plurality of portions. Each of the portions is associated with a varying range of virtual addresses. Machine executable code determines a first extent included in the variable size extent table corresponding to the virtual address. Machine executable code determines a corresponding physical address for the virtual address using mapping table information associated with the first extent.

In accordance with another aspect of the invention is a method executed in a computer system for performing virtual to physical address translation. Mapping tables used in performing the address translation are determined. The mapping tables include an extent table corresponding to a logical block address range and a storage redirect table includes physical storage location information associated with the logical block address range. The extent table is divided into a plurality of portions. A fast path is used in performing the virtual address translation if an associated data operation meets predetermined criteria independent of at least one of a general control path and another fast path. Otherwise a general control path is used. A portion of the extent table corresponding to a current data operation is loaded into a memory local to the fast path. The portion of the extent table is included in a memory managed using a cache management technique.

In accordance with one aspect of the invention is a computer program product that performs virtual to physical address translation. Machine executable code determines mapping tables used in performing said address translation. The mapping tables include an extent table corresponding to a logical block address range and a storage redirect table includes physical storage location information associated with the logical block address range. The extent table is divided into a plurality of portions. Machine executable code uses a fast path in performing the virtual address translation if an associated data operation meets predetermined criteria independent of at least one of a general control path and another fast path, and otherwise uses a general control path. Machine executable code loads into a memory local to the fast path a portion of said extent table corresponding to a current data operation. The portion of the extent table is included in a memory managed using a cache management technique.

In accordance with one aspect of the invention is a method executed in a computer system for controlling access to shared data. A message is sent from a requester to at least one other user of the shared data accessing the shared data for read access. The requester receives approval messages from each of the at least one other user. The requester obtains a lock on a first copy of the shared data included in a global storage location upon receiving the approval messages wherein the requester releases the lock when the lock is requested by another. The requester, in response to obtaining the lock, modifies the first copy of shared data.

In accordance with yet another aspect of the invention is a computer program product that controls access to shared data. Machine executable code sends a message from a requester to at least one other user of the shared data accessing the shared data for read access. Machine executable code receives approval messages for the requester from each of the at least one other user. Machine executable code obtains a lock for the requester on a first copy of the shared data included in a global storage location upon receiving the approval messages wherein the requester releases the lock when the lock is requested by another. Machine executable code, in response to obtaining the lock, causes the requester to modify the first copy of shared data.

BRIEF DESCRIPTION OF THE DRAWINGS:

Features and advantages of the present invention will become more apparent from the following detailed description of exemplary embodiments thereof taken in conjunction with the accompanying drawings in which:

FIG. 15 is an example of information that may be included in a host I/O request;

Figure 1:
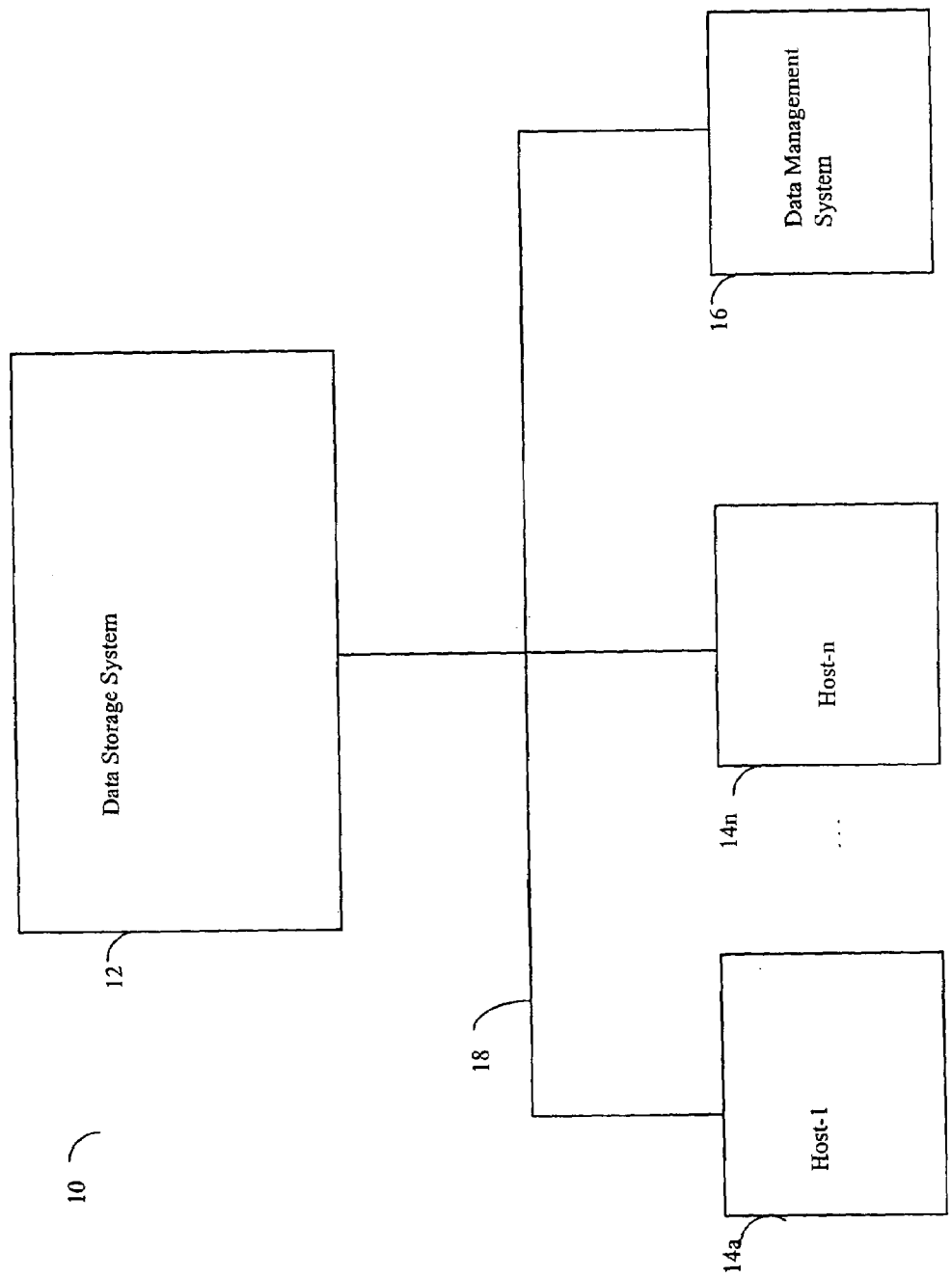
FIG. 1 is an example of an embodiment of a computer system according to the present invention.

DETAILED DESCRIPTION OF EMBODIMENT(S):

Referring now to FIG. 1, shown is an example of an embodiment of a computer system according to the present invention. The computer system 10 includes a data storage system 12 connected to host systems 14a-14n and data management system 16 through communication medium 18. In this embodiment of the computer system 10, the data management system 16 and the N hosts 14a-14n may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a-14n, and the data manager system may access and communicate with the data storage system 12, and may also communicate with others included in the computer system 10. The components comprising the computer system 10 may comprise, for example, a storage area network (SAN) or other configuration.

Each of the host systems 14a-14n, the data management system 16, and the data storage system 12 included in the computer system 10 may be connected to the communication medium 18 by any one of a variety of connections as may be provided and supported in accordance with the type of communication medium 18. The processors included in the host computer systems 14a-14n and the data management system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n and the data management system 16, as well as those components that may be included in the data storage system 12 are described herein in more detail, and may vary with each particular embodiment. Each of the host computers 14a-14n, as well as the data management system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI(Small Computer System Interface), ESCON, Fibre Channel, or GIGE (Gigabit Ethernet), and the like. Some or all of the connections by which the hosts, data management system 16 and data storage system 12 may be connected to the communication medium 18 may pass through other communication devices, such as a Fibre Channel switch, or other switching equipment that may exist such as a phone line, a repeater, a multiplexer or even a satellite.

Each of the host computer systems as well as the data management system may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a backup, mirroring or other administrative operation and may do so while performing data requests to the data storage system 12.

The data management system 12 may be responsible for performing administrative operations in connection with the other components and switching fabric included in the computer system 10. For example, the data management system 12 may be responsible for performing administrative operations in connection with system configuration changes as well as performing periodic administrative operations, such as automated backups, performance tuning, reporting, and the like. Functionality included in the data management system may also include abstracting components accessed within the computer system.

Figure 2:
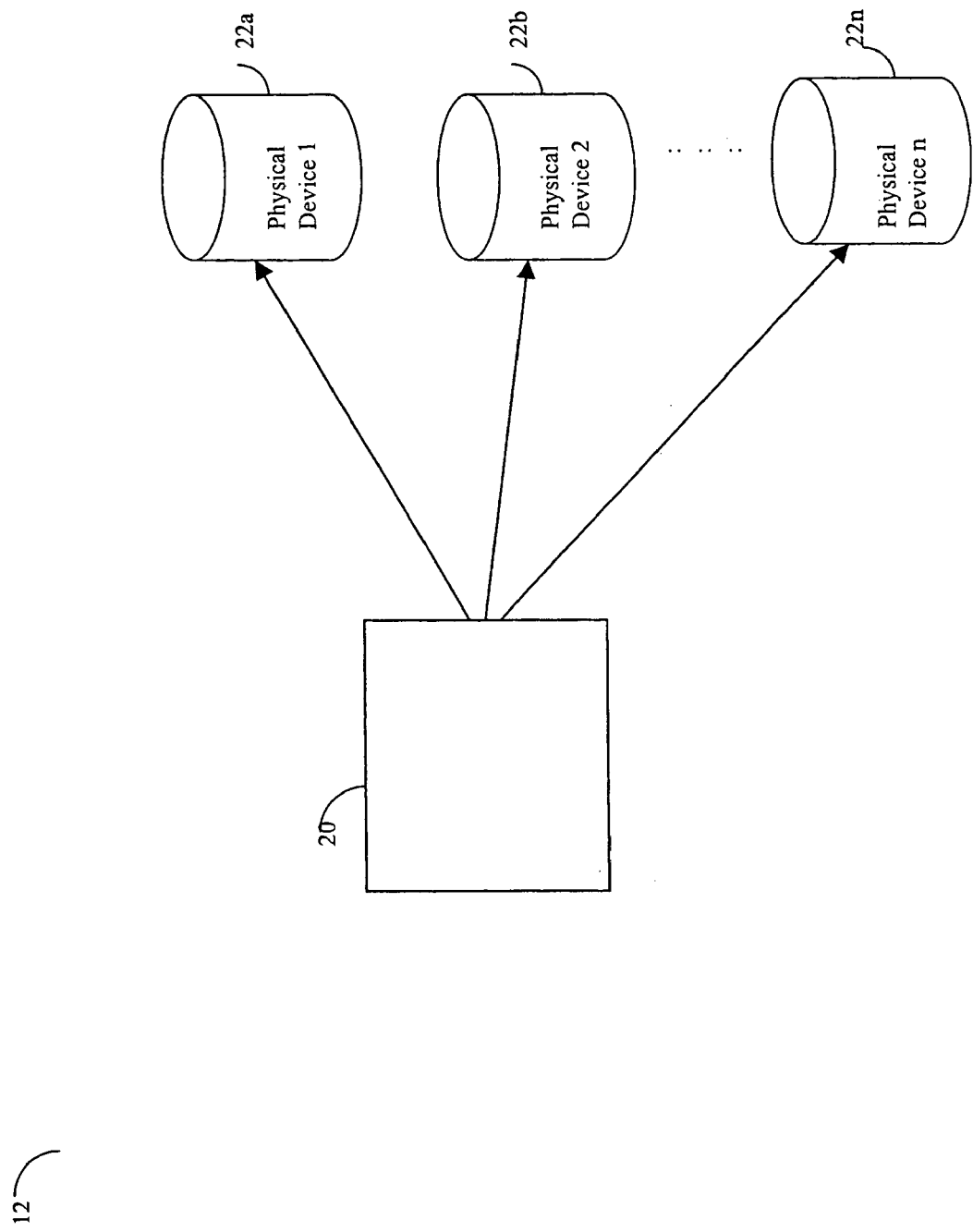
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are switching fabric 20 and physical devices 22a-22n. In this particular example, each of the physical devices may be inter-connected (not shown) as well as be connected to the switching fabric 20. The switching fabric may be characterized as a hardware and/or software that perform switching of voice, data, video and the like from one place to another. In connection with FIG. 2, the switching fabric 20 performs switching of data between components in the computer system 10, such as between a host and a physical device. The components included in the switching fabric 20 may vary with each particular embodiment and device in accordance with the different protocols used in a particular embodiment. Additionally, the type of connections and components used may vary with certain system parameters and requirements, such as those related to bandwidth and throughput required in accordance with a rate of I/O requests as may be issued by the host computer systems, for example, to the data storage system 12.

Host systems provide data and access control information through channels to the data storage system, and the data storage system may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein.

Figure 3:
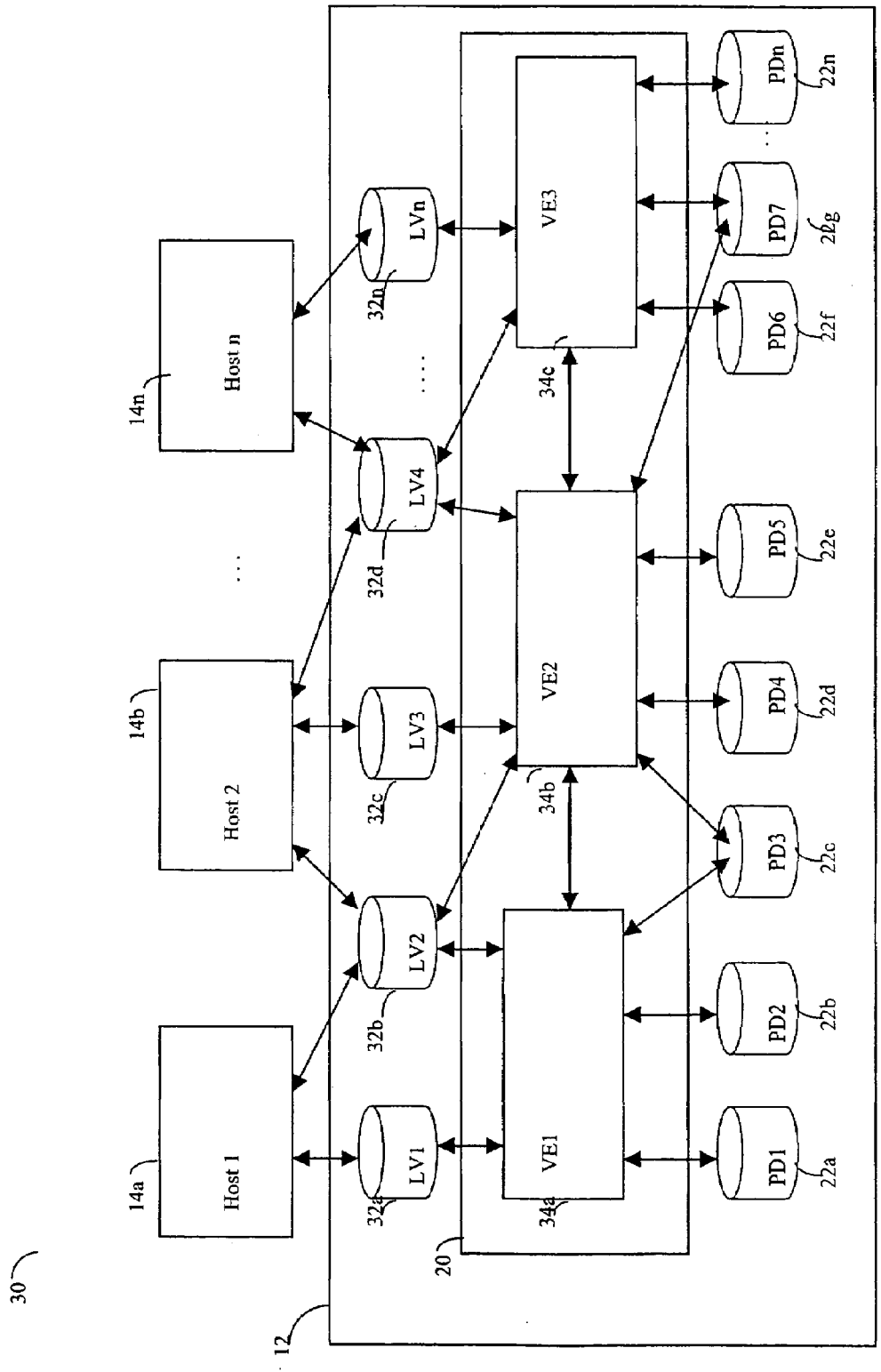
FIG. 3 is an example of a logical view of the devices as seen from the host computer systems of FIG. 1.

Referring now to FIG. 3, shown is an example of a logical view of devices in one embodiment as may be viewed from the hosts included in the computer system 10 of FIG. 1. Hosts 14a-14n are included in the illustration 30 as described previously in connection with the system 10 of FIG. 1. The illustration 30 includes a portion of the components of the computer system 10 previously described in connection with FIG. 1. In particular, the illustration 30 includes the hosts 14a-14n and storage related components included in the data storage system 12. Also shown are logical components or devices LV 32a-32n which are not actually physical components included in the computer system but rather represents a logical view of a portion of physical devices PD1 through PDn. The same LVs may be used and accessed by one or more of the host's computer systems 14a-14n. Each of the LVs maps to a portion of a physical device or a plurality of physical devices also included in the data storage system 12.

In this particular example, the data storage system 12 may also include switching fabric 20 which may include one or more switches and other associated hardware and software in connection with facilitating data transmissions between each of the host computer systems and the physical devices. As will be described herein, part of the functionality of the switching fabric is to map a particular logical address of an LV to its actual physical location on one or more of the physical devices 22a-22n.

It should be noted that binding a particular physical device or portions thereof to an LV may be performed in connection with data management system functionality.

Also included within the switching fabric 20 are a number of virtualization engines (VEs) which collectively may be referred to as a distributed virtualization engine (DVE). The DVE collectively exposes LVs to a set of hosts and may be used in accessing a set of physical devices. The VEs may utilize a coherency channel, for example, using a storage area network (SAN) and/or a local area network (LAN), to present a single system image to the hosts as well as to the administrator (data management system). The VEs may have a partially shared back end of physical volumes or devices. Multiple VEs may be physically located within the same hardware box or unit or be physically located in separate hardware units. If multiple VEs are located within the same hardware box, these VEs may have redundant power supplies, cords, and cabling to the hosts. Software associated with each VE in an embodiment may execute independently and perhaps redundantly providing for a single system image to each of the hosts in the computer system.

The DVE may be characterized as being responsible for functionality associated with data virtualization, such as in connection with virtualizing storage data accesses across the computer system 10. The DVE may also be characterized as supporting a number of higher level functions and operations, such as, for example, replication, snapshots, on-line migration, and the like.

It should be noted that any one or more of the DVEs may be implemented in portions anywhere between the host application and the actual physical storage device or devices. For example, a portion of the functionality of a DVE may be included in the host side filter driver, in an appliance between the host and the storage system, in an existing switch, or within a data storage device itself.

A DVE, or portion thereof, may be implemented anywhere between the host application and associated physical storage devices as, for example, described elsewhere herein. A preferred embodiment may include functionality described herein associated with a DVE within the SAN switching fabric itself, such as within a switch. The switch implementation platform may take advantage of the DVE's distributed coherency and scalability, for example, between multiple switches within the SAN fabric as well as between multiple ports within a given switch. As physical switches may be added to a SAN fabric, the DVE preserves a single distributed coherent view of storage to the hosts. It should be noted that the DVE's overall bandwidth capabilities are scaled in accordance with the number of port switches through the use of per port fast path processing power.

Figure 4A:
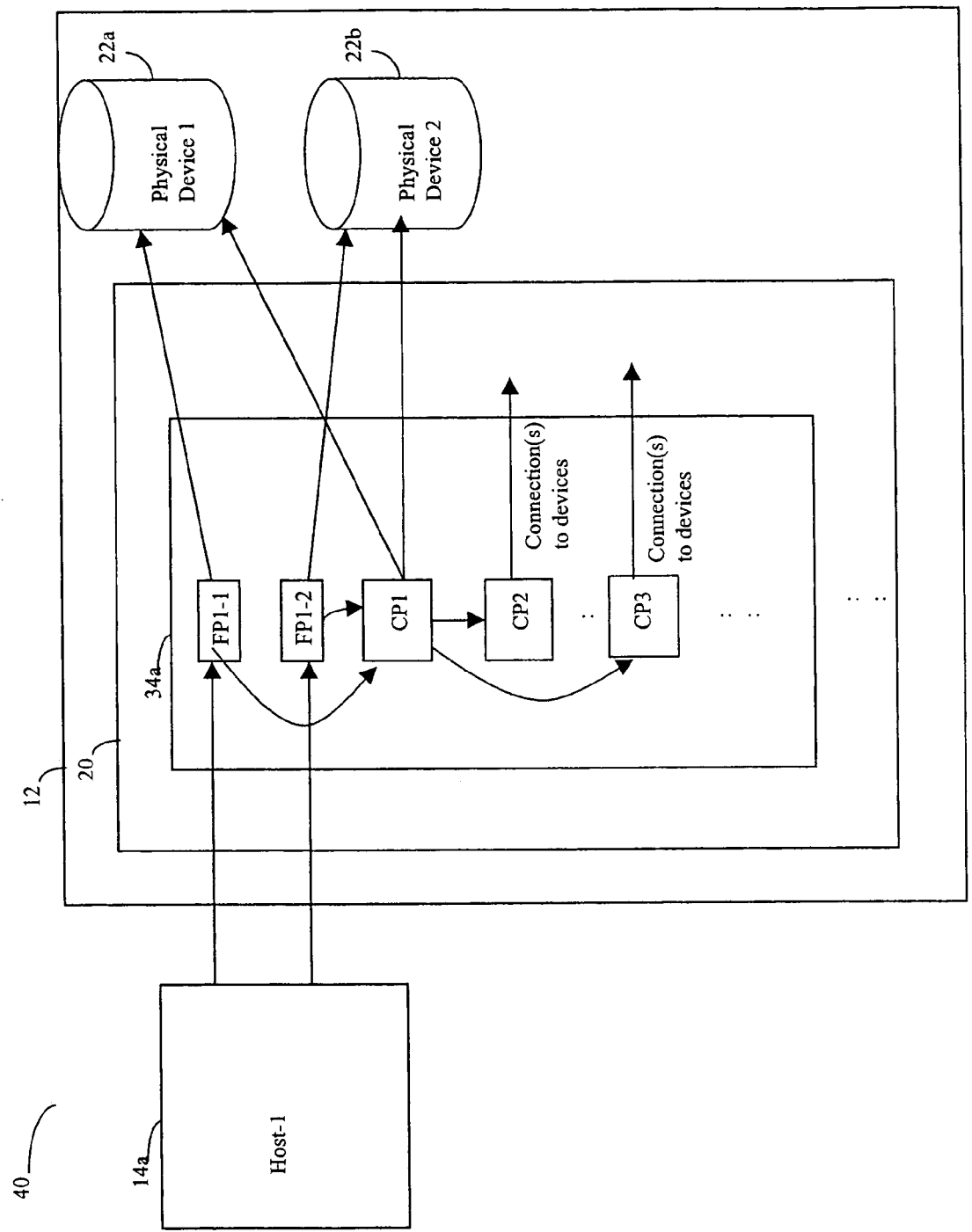
FIG. 4A is an example of how a host may communicate with a physical device.

Referring now to FIG. 4A, shown is an example 40 of how a host, such as 14a, may communicate with a physical device such as 22a or 22b. It should be noted that the components included in illustration 40 represent an example of how a particular host may issue a data operation in connection with a particular physical device. An actual embodiment may include more computer systems, for example, as described previously in connection with the computer system 10 of FIG. 1. The number of components included in the illustration 40 have been reduced in order to facilitate the explanation of how the switching fabric may operate in connection with data transfers between a host and a physical device.

In the example 40, the host 14a may perform a data operation in connection with one or more physical devices, such as physical device 22a and 22b. Included within switching fabric 20 of the data storage system 12 is DVE 34a. The DVE 34a in this example includes fast path FP1-1 and FP1-2 as well as one or more control paths (CPs), such as CP1 through CP3. On either side of a particular fast path (FP) such as FP1-1, a switch may connect the FP1-1 hardware and/or software implementation to physical device 12a as well as facilitate communications with the host 14a. It also should be noted that although the arrows show communications as flowing from the host to the physical devices, the reverse communication path of forwarding data from the physical device through one of the FPs or CPs to the host also exists in the system.

In one embodiment, the communication path from the host may be only through the FP. In other words, the CP may communicate to the host through the FPs such that only an FP serves as an "exposed" communication endpoint for host communications.

It should be noted that an embodiment of a DVE may include one or more CPs. A DVE may include a plurality of CPs in which exactly one may be active at a time with the other available, for example, for failover purposes. The number of CPs in an embodiment of a DVE may be less that the number of FPs.

As shown in 34a, a DVE may include one or more CPs and one or more FPs. The FP may optionally be implemented in hardware, software, or some combination thereof. The CP and FP may be implemented each on different CPUs. An embodiment may include a portion of hardware in an implementation of the FP, for example, in connection with functionality associated with the FP and its communication port(s).

A path designated using an FP, for example, when connecting a host to a physical device, may be used when performing I/O operations, such as read and write operations that may be applied to LVs. Generally, a large portion of the data operations may be handled by the FP. In one embodiment, the FPs handle a bulk of the I/O bandwidth from the hosts with no CP intervention meaning that the overall bandwidth capabilities scale with the number of FPs in the DVE. The particular I/O operations that may be handled by the FP is described in more detail in paragraphs that follow. The FP is a streamlined implementation of hardware and/or software that may be used in connection with optimizing and performing a portion of I/O operations. In this embodiment described herein, only successful I/O operations may be handled using the FPs. Error cases and associated recoveries may be performed in connection with one or more CPs since this type of error recovery may involve for example changes to metadata or reconfiguring of data management states which are operations not delegated to the FPs.

In this embodiment, I/O operations from a host are initially directed to an FP. If an FP is able to dispatch the I/O operation further to a particular physical device using a mapping table which is populated by the CP in this example, the FP does such dispatching without further intervention by the CP. Otherwise, the I/O operation may be forwarded to the CP for processing operations. Similarly, completions of an I/O operation directed from a physical device to a host are directed to the FP in this embodiment. If the completion is successful, the FP may return any I/O operation data and associated status to the host. This may be done without any CP intervention. Otherwise, for example, in the event of an error in performing the I/O operation, completion may be forwarded to the CP for processing.

As will be described herein, only the CP, not the FP, may be used to modify a metadata state. Metadata, as will be described herein in connection with performing I/O operations, may be that information such as included in mapping tables. Metadata may be characterized as data about or describing data. The CP may handle all error processing, all coherency and synchronization operations in connection with other CPs and all intervolume coherency, for example, as may be included in complex systems such as those using mirroring, striping, snapshots, on-line migrations, and the like. All errors may be returned to the host or forwarded through the CP. An FP may also notify a CP about I/Os, for example, in connection with gathering statistics or error recovery purposes.

As shown in connection with the illustration of FIG. 4A, the DVE 34a includes an FP or a fast path connection between a host and each of the physical devices that may be accessed by the host. As shown in FIG. 4A also, each of the FPs is connected to an associated CP and each of the CPs also have connections to each other.

It should be noted that the assignment or association of hosts to FPs may vary in accordance with platform configuration. In particular, which FPs are used by which hosts may be in accordance with where FPs are located within the switching fabric and how the hosts connect to the fabric. In the embodiment described in connection with FIG. 4A, the FP is included in the fabric switch and there is preferably one FP per switch port and hosts are physically connected to one or more switch ports.

Figure 4B:
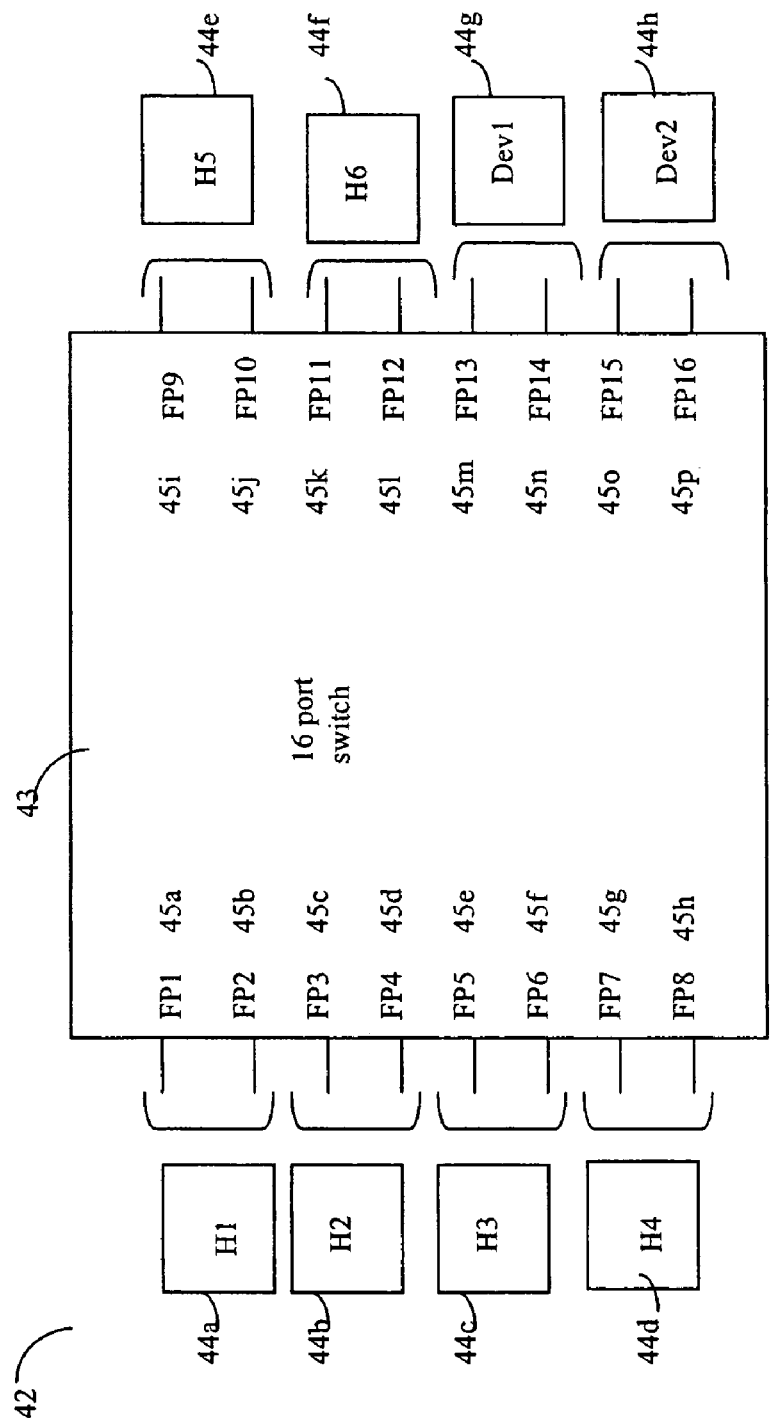
FIG. 4B is an example of another embodiment of how a plurality of hosts may communicate with physical devices.

Referring now to FIG. 4B, shown is an example of another embodiment of how a plurality of hosts may communicate with physical devices. The embodiment 42 includes a 16 port switch with 12 ports, 45a-45l, connected in pairs to 6 hosts, H1-H6, with the remaining 4 ports, 45m-45p, connected in pairs to two data storage devices Dev1 and Dev2. In this instance, the FPs may be logically and possibly physically, located on each of the host ports and each host is communicating to two FPs.

Figure 4C:
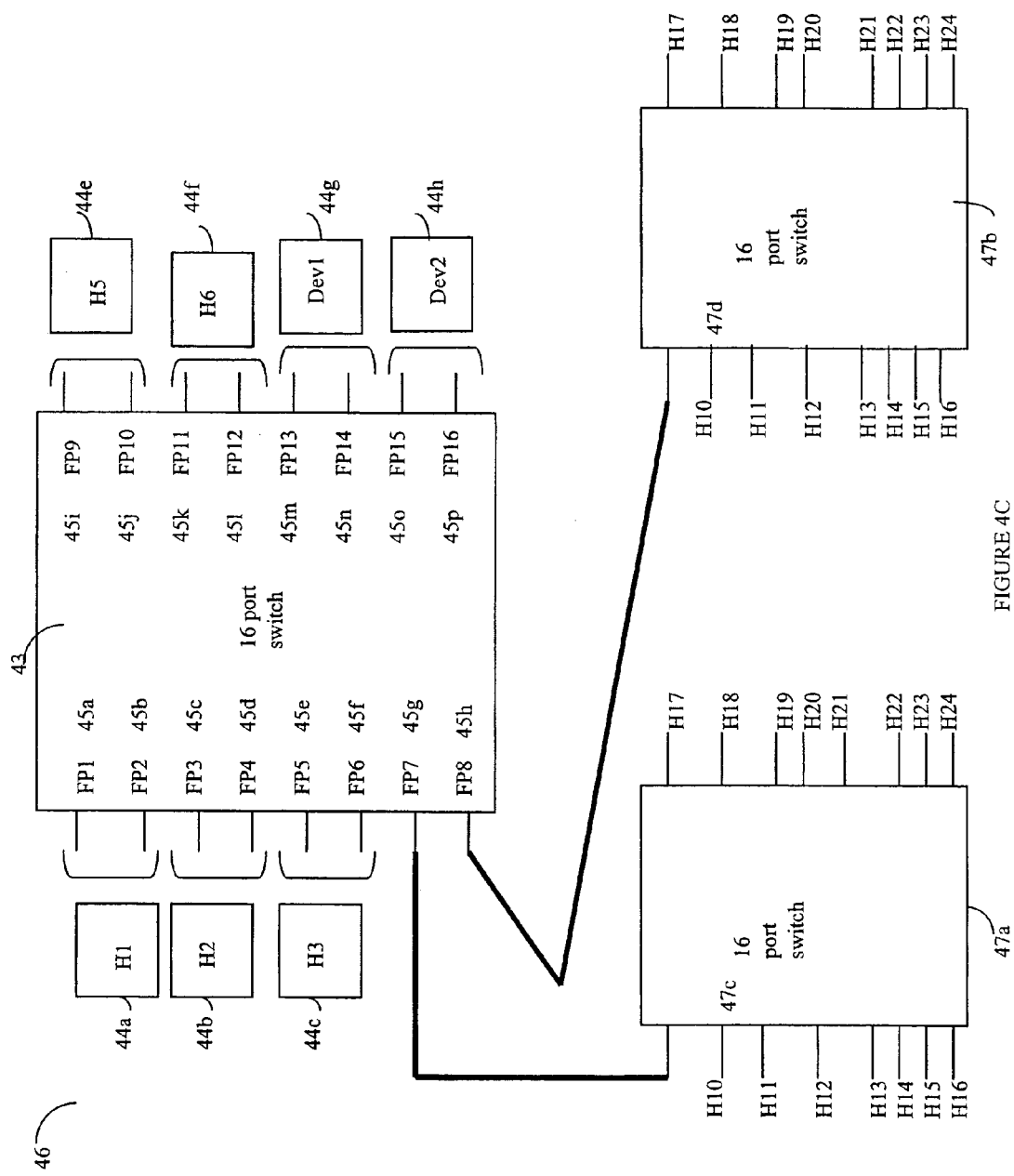
FIG. 4C is an example of yet another embodiment of how a plurality of hosts may communicate with physical devices.

Referring now to FIG. 4C, shown is another embodiment of how a plurality of hosts may communicate with physical devices. FIG. 4C shows a configuration 46 which is a modification of the configuration 42 from FIG. 4B but with one of the hosts (H4) removed and two switches (47a and 47b) in place of the host, each of the two switches having 16 ports. Each of the two switches 47a and 47b plugs into locations 45g and 45h includes in the original switch 43. On the two newly added switches 47a and 47b, 15 hosts (H10-H24) may be connected up to the fabric with each of the 15 hosts (H10-H24) being connected to a first port in the first switch 47a and a second port in the second switch 47b, such as host H10 is connected to 47c and 47d. Each of the hosts H10-H24 now shares FP7 and FP8.

In a different configuration, FPs may also be included in a "shared appliance" within the switching fabric resulting a configuration similar to that of FIG. 4C in which hosts share access to the same FPs.

Figure 5:
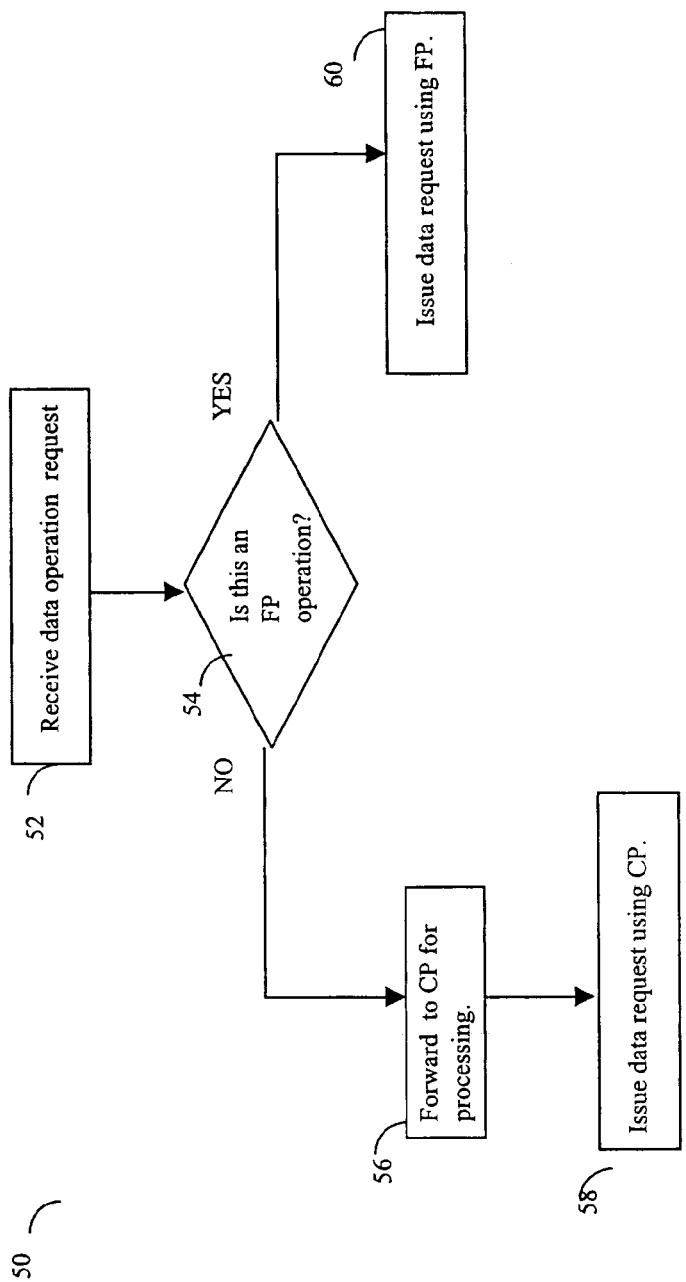
FIG. 5 is a flowchart of steps of an embodiment for processing a data operation within the computer system of FIG. 1.

Referring now to FIG. 5, shown is a flowchart 50 of steps of one embodiment for processing a data operation within a computer system 10 of FIG. 1. It should be noted that this processing described in connection with flowchart 50 generalizes the processing just described in connection with forwarding an I/O operation between a FP and/or a CP from a host to a particular physical storage device. A data operation request is received at step 52 and is forwarded from a host to the data storage system. At step 54, a determination is made as to whether this is an FP appropriate operation. It should be noted that the details of step 54 are described in more detail in following paragraphs. If a determination at step 54 is made that this is an FP appropriate operation, control proceeds to step 60 where the data request is dispatched and issued to the appropriate physical device using the FP. Otherwise, control proceeds to step 56 where the I/O or data operation is forwarded to the CP for processing. Accordingly, at step 58, the CP issues the data request to the appropriate physical device. It should be noted that part of the processing included in the steps of flowchart 50 is a mapping from the logical address to the physical address as well as other processing operations.

Figure 6:
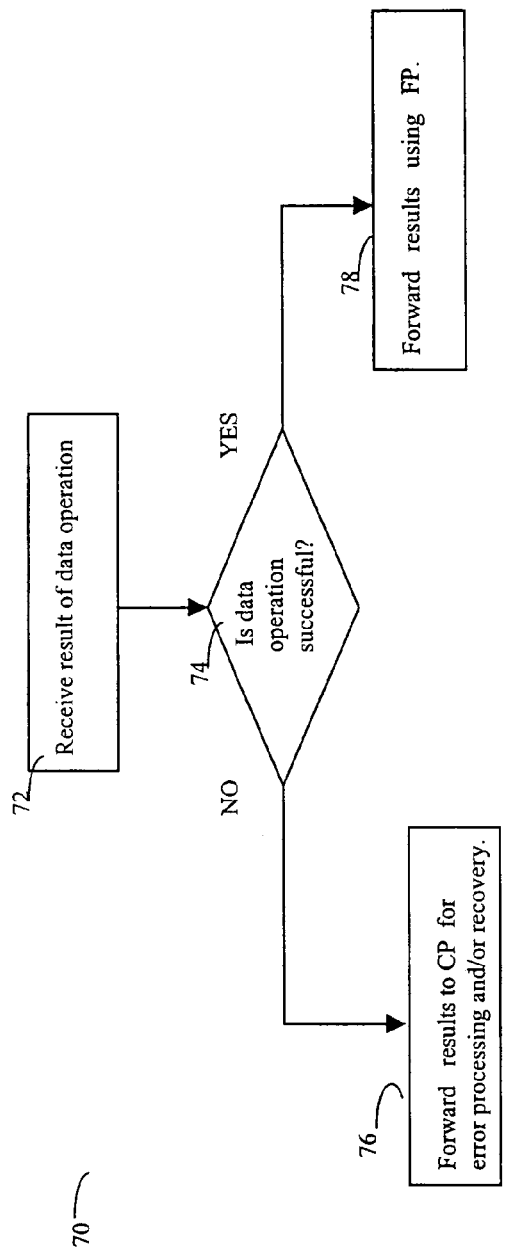
FIG. 6 is a flowchart of steps of an embodiment for processing results of a data operation.

Referring now to FIG. 6, shown is a flowchart 70 of steps of a method performed in connection with processing the results of a data operation. The processing in connection with flowchart 70 generally describes those steps that may be performed in an embodiment when forwarding results from a physical device back to a host through a DVE such as 34a. At step 72, the results of the data operation are determined and received at the DVE. In particular, it is determined at step 74 as to whether the data operation has been successful. If the data operation has been successful, control proceeds to step 78 where the results are forwarded back to the host using the FP connection. Otherwise, control proceeds to step 76 to forward results to the CP for error processing and/or recovery.

Figure 7:
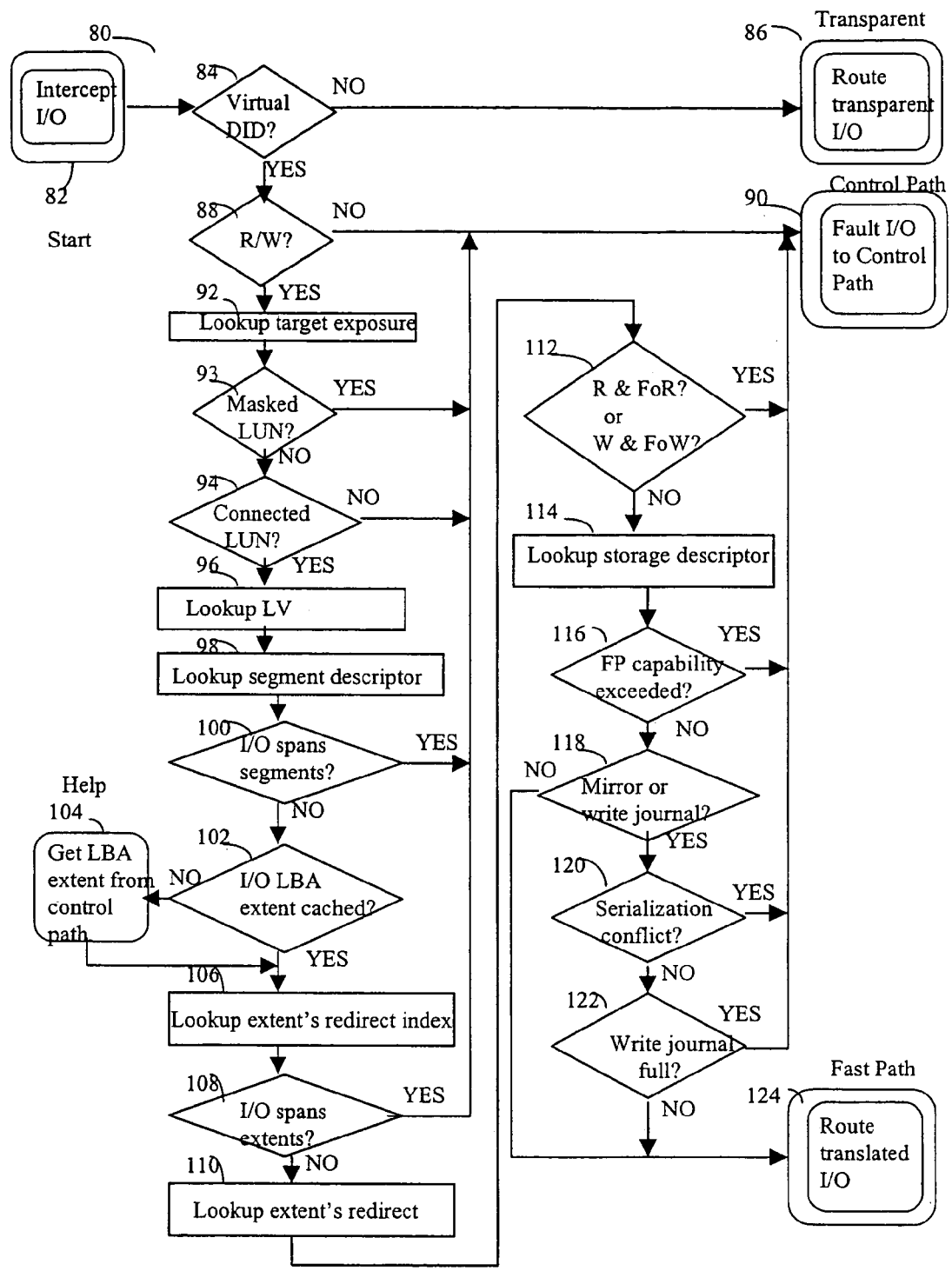
FIG. 7 is a flowchart of more detailed steps for processing a data operation.

Referring now to FIG. 7, shown is the flowchart 80 of steps of an embodiment providing more detail in connection with the processing described in connection with flowchart 50. In particular, flowchart 80 describes in more detail the steps of determining whether or not to use the FP or the CP in connection with processing and forwarding an I/O request between a host and a physical data storage device. At step 82, the I/O operation is received. At step 84, a determination is made as to whether or not this is a Virtual device identifier (DID). If a determination is made that the current I/O operation involves a physical devices, control proceeds to step 86 where a transparent I/O operation is routed directly to the physical device, for example, using the FP hardware to forward the physical address of an I/O request. An I/O operation to a physical device may be handled transparently, that is, without requiring FP processing. An I/O operation to a virtual device is handled by the FP and CP. Both virtual and physical devices may exist on the same SAN and may be addressable by Fibre Channel device identifiers (FC DIDs).

Physical devices correspond to physical disks, as may be, for example, plugged into a SAN.

It should be noted that a DID indicates an address associated with, for example, a disk or host bus adapter that is plugged into the switching fabric. An I/O operation may be specified using the DID or other SAN address in accordance with the particular SAN (storage area network) protocol such as an IP address for iSCSI. In connection with virtual volumes or LVs as described elsewhere herein, the VE fabricates a virtual DID such that the virtual DID may be accessed, for example, using a name server as a physical DID may be accessed.

If the determination at step 84 results in a determination that there is no virtual DID, then the I/O operation is to a real physical device connected to the switching fabric and control proceeds to step 86 to route the I/O operation to the correct outbound port of the switch.

If a determination is made at step 84 that the I/O operation involves a virtual DID, control proceeds to step 88 where processing steps may be taken to remap the virtual DID to a physical device. At step 88, a determination is made as to whether this I/O operation involves an access other than a read or a write. If this I/O operation involves access other than a read or write, control proceeds to step 90 where the CP is used in connection with processing the data operation. Otherwise, if this is a read or a write operation, control proceeds to step 92 where a look up of the TE or target exposure is performed. This is performed using the DID (or other SAN Address) of the virtual device addressed by the intercepted I/O.

At step 93, a determination is made as to whether the LUN is masked. If so, control proceeds to step 90 where the current I/O faults to the CP for further processing. An embodiment may include, as part of the determination of whether the LUN is masked, values used in connection with determining the security of a device, such as whether a host has permission to perform I/O operations. An embodiment may also include as part of step 93 processing a determination of whether a particular host has a LUN reserved, such as in connection with processing SCSI Reservations, and SCSI Unit Attention conditions, such as when each host is notified of particular occurrences like, a LUN size change, and the like. When there is such a mask used, such as associated with permissions and securities as well as those associated with SCSI reservations, unit attention conditions and the like, control proceeds to step 90 where there is a fault to the CP for processing the current I/O operation.

At step 94, a determination is made as to whether the particular I/O operation involves a LUN of a device which is currently connected to the host. If not, control proceeds to step 90 where the CP is used in connection with processing the I/O operation. Otherwise, control proceeds to step 96 where the LV is determined at step 96 for the particular LUN.

Control proceeds to step 98 where the appropriate segment descriptor is determined for the particular I/O operation. At step 100, it is determined whether the I/O operation spans multiple segments. If so, control proceeds to use the CP for processing at step 90. Otherwise, control proceeds to step 102 where a further determination is made as to whether the I/O logical block address or LBA extent is cached. If the I/O LBA extent is not cached, control proceeds to step 104 where an inquiry is made by the FP using the CP to obtain the LBA extent at step 104. The FP may proceed to obtain the LBA extent from the CP, for example, by performing a routine call and returning the LBA extent as a routine result or parameter.

Control proceeds to step 106 where the extent's redirect index is determined. Control proceeds to step 108 where a determination is made as to whether the I/O spans extents. If so, control proceeds to step 90 where the CP is used in processing. Otherwise, control proceeds to step 110 where the extent's redirect entry of additional processing information is obtained.

It should be noted that the extent redirect index used at step 106 may be used as an index into an array, for example, or other equivalent data structure of redirect entries to access additional information, as at step 110, as may be used to process a particular I/O operation. In one embodiment, the extent redirect index may be, for example, 4 bits used to access, for example, directly or indirectly, a hundred bytes of other information. The array of extent redirect entries is used and described in more detail elsewhere herein.

Control proceeds to step 112 where a determination is made as to whether the fast path may be used in processing a read or write operation to this particular device. One of the additional pieces of information that may be included in an embodiment of a redirect entry is a set of flags indicating which particular operations are allowed to be performed using a fast path to a particular device. In one embodiment, these flags may indicate which operations are disallowed, such as "fault on read" (FoR) and "fault on write" ("FoW"). In other words, if a read operation is incoming into an extent having a corresponding redirect entry that specifies "FoR", then a fault is made to the CP for processing. Similarly, if an incoming operation is a write operation to an extent having a corresponding redirect entry that specifies "FoW", then a fault is made to the CP for processing.

It should be noted that a given virtual volume segment may be divided into a set of variable length extents. Each of these extents may have an associated "redirect entry". These extents may correspond to a state of virtualization. In other words, the redirect entry associated with an extent may indicate state information about a portion of a volume, for example, such as whether that portion of a volume has been migrated, snapshot, and the like, depending on the progress of an operation. As such, multiple extents may reference the same redirect entry in accordance with the particular state of the different portions. For example, blocks 0 . . . 12 inclusively may reference redirect entry 0. Blocks 13 . . . 17 inclusively may reference redirect entry 1, and blocks 18 and 19 may also reference redirect entry 0. The redirect entries indicate which operations may be performed in using the FP in accordance with state of a particular portion of a virtual segment. Additionally, the redirect entry may indicate where the actual data is located (storage descriptor) for a particular portion of an LV, such as whether the data has already been pushed to a particular physical device).

If a determination is made at step 112 that it is one of the particular read or write operations, control proceeds to step 90 where the CP is used in processing the I/O request. Otherwise, control proceeds to step 114 where the storage descriptor is obtained. At step 116, a determination is made as to whether the FP capacity is exceeded.

It should be noted that the particular FP capacity or capability may vary in accordance with each embodiment. For example, in one embodiment, an FP may have a limit on the size of an I/O operation it is capable of processing. An embodiment may have other limitations or restrictions. In one embodiment, an FP may not perform I/O operations that must be sent to two different devices such as may be when an I/O operation spans a RAID0 stripe and part of the I/O operation is associated with disk A and another part associated with disk B. Each particular embodiment may determine what limits or tasks may be streamlined and performed by an FP allowing for customization of FP operations to those most prevalent within each particular implementation. The remaining operations may be handed over to the CP for processing.

If the FP capacity is exceeded, control proceeds to the CP for processing. Otherwise, control proceeds to step 118 where a determination is made as to whether the particular I/O operation is for a mirroring device or involves a write to a journal. If so, control proceeds to step 120 where a further determination is made as to whether there is a serialization conflict.

A serialization conflict may be determined in connection with mirrored devices. For example, one rule in an embodiment for writing to a mirrored device is that only one FP within a particular VE may write to a particular LBA (logical block address) range at a time to ensure integrity of mirrors. A serialization conflict may occur when, within a single FP, one or more hosts have issued two write operations to overlapping LBA ranges. When this serialization conflict is detected, such as may be in connection with a failover, the conflicting I/O operation may be routed to the CP for later retry.

If a serialization conflict is determined at step 120, control proceeds to step 90 where the CP is used for processing the I/O request. Otherwise, control proceeds to step 122 where a determination is made as to whether the write journal is full. If the write journal is full, control proceeds to step 90 where the CP also processes the I/O operation. Otherwise, control proceeds to process the operation and route the particular I/O request using the fast path at step 124.

It should be noted that in connection with the flowchart 80, a variety of different tests may be included in an embodiment in determining whether to use the fast path or FP in routing a particular I/O request to a physical device. The processing of the steps of flowchart 80 may be characterized as filtering out or detecting those operations which are not common or are more complex than those which the FP may handle in an expedient fashion. Those operations that involve other processing and are not able to be performed in a stream line fashion are forwarded to the CP. For example, in a determination at step 122 that the write journal is full, processing steps that are taken from the CP may for example involve emptying a portion of the journaling entries prior to performing the I/O operation.

Figure 8:
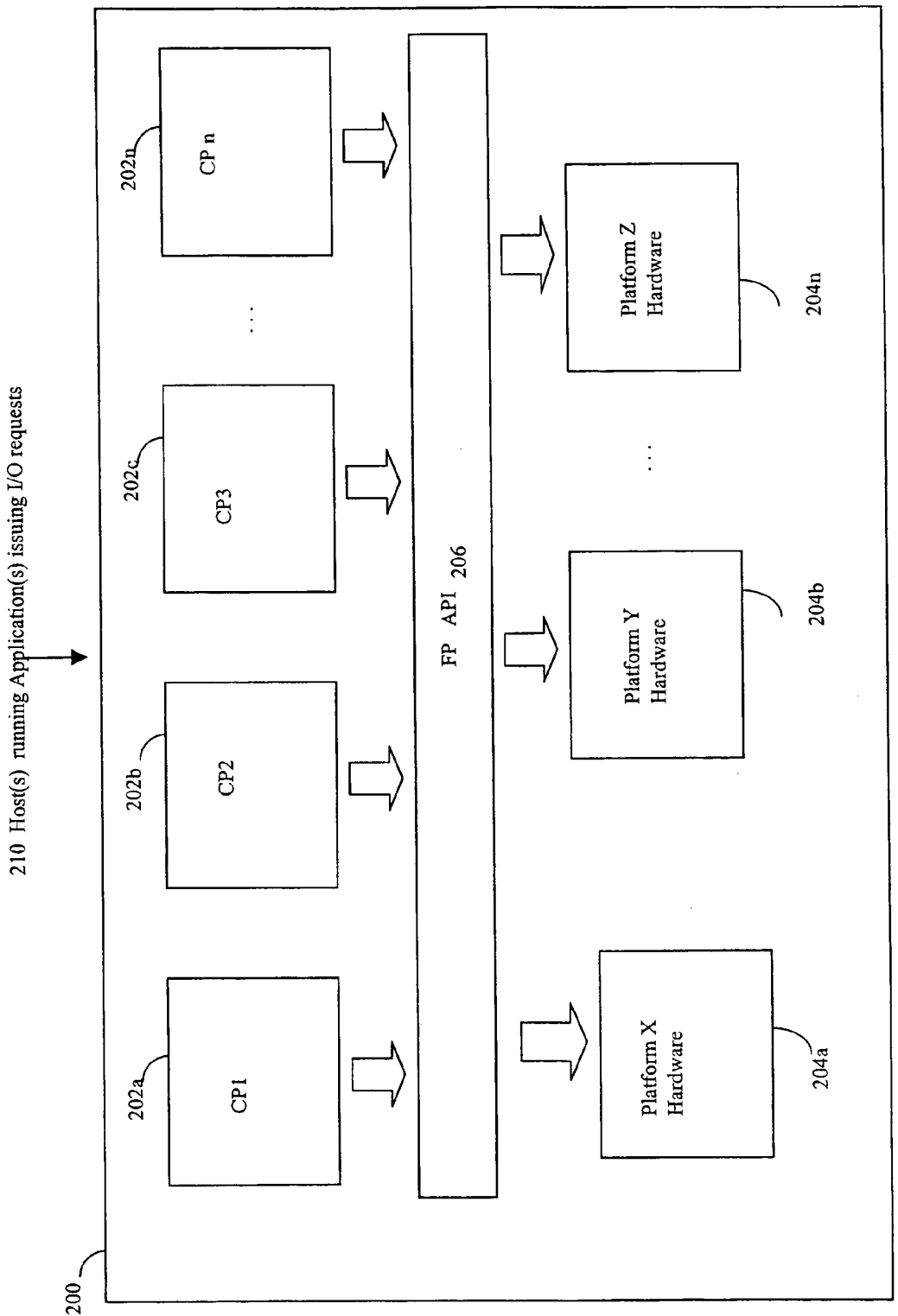
FIG. 8 is an example of a model of application programming interfaces that may be used in connection with fast paths.

Referring now to FIG. 8, shown is an example 200 of a model of application programming interfaces or APIs that may be included in an embodiment of the switching fabric when implementing the fast path (FPs) as described herein. In this particular example, the FP or fast path may be implemented in software using a set of platform dependent APIs. These platform dependent APIs may be used by platform independent CP software through the use of the FP API 206.

Referring to the example 200 of FIG. 8, included are various CPs 202a-202n that interface with the FP API 206. The FP API 206 may be a platform independent interface with different platform dependent hardware configurations 204a-204n. In other words, the FP API 206 may provide an interface linking the different hardware platforms, such as 204a-204n, to platform independent CP software, such as 202a-202n, that may in turn interface with one or more applications 210, such as a particular database software, running on a host computer system. A CP, such as 202a, may utilize the platform dependent APIs through the FP API 206 to communicate with any one or more of a variety of different hardware platforms 204a to 204n. Any one of the CPs 202b-202n may also utilize the same platform dependent API included in the FP API 206 to communicate with particular hardware platforms 204a-204n.

In one embodiment, the CP software and/or hardware and FP API 206 may be included in the switching fabric within the DVE. Alternatively, an embodiment may also include all or portions of this and other hardware and/or software anywhere between the host application software and the physical storage. For example, a portion or all of the foregoing may be included in a host-side filter driver. The FP API 206 may be supplied by a platform vendor. An embodiment may also include some additional code in an embodiment to "shim" the different APIs together, such as to get the FP API 206 to work with the CP software.

The techniques described herein of using the FP may be used in an embodiment that includes file system storage and block storage techniques. For example, virtual block storage is addressed using LVs, and virtual file storage may be addressed using logical files. The techniques described herein may be used in connection with file level protocols, such as NFS, CIFS and the like, as well as block level protocols, such as SCSI, FC, iSCSI, and the like, with appropriate modifications as may be made by one of ordinary skill in the art. For example, an embodiment using a file level protocol may have one volume segment descriptor for each file and accordingly use the Rmap and storage descriptor table described elsewhere herein.

Figure 9:
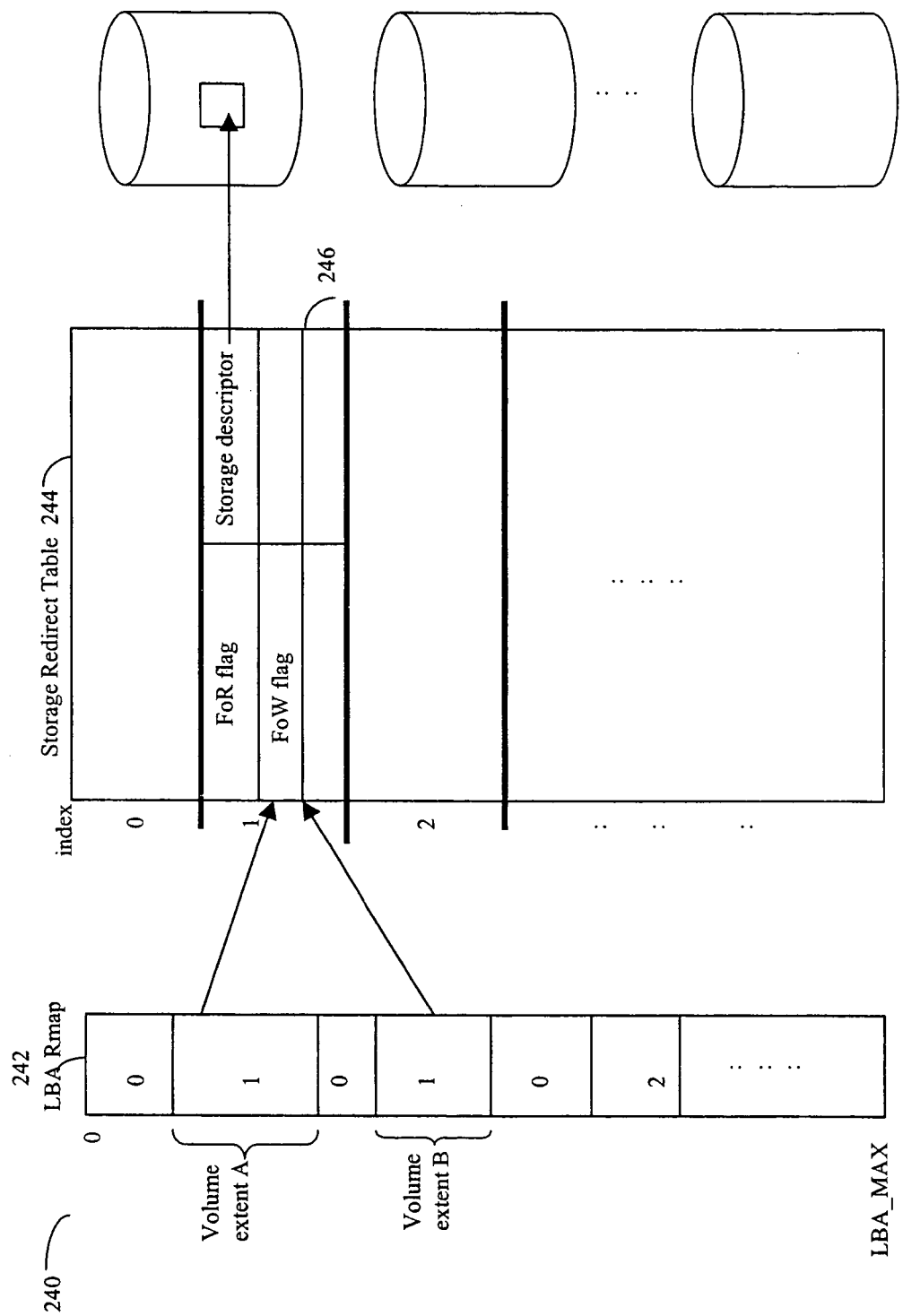
FIG. 9 is an example of an embodiment of tables used in connection with mapping a virtual address to a physical address in the computer system of FIG. 1.

Referring now to FIG. 9, shown is an example of an embodiment of tables used in connection with mapping a virtual address to a physical address in the computer system of FIG. 1 using the FP and CP techniques. The example 240 includes an LBA Rmap table 242 and a storage redirect table 244. The tables 242 and 244 may be used in mapping a virtual address range of a volume descriptor to a storage descriptor identifying a physical device location. A virtual address reference associated with a particular volume segment descriptor as described in more detail elsewhere herein may include, for example, an identifier of a device, a starting offset within a particular segment, and the length representing an ending offset or span from the starting location. For a particular device, a starting offset in terms of a logical block address or LBA value may be used to index into the LBA Rmap 242. The length of the I/O operation may specify the span or length at which an ending offset within an LBA range may be determined.

Referring to the LBA Rmap 242, a particular LBA range from 0 to LBA_MAX is represented by the LBA Rmap 242. A starting offset may be a value from 0 to LBA_MAX. The length of the data associated with the I/O operation may be used in determining an ending offset from the starting value. A particular LBA range from zero to LBA_MAX may be partitioned into a plurality of extents. An extent represents a particular subset of an LBA range. Example of extents corresponding to particular LBA ranges are indicated as volume extent A and volume extent B on the LBA Rmap 242.

When an I/O operation is received by the FP, the FP identifies the appropriate volume segment descriptor (VSEG) and LBA Rmap entry in accordance with the virtual device, the starting address and the length associated with the I/O operation. Each volume segment descriptor describes a volume segment which is a contiguous range of LBAs included in a virtual volume. The volume segment descriptor may include those tables in the example 240, in particular the LBA Rmap 242 and the storage redirect table 244. In one embodiment, the volume segment descriptor is the only location within the system for mapping virtual to physical addresses that includes the LBA range of specific information storage. Each entry in the LBA Rmap 242 associates its volume extent or a particular LBA range, such as volume extent A, with a storage redirect table entry representing the state of that particular portion of physical storage corresponding to the LBA range for that particular extent.

For example, referring to the volume extent A of LBA Rmap 242, a first portion or range of addresses is defined. Associated with that portion of volume extent A identifying a first particular LBA range is an index value of 1 as included in the second entry of the LBA Rmap table. The value of 1 represents an index into the storage redirect table 244 containing an entry corresponding to the state of that particular portion of the LBA range associated with volume extent A. In other words, the storage redirect table having an index of 1 246 includes state information that describes the state of that portion of the storage associated with volume extent A. Similarly, the portion of the LBA range identified by volume extent B also has a redirect index value of 1 meaning that volume extent A and volume extent B have a state represented by entry 246 of the storage redirect table 244. It should be noted that two extents may have the same reference to the same redirect table entry or Rmap value. Alternatively, a particular extent corresponding to an LBA range may be associated with a different entry in the redirect table to reflect its current state.

It should be noted that extents included in the LBA Rmap 242 may be variable in size. Each extent may correspond to any particular size between zero and LBA_MAX and identify a particular entry in the storage redirect table. Each entry in the storage redirect table 244 describes the state of the physical storage portion corresponding to the extent. Details of how the LBA_Rmap and extents may be used are described in more detail elsewhere herein.

Each entry in the storage redirect table 244, such as entry 246, may include a storage descriptor as well as faulting mode flags, such as the FOW (fault on write) flag and the FOR (fault on read) flag used in connection with FP and CP processing. Other information may also be kept in the storage redirect table entries that may vary in accordance with each embodiment. The FOW and FOR flags may be used, for example, as in connection with processing steps of the flowchart 80 of FIG. 7 when deciding whether to use the CP or the FP for processing an I/O operation. The information used in performing processing steps of FIG. 7 may be obtained from the storage redirect table 244. Additionally, other processing steps of FIG. 7 describe the use of the LBA Rmap table 244 and the storage redirect table 244 in processing the I/O path on either the CP or the FP.

The storage descriptor that may be included in an entry in the storage redirect table 244 describes how to actually access the storage corresponding to a particular LBA range of the volume. For example, a storage descriptor may be used to locate data associated with a particular LBA range in more complex storage systems which may include mirroring, striping, and the like.

Mappings may be maintained coherently across DVEs in the metadata. Metadata may include, for example, the state information included in the storage redirect table 244 as well as the state information included in the LBA Rmap 242. It should be noted that entries such as those included in the storage redirect table 244 as well as the LBA Rmap 242 are not modified by the FP but rather in one particular embodiment may only be modified by the CP when the FP faults, for example, in performing an I/O operation.

In one embodiment, the Rmap table 242 may include a fixed number of extents that may be specified, for example, as a bounded resource requirement where each extent may be of a variable size and each have a value or range associated with it. A new extent may be added and an associated value or range may also be added to the Rmap at any time. Additionally, the value of an extent or part of an extent may also be changed at any particular time.

It should be noted that in one embodiment, all Rmap or resource map management information and operations involved in the management of the metadata may be performed by the CP. For example, the CP is solely responsible for reading and writing the age list and other metadata. The FP may read the LBA Rmap 242, as accessed though the CP. It should be noted that in this embodiment, the CP reads and writes both the age list (described elsewhere herein) and lba map. The FP does not directly access metadata information. Rather, in this embodiment, the FP can query LBA Rmap information and other metadata from the CP. The CP may also communicate LBR Rmap information to the FP through an FP API.

Figure 10:
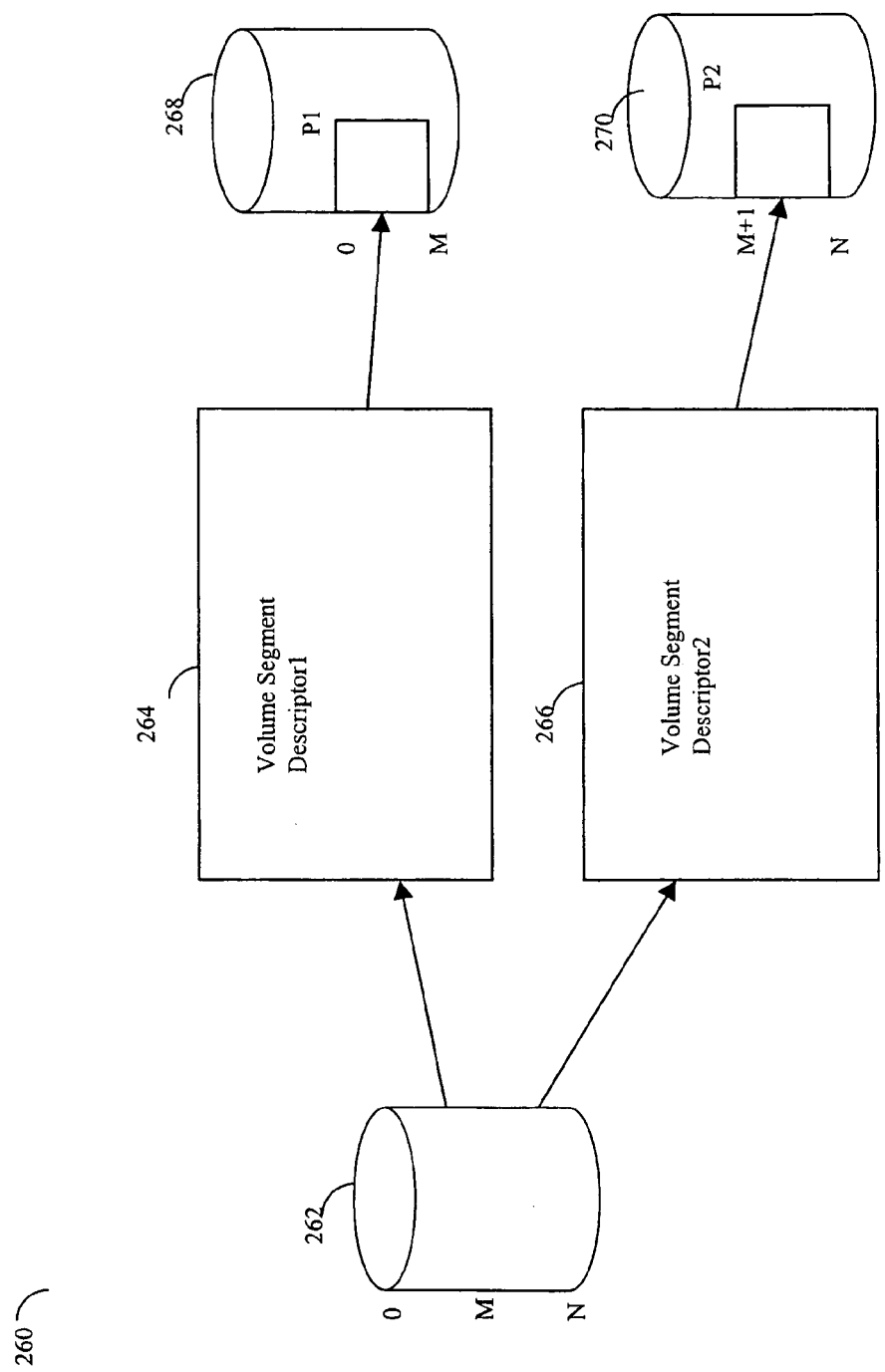
FIG. 10 is an example of an embodiment of mapping virtual to physical storage using the volume segment descriptors.

Referring now to FIG. 10, shown is an example of an embodiment of how a particular virtual address using volume segment descriptors may be mapped to physical locations using the Rmap and storage redirect table as described elsewhere herein. Each volume segment descriptor may be associated with its own Rmap and storage redirect table. For the sake of simplicity, the Rmap and storage redirect table of each of the volume segment descriptors are omitted. The illustration 260 includes a virtual volume 262 that has address range or LBA range 0 through N. The LBA range 0 through M is associated with a first volume segment descriptor 264. Similarly, the upper portion of the LBA range M+1 through N is associated with volume segment descriptor 2 266. This mapping for any LBA within the range 0 . . . M causes volume segment descriptor 1 264 and associated tables to determine that physical device P1 268 includes corresponding data portions. Similarly, using the tables from volume segment descriptor 2 266 for an incoming virtual address falling in the LBA range M+1 through N, a portion of the physical device P2 270 may be determined as the physical storage location of the data.

Using the foregoing, when an incoming I/O operation specifies a range of blocks falling between 0 through M, volume segment descriptor 1 264 may be used. Similarly, when a particular I/O operation includes an LBA range within the range M through N, volume segment descriptor 2 266 may be used. The foregoing also represents how a single virtual volume may correspond to portions of multiple physical devices. In other words, the use of the tables in connection with the volume segment descriptors may be used in mapping logical or virtual devices to physical devices. In this instance, a single virtual device is mapped to portions of a plurality of physical devices. Similarly, a single virtual volume may correspond only to a portion of a single physical device using the techniques described herein.

It should be noted that the foregoing techniques in connection with the LBA Rmap and the storage redirect table may be used in connection with multipathing. Generally, multipathing may refer to alternate paths to the same physical device. A first path to a first physical device may be used. When there is a problem with transferring data along the first path to the first physical device, a second alternate path may be used to send data to the same physical device. Use of the storage redirect table and the LBA Rmap may be used in specifying an alternate path. For example, the CP may determine that there are two paths to the same physical device.

Figure 11:
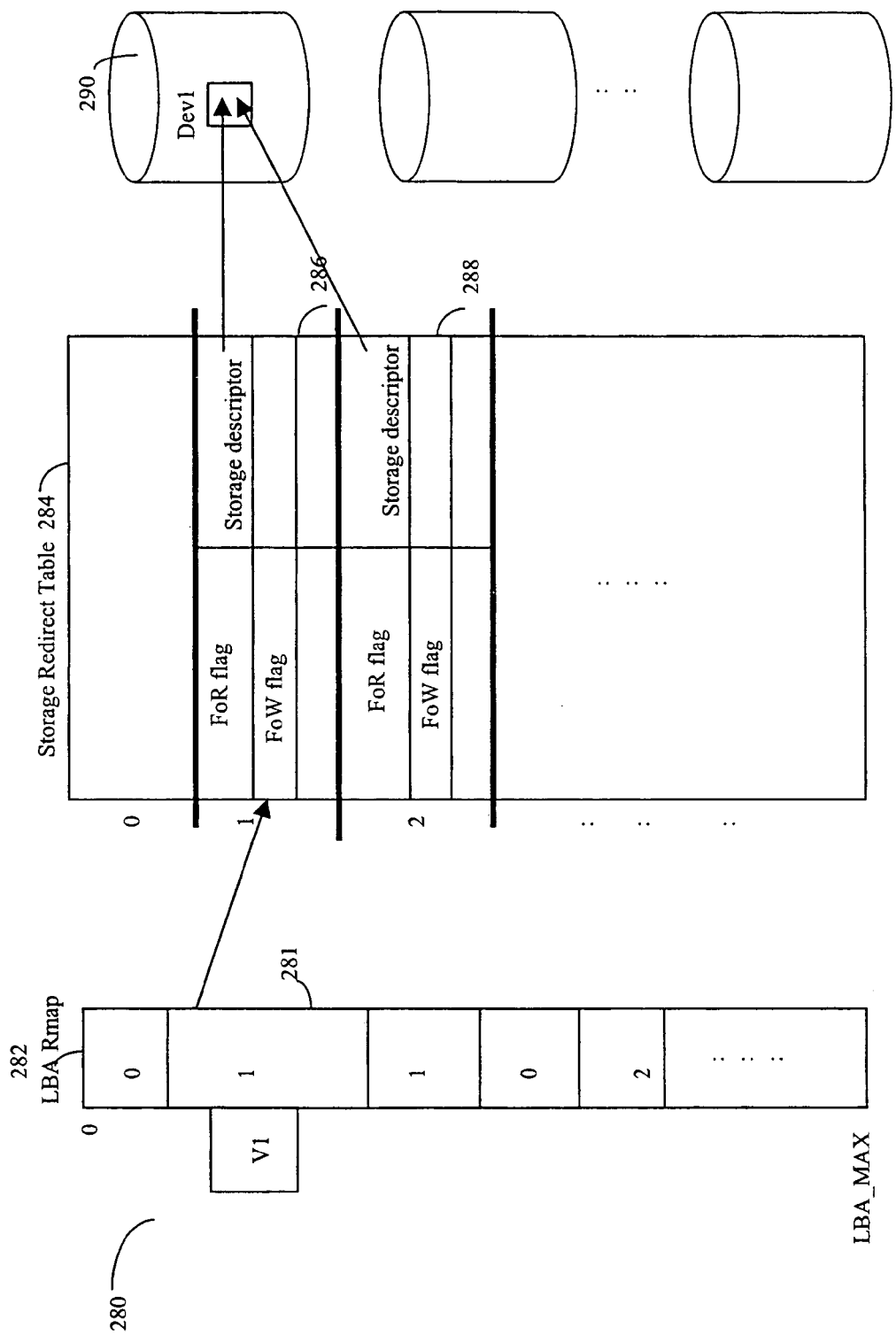
FIG. 11 is an example of an embodiment of using the mapping tables in connection with a multipath technique.

Referring now to FIG. 11, shown is an example of an embodiment 280 of how the LBA Rmap and storage redirect table may be used in connection with a multipathing technique. An incoming virtual address V1 is determined to be in the volume descriptor that includes LBA Rmap 282. In particular, it refers to the second entry in the LBA Rmap table 282. The second entry of the LBA Rmap table includes a 1 as indicated by element 281. When an incoming I/O operation uses the path specified by storage redirect table entry 1, an I/O failure may occur and the CP may get involved to perform a path test to device 290 along the path specified by the storage redirect table entry 1. The CP may determine that storage redirect table entries 1 and 2 specify two different paths to the same device 290. Upon an I/O failure, the CP may determine that the particular path specified by storage redirect table entry 1 has indeed failed. The CP may then reconfigure the destination of the volume segment descriptor to use the second path specified by the storage redirect table entry 2. An I/O error may be returned to the host and the host may retry the I/O. On retry, the FP sends the I/O to the newly configured and presumably good path specified by the storage redirect table entry 2. The CP may indicate the use of this alternate path by modifying entry 281 of the LBA Rmap table 282 to indicate a 2 rather than a 1.

It should be noted that an embodiment may preferably use another technique in connection with specifying multiple or alternate paths. The foregoing technique may be characterized as one which specifies path changes on a local level, or per entry. In other words, using the foregoing technique, to make a "global" or system wide change, all entries referencing a particular path that has been modified need to be updated causing a failover to the CP to update each entry of the LBA Rmap referencing a particular path. An embodiment may utilize an alternate technique in specifying such a global change by redefining a particular path associated with a physical volume using techniques external to the LBA Rmap, such as global or system configuration data.

Figure 12:
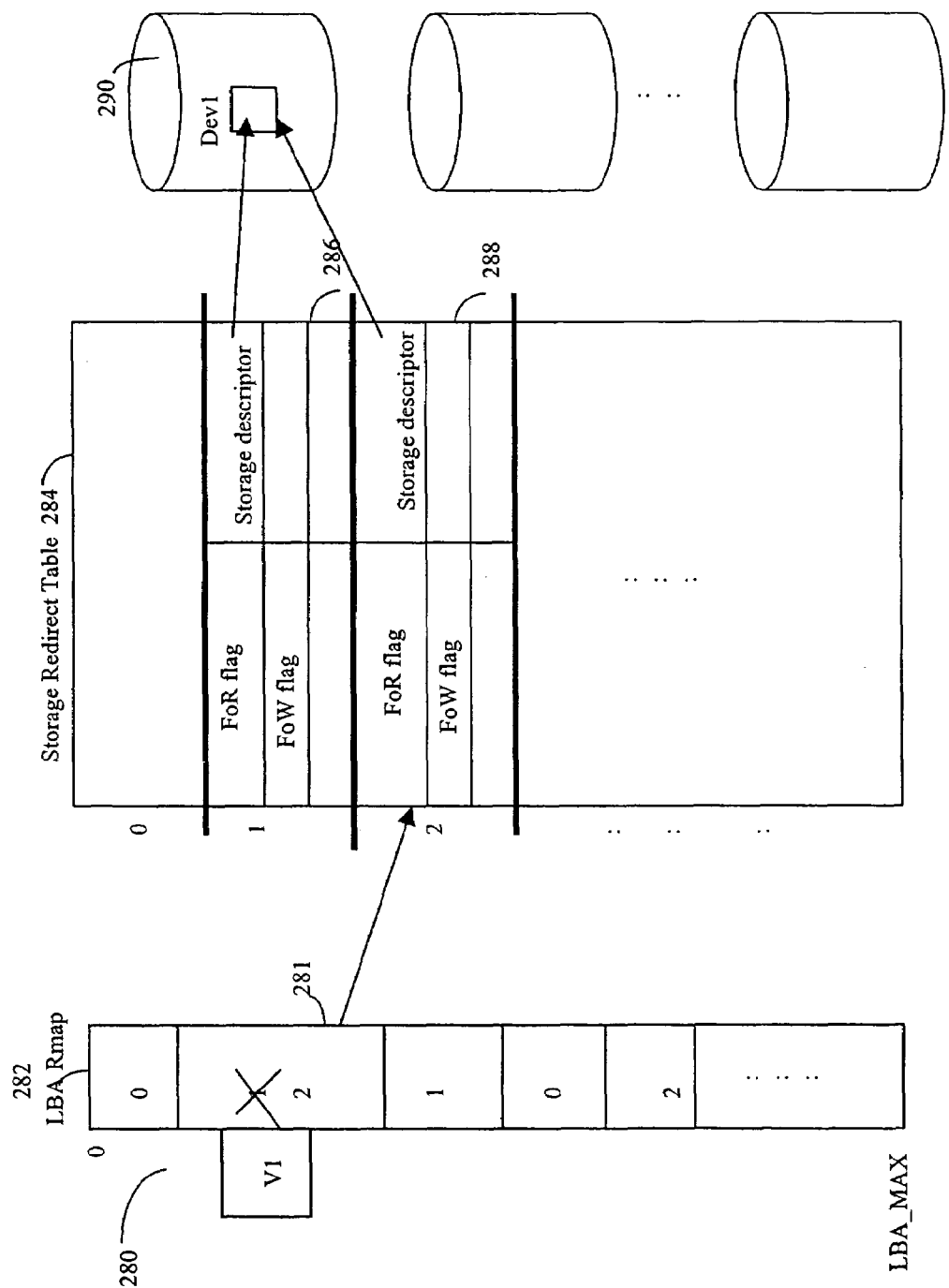
FIG. 12 is an example of updated tables in connection with a multipath operation.

Referring now to FIG. 12, shown is an example of the updated LBA Rmap table as modified by the CP, for example, in connection with the multipathing example just described upon detection of a failure by the CP. It should be noted that alternatively the storage descriptor within an entry of the redirect table may also be modified to specify an alternate path to take to the particular device rather than modifying the LBA Rmap itself. FIG. 12 shows an example of performing and specifying an alternate path at a global level.

It should be noted that the FP may cache a portion of the LBA Rmap which is included in the CP. The LBA Rmap in the CP may be a cache of the LBA Rmap included on a form of media or other storage. This three level caching of the variable length extents allows the FP LBA Rmap to be very efficient in terms of resource utilization and speed.

Figure 13:
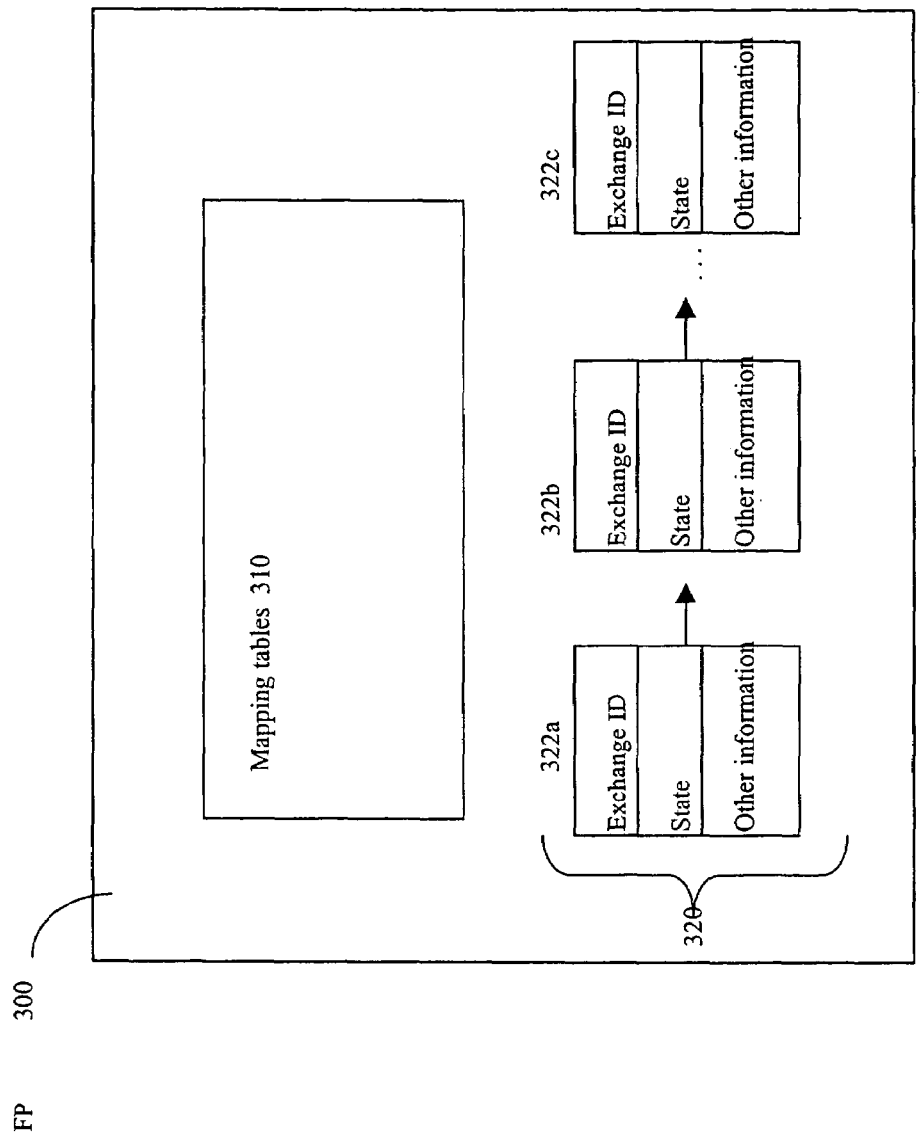
FIG. 13 is an example of information that may be cached within a fast path (FP)

Referring now to FIG. 13, shown is an example of some information that may be cached or stored within each of the FPs. In this particular embodiment, the FP 300 may include one or more of the mapping tables 310 as well as a pending I/O list 320. It should be noted that the mapping tables 310 may include information such as the LBA Rmap and the storage redirect table described elsewhere herein. The pending I/O list may include an entry, such as 322a for each of the pending or outstanding I/Os. In this particular embodiment, an entry is added to the pending I/O list when an I/O request is received from "upstream", for example, from a host. The entry may also be removed from the list when a message is sent from the switching fabric to the request issuer, such as the host, that the I/O operation has completed. For the duration that the I/O operation is outstanding, the I/O is said to have a status of active.

While the I/O status is active, the FP keeps track of any supporting I/Os sent "down stream" or to the particular physical devices. These supporting I/Os may be maintained in a separate "downstream" pending I/O list. Supporting I/Os may include, for example, any type of handshaking messages and protocols in accordance with each particular embodiment. For example, in connection with performing a write operation, once the FP receives the data, the FP may issue a write command to a device, receive a "ready to transfer" command from the device itself, actually perform a write of the data, and then receive a return status prior to any other information being returned to the initiating host. FP keeps track of all of these supporting I/Os sent for example to the devices.

An entry included in the pending I/O list 320, such as 322a, may include an exchange ID, state, and other information. The exchange ID in this particular example may represent corresponding protocol dependent information allowing the FP to process subsequent command sequences using the exchange ID to properly identify any mappings. For example, if a particular lookup service may have been used, the actual physical device determined from the logical device may be used in connection with the exchange ID such that a name resolution is not performed each time in connection with performing I/O operations. Mapping information may be determined when the initial sequence of a command is intercepted based on, for example, a target LUN, LBA and the like. In connection with subsequent sequences, this mapping information may be obtained using the exchange ID, which is common across all command sequences rather than performing perhaps multiple processing steps in connection with associated mapping information.

The state information included in the record 322a may describe the state of the I/O operation, for example, as pending, queued, completed, failed or other type of status as appropriate in accordance with each particular embodiment. Each entry may also include other information as needed in connection with performing other supporting I/O operations and other processing steps in connection with performing I/O operations.

Within a series of DVEs, and CPs and FPs included therein, different mappings, such as the information contained in the LBA Rmap as well as the storage redirect table, may be maintained coherently. A subset of these mappings may be included in the FP for use by the FP and for communications between the CP and the FP. Mappings are read by the CP and populated to the FP. The FP does not modify the metadata, for example, in the tables in this particular embodiment. Rather, the CP may modify any information in the tables, for example, when the FP faults to the CP in connection with processing an I/O operation.

It should be noted that a virtual device may be described by more than one mapping entry. It is the CP's responsibility to ensure that all of the statuses of the various mapping entries are synchronized with one another. In other words, it is up to the CP to enforce uniformly different state rules such that, for example, one half of a mirroring device is not indicated as up and running and another portion of the same device indicated by another entry as being down. It is up to the CP to enforce coherent and synchronize statuses in accordance with the different entries of the different devices. For example, when the CP changes or finds that one particular device is inaccessible or down, the CP should also modify any other relevant mapping entries to also indicate this particular device is also down. The CP is involved in state changes.

It should be noted that in one embodiment, the FP may maintain a cache of the redirect table and a portion of the rmap table in use by the FP. The cache is local to the FP, for example, in memory only accessible by the FP. The portion of the rmap table that is cached within the FP is synchronized with the complete copy maintained by the CP. Additionally, copies of mapping tables maintained by each CP are also synchronized.

Techniques that may be included in an embodiment for data coherency and synchronization are described elsewhere herein.

The DVEs may choose whether to participate in coherency operations in connection with the mapping entry. For example, a DVE not accessing a particular virtual device does not need to participate in ensuring that data included in particular tables such as mapping is coherent in connection with information stored in other tables.

Age lists may be used in connection with mirrors requiring fast re-sync ability. The use of age lists and mirroring operations are described elsewhere herein.

Figure 14:
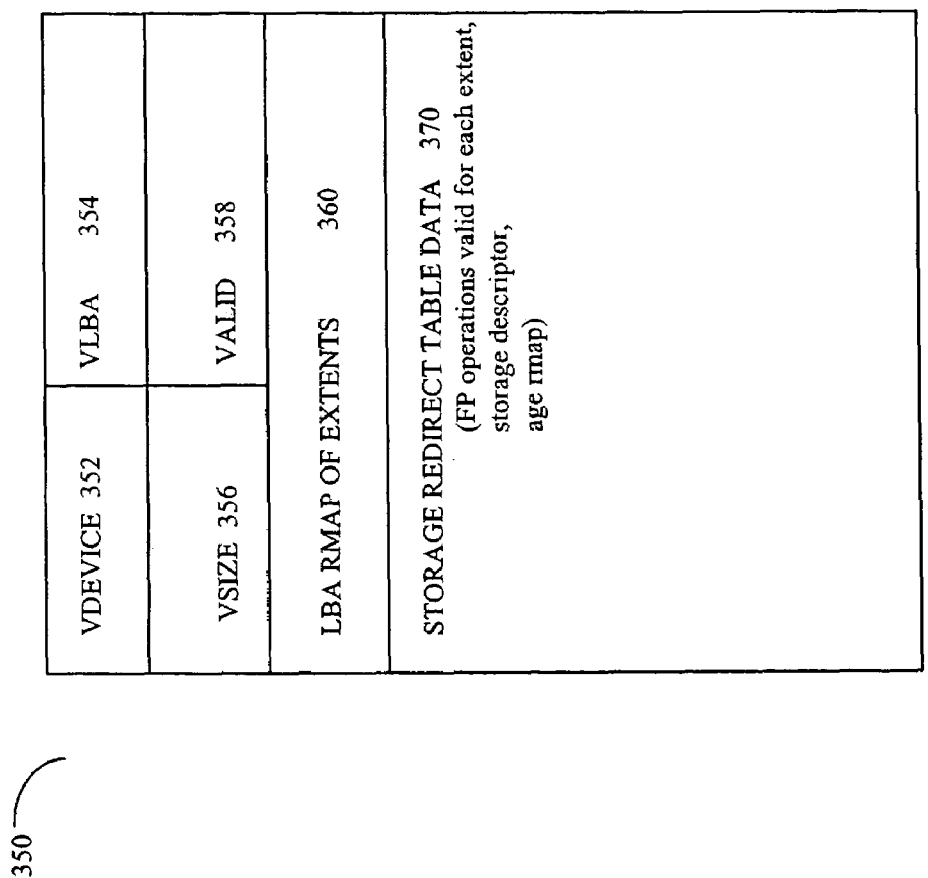
FIG. 14 is an example of information that may be included in mapping table entries.

Referring now to FIG. 14, shown is information 350 that may be included in mapping table entries. Collectively, the mapping tables may include information from the previously described Rmap and storage redirect tables described elsewhere herein. A particular mapping table entry may correspond to a volume descriptor or VSEG. A volume descriptor corresponds to a particular virtual device or VDEVICE 352 having a starting LBA noted as the VLBA 354. The VSIZE 356 indicates the size of the portion of the virtual device described by the mapping included in the table or descriptor 350. The LBA RMAP OF EXTENTS 360 defines the range or resource map of the device extents of this particular volume segment descriptor. The STORAGE REDIRECT TABLE DATA 370 includes information needed to physically identify the location of a particular storage area corresponding to a particular virtual device location and address. Additionally, other information included in the storage redirect table includes an indicator as to whether certain operations are valid and may be performed by the FP rather than the CP as well as the age list. Through the use of these basic parameters included in the table and the entry 350, the DVE supports the FP operation in connection with performing online migration, LUN pooling, snap shots, incremental storage, RAID 0, RAID 1 and RAID 10, as well as asynchronous replication and atomic group operations. It should be noted that RAID 0 requires I/O striping, RAID 1 requires write splitting. RAID 10 requires the use of the I/O striping and the write splitting. Performing asynchronous replication requires the use of the write splitting and the write journaling. These are basic primitives that are described elsewhere herein and may be used in connection with using FP to perform particular operations. The primitives are described elsewhere herein in more detail.

Referring now to FIG. 15, shown is an example of information that may be included in the host I/O request sent from a host, such as 14a, over the network or other connection 18 to the data storage system 12. An I/O request 400 may include a VDEVICE 402, an LBA 404, a TYPE 406 and a SIZE 408. The VDEVICE 402 may include a virtual device destination for the I/O operation. The TYPE 406 may identify a type of I/O operation. Data as described by fields 406 may be included, for example, in a control data block or CDB indicating whether the I/O operation is a read or write. The LBA 404 may include the starting LBA if the I/O operation of the type 406 is a read or write operation. Otherwise, the LBA field 404 may be not applicable or otherwise null. The SIZE field 408 may specify the size of the data involved in the I/O operation. The data may be stored in a data buffer that is a number of bytes specified by SIZE 408 of a read or a write operation. Otherwise, the SIZE field 408 may include information that is not used.

A particular I/O request may be said to have "hit" a corresponding mapping table entry if the particular mapping table entry may be used for processing the I/O request. In particular, the I/O type of the received I/O operation may be a read or write operation, and a device of the I/O request corresponds to that which is described by the mapping table entry. Additionally, the I/O request specifies a portion of data with a starting LBA whose entire size is within a single Rmap entry. In other words, the data associated with the I/O request may not span multiple Rmap entries in order for there to be a hit on a particular entry of the Rmap table. Generally, the information of processing steps just described herein connection with having a "hit" on a mapping table entry or Rmap entry are those processing steps described previously in connection with FIG. 7.

It should be noted that an embodiment of an FP may divide an I/O operation into multiple pieces in the event an I/O operation spans multiple extents such that each piece "hits" within a single LBA Rmap entry. However, an embodiment of the FP may also not include such functionality and optionally choose to cause such I/O operations to fault to the CP for processing.

In connection with performing I/O operations, downstream I/Os may be issued by the FP without CP intervention. However, as the complexity of an operation increases, there may be a fault from the FP to the CP, for example, in handling particular instances of I/O striping option and write splitting option. In connection with the I/O striping option, the stripe destination for the I/O request is determined. If the I/O spans multiple stripes, the CP may handle the I/O operation. In other words, this operation in one embodiment can be performed by the CP rather than the FP. For the write splitting option, for each mirror side that is writeable, a physical I/O operation is dispatched to the physical device offset by the LBA. When the physical I/O requests complete, the FP may complete the corresponding virtual I/Os. However, if any of the physical I/Os completes unsuccessfully, there is a miss to the CP, for example, in connection with error processing. It should be noted that the FP may be responsible for a small degree of write serialization for the write splitting option. The write journaling option similarly go from this functionality.

Referring back to FIG. 7, when an I/O is received by the FP, the FP must identify the appropriate volume segment descriptor or mapping table entry based on the virtual device, such as the identifier and logic unit number, as well as in accordance with the logical block address and length in connection with the I/O operation. Each volume segment descriptor describes a virtual volume segment which is a contiguous range of LBAs of a particular virtual volume starting at a particular address for a length. A volume may be described by multiple volume segment descriptors in which each of the volume segment descriptors describes non-overlapping LBA ranges of a particular virtual volume.

The virtual volume segment descriptor or VSEG as described elsewhere herein includes an LBA Rmap. The volume segment descriptor in this embodiment is the only place where the LBA range specific information is stored. Each entry of the LBA Rmap associates its volume extent or a particular LBA range with a storage redirect table entry. The storage redirect table entry specifies various faulting modes such as whether to fault on read or write in connection with the FP processing operations for a particular volume extent as well as the corresponding storage descriptor indicating where data is actually stored for a particular volume. Note that each of the storage descriptors describes storage of the same virtual length as the virtual volume segment being mapped. Storage descriptors may indicate striping, mirroring and the like as the part of the storage descriptors internal implementation not visible outside of the storage descriptor field included in the storage redirect table entry. A storage descriptor may also include a set of physical storage elements that are used to store data for a virtual volume segment. A storage descriptor can typically describe both a RAID 0 and a RAID 1 mapping over a set of physical storage elements. Each physical storage element may be, for example, a physical device. Each storage element may be referenced by one storage descriptor.

FPs may play a role in connection with I/O write serialization in connection with mirrors as described elsewhere herein. The CP is responsible for ensuring that only one FP has write permission at the time to any particular mirrored volumes. However, additional serialization within the FP may be required. If the FP cannot provide the serialization in connection with mirroring, for example, then the FP rejects mirrored I/O operations associated with mapping table entries that require waiting. Consequently, these mirrored I/O operations are faulted back to the CP for processing so the CP can serialize them. It should be noted that this is the case when the mirror runs at CP speeds and the CP may become a bottleneck. This serialization is the synchronization operation of one embodiment that may be included in the FP processing. All other synchronization and coherency may be put into effect by the CP by revoking I/O authority associated with fast path mapping table entries and causing the FP to fault I/Os to the CP for queuing or other dispatching. This goes along with the goals of the FP in an environment being simple and light in handling of both of those I/O operations as described herein. Heavier processing such as involved in synchronization operations is faulted to the CP for processing. In the case of the accelerated mirror problem, though, the FP plays a role to ensure correct operation. The problem that the FP is trying to avoid may result in a form of silent data corruption with inconsistent mirrors. This may happen for example in an instance where two outstanding I/Os are overlapping block ranges through the same FP. Thus, the FP needs a way to determine at FP dispatch if a particular I/O operation such as a write, overlaps any currently outstanding write operations. If an I/O operation does overlap any currently outstanding writes, this I/O operation must be queued until sometime later. This may be done by faulting this I/O operation to the CP for processing. The conflicting I/O operation may be over-queued longer than absolutely necessary to the CP. It should be noted that in an embodiment this over-queueing may be performed with negligible affects on overall performance due to the fact that this may occur infrequently.

When the FP receives an I/O operation, it adds the virtual upstream pending I/O operation to the virtual or upstream pending I/O list. If the I/O misses in the fast path mapping table then it is faulted to the CP for processing. Similarly, if there is an outstanding write I/O to an overlapping LBA range and the virtual upstream pending I/O list, the incoming I/O operation is faulted to the CP. If there is no fault to the CP for processing, an atomic update of the physical or downstream pending I/O list is performed and then the I/O is redispatched to the downstream I/O processing to the physical device. Note that the atomicity requirement may be met in other ways as long as the CP can tell that the FP has, or is in the process of, dispatching physical I/Os for that corresponding virtual I/O. This is typically accomplished with a "timestamp" on the upstream pending I/O which indicates that it is "in progress", and its effects on the downstream pending I/O list might not be fully known yet. Again, the CP waits for these to drain if it wants to perform serialization itself which it must do if a conflicting I/O is ever faulted to the CP.

When the CP is serializing I/Os such as in connection with mirrors, the CP ensures that both the corresponding pending physical or downstream I/Os overlapping the LBA range have drained and completed and are no longer pending and additionally, the FP is prevented from itself initiating new pending physical I/Os overlapping the same LBA range. Again, in keeping the FP simple and streamlined, both of these processing steps may be performed with the primitives defined elsewhere herein, such as, for example, querying the pending I/O table and revoking the fast path mapping table entry.

In this embodiment described herein, it should be noted that when serialization occurs, it occurs either in the FP or in the CP, but not both. The CP ensures this by revoking any mapping table entries that give the FP authority to itself redispatch downstream I/Os while the CP is performing the serialization.

In summary, the FP performs serialization on the virtual or upstream side at initial dispatch time. If that serialization fails, or if the CP has to perform any type of manual I/O dispatching, the FP will be put on hold and the CP will take over the role of serialization. Note that as stated earlier, an FP need not implement serialization if it does not need these operations to be fast and scaleable. In other words, if the task of writing to a mirror is not allocated to the FP, then the FP need not be concerned in an embodiment with serialization.

It should be noted that in this particular embodiment described herein there are three distinct types of faults within the FP causing transfer of control to the CP for processing in connection with an I/O operation. A fault in the FP may occur because no mapping table entry exists. A fault may occur within the FP and default to the CP for processing because a particular mapping table permission was violated such as performing a write in a read only extent. Lastly, a fault may occur because of serialization rule violations as just described herein. The FP allows these to be dealt with in a variety of different ways.

Figure 16:
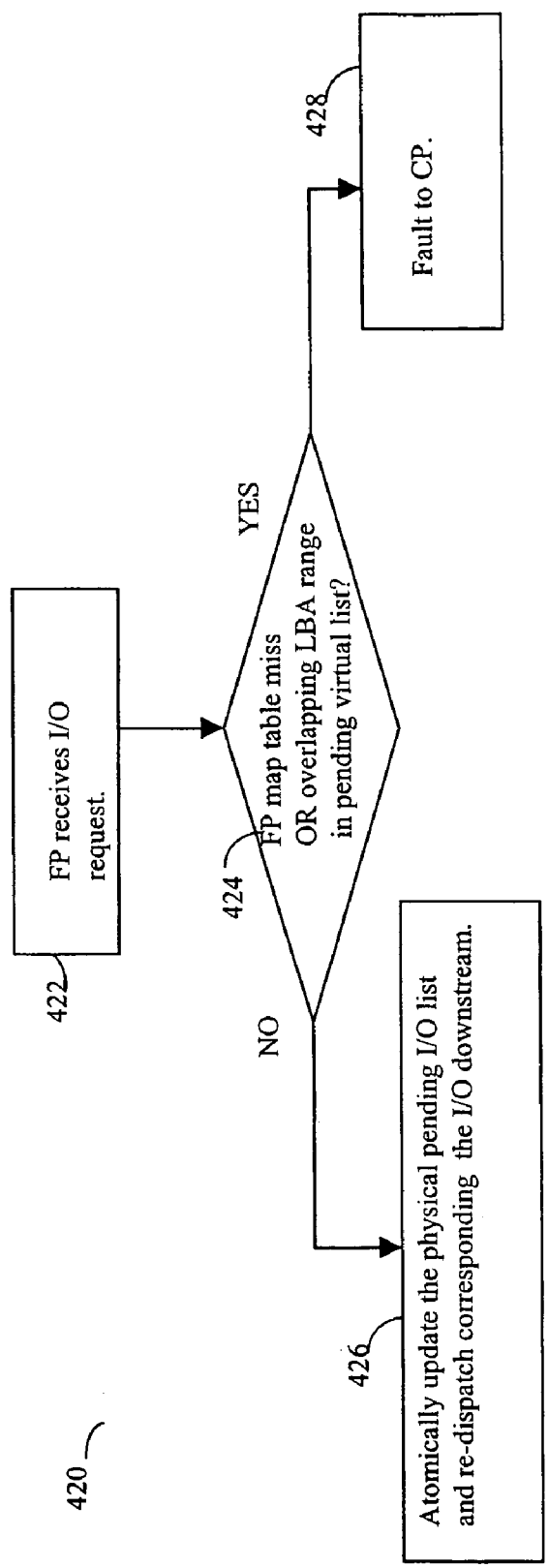
FIG. 16 is a flowchart of steps of one embodiment for processing a received I/O request as may be performed by the FP.
Figure 17:
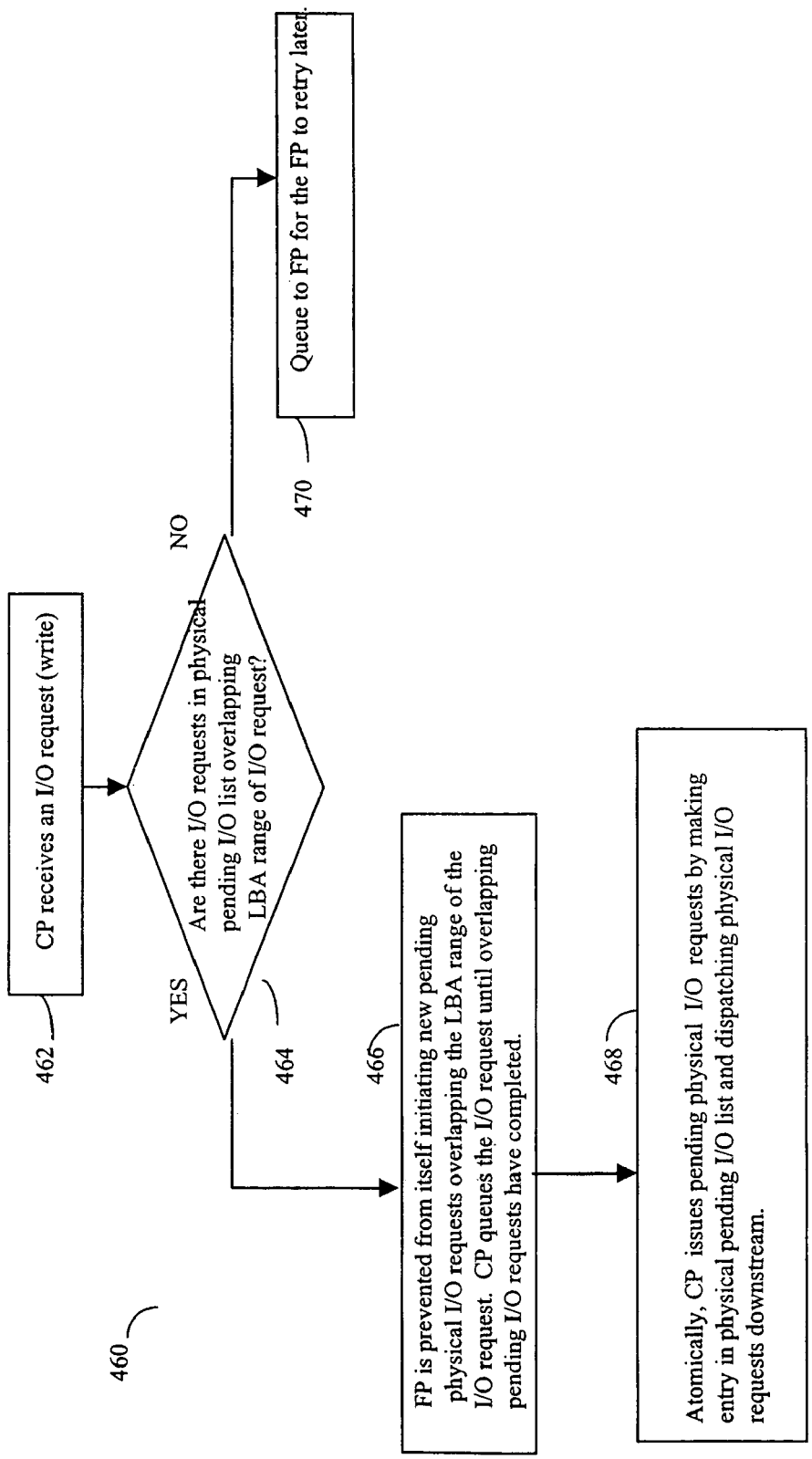
FIG. 17 is a flowchart of steps of one embodiment for processing a received I/O request as may be performed by the CP.

FIGS. 16 and 17 summarize processing steps as may be performed by the FP and the CP, respectively, in connection with performing I/O write serialization in an embodiment that includes mirroring.

Referring now to FIG. 16, shown is a flowchart 420 of processing steps in one embodiment that may be performed by the FP in connection with processing a received I/O request. In particular, the processing steps of flowchart 420 summarize the type of overall processing and faults that are described in more detail, for example, in connection with FIG. 7. At step 422, the FP receives an I/O request. This I/O request may be deemed a virtual or upstream I/O request dispatch, for example, from a host received by the FP within the switching fabric. At step 424, the FP determines if there is an FP map table miss or whether the received I/O request overlaps an LBA range in the pending virtual I/O list. An FP map table miss may occur because there is no mapping table entry within the FP for the corresponding I/O request for dual address, or also because the mapping table permissions have been violated, such as the mapping table indicates that the FP may not be used in connection with the write operation and the I/O request is for a write operation. If at step 424 one of the conditions results in a positive or yes determination, controls proceeds to step 428 where the operation is faulted to the CP for processing as it is determined that the current I/O request may not be processed by the FP. Otherwise, at step 424, control proceeds to step 426 where the FP atomically updates the physical pending I/O list and also dispatches corresponding I/O downstream. In other words, atomically performed at step 426 is an access to the shared resource which is the physical or downstream pending I/O list. Additionally, the I/O operation is redispatched downstream or physically to the devices. These two operations are performed atomically at step 426.

Referring now to FIG. 17, shown is a flowchart of steps of an embodiment 460 that may be performed by the CP in connection with the serialization operations. The CP may serialize I/Os, for example, either because the FP is incapable of doing the serialization or because the FP faulted in I/O to the CP such as when a serialization violation is detected. At step 462, the CP receives an I/O request such as a write I/O request. At step 464, a determination is made as to whether there are I/O requests in the physical or downstream pending I/O list overlapping the LBA range of the received I/O request. If not, control proceeds to step 470 where the I/O request is queued to the FP such that the FP will again later retry the operation.

If at step 464 it is determined there is an overlap between the LBA range of the I/O request and the LBA range of other pending I/O requests in the physically pending I/O list, control proceeds to step 466 where the FP is blocked or prevented from itself initiating any new pending physical I/O requests that overlap the LBA range of the currently received I/O request. The I/O request is placed and remains in the CP's queue until the FP "authority" has been "revoked", such as by invalidating an entry in the LBA Rmap table, and the existing FP I/Os have drained.

FPs may be characterized as operating with "authority" independent of other FPs. An FP may be authorized by a CP to perform certain operations with certain data, such as metadata, which the FP obtains from the CP. The FP stores such data in its local cache. The FP continues processing once it has been so authorized by a CP independent of other FPs. The FP also continues to use information in its local cache until, for example, the CP invalidates information included in the FP's local cache. The CP may "revoke" the FP's authority, for example, by invalidating information in the FP's local cache, modifying an entry in the LBA Rmap causing a fault to the CP, and the like.

Control proceeds to step 468 where the CP proceeds to issue pending physical I/O requests by adding the appropriate items to the physical or downstream pending I/O request and further dispatching the I/O request downstream.

As described elsewhere herein, various operations may be performed in connection with performing the processing steps described in flowcharts 460 and 420 such as, for example, clearing the pending I/O table using APIs provided herein and revoking an FP mapping table entry, for example, and causing an operation to fault to the CP by an invalid or a miss on an FP map table.

Figure 18:
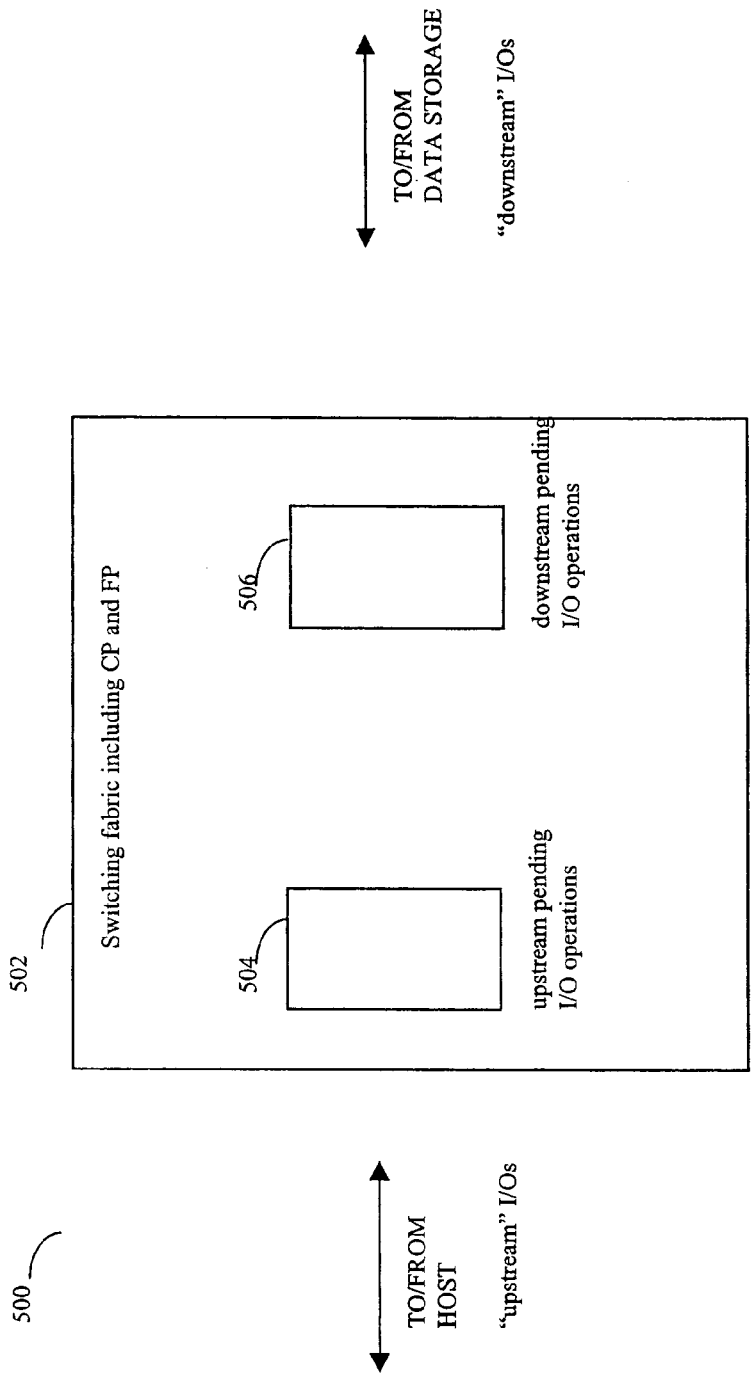
FIG. 18 is an example of an embodiment illustrating the pending I/O lists within the switching fabric as maintained by the CP and FP.

Referring now to FIG. 18, shown is an example of an embodiment of I/O operations and the switching fabric. In particular, the example 500 illustrates the use of "upstream" and "downstream" I/O operations and pending I/O lists with respect to the previous descriptions herein. An I/O operation incoming to the switching fabric, such as a from a host, may be referred to as an "upstream" I/O operation handled by the FP or CP. A "downstream" I/O operation is an I/O operation that is initiated by the FP or CP to the data storage system in connection with processing an upstream I/O request. For example, a received Write I/O request may result in a plurality of downstream I/O requests in accordance with particular protocols and message exchanges in each particular embodiment.

The FP in one embodiment described herein may include functionality in mapping logical or virtual devices to physical devices. This may be accomplished using the FP mapping table entries, including the LBA Rmap and Storage Redirect tables described herein. Also included in the FP is a list of pending I/Os which may be used in connection with error recovery operations. Operations that cannot be performed by the FP may be faulted to the CP for processing.

In one embodiment, the FP may use the following API when interacting with the CP in performing various processing steps as described elsewhere herein. Other embodiments may use other APIs for CP/FP communications than as described herein.

The CpMappingMiss( ) routine may be called from the FP to indicate to the CP that a particular I/O could not be mapped by the FP. As a result, the CP may return CONTINUE, IGNORE, or QUEUE. CONTINUE includes a new virtual device mapping from the CP which may have been added, for example, to the FP mapping table. IGNORE indicates that no mapping is valid for this particular I/O operation and the FP should take appropriate action. QUEUE indicates that the I/O operation should be queued to the CP for manual processing via CpQueueIO described elsewhere herein.

CpQueueIO( ) is called by the FP to the CP to queue an I/O request, for example, as may be received from a host, for manual processing by the CP. The CP may manually dispatch supporting "downstream" I/Os (between the switching fabric and the storage for example). The CP will subsequently set the I/O completion status, for example, as may be returned to the issuing host, and call FPQueueIOComplete to complete the "upstream" I/O back to its initiator.

CpDispatchIOComplete( ) indicates to the CP by the FP that a "downstream" I/O initiated with FPDispatchIO, described elsewhere herein, has completed. The FP has already set the downstream I/O completion status for return to the CP.

Following are some APIs that may be called from the CP to the FP in connection with performing various operations described herein.

FPDiscover( ) to return a list of physical devices which the CP may access for storage operations.

FPExpose( ) to "expose" a virtual device making the device available for storage operations.

FPHide( ) to hide a device.

FPAddMapping( ) to add a new mapping entry to the FP cached tables.

FPReplaceMapping( ) to reuse an existing mapping entry in the FP. An embodiment may use a locking mechanism to ensure that a mapping entry is not removed while still in use.

FPRemoveMapping( ) to remove an entry from the FP tables.

FPQueryPendingIOs( ) returns a list of pending I/Os from the FP.

FPAbortPendingIOs( ) to abort a pending I/O included in the FP

FPQueryStatistics( ) to return statistics from the FP. Note that the FP may keep and track statistical information in connection with performing I/O operations. This API may be used to obtain particular information.

FPDispatchIO( ) may be used to queue a downstream I/O from the CP for dispatch by the FP. This API may be used by used by the CP in manually dispatching supporting I/Os, to maintain metadata state, and to establish backend enforcement, such as administrative or other commands to storage device. The FP sets the downstream I/O completion status and a call to CpDispatchIOComplete( ) to complete the I/O back to the CP.

FPGetData( ) to obtain data from the FP for an I/O request for an I/O queued to the CP.

FPPutData( ) to set data for an I/O operation for an I/O operation queued to the FP.

FPQueueIOComplete( ) indicates to the FP that an upstream I/O queued to the CP with CPQueueIO( ) has its completion status set and the FP may complete the upstream I/O back to the initiator.

In connection with performing the I/O operations, primitives may be used in mapping an "upstream" I/O operation to one or more "downstream" I/O operations. An embodiment may include one or more primitives forming a hierarchy in which a higher level primitive may be implemented by using one or more lower level primitives. The CP and the FP may both perform all of, or a portion of, the primitives. Other embodiments may include other primitives than those that are described in following paragraphs. The goal of primitives is to define one or more basic low-level operations to avoid multiple calls, for example, by the FP or CP in performing an upstream I/O operation. These primitives should also be as flexible as possible so that the CP and/or the FP may build other complex higher level operations using these primitives. An embodiment may have the FP, for example, perform the simpler operations that may be performed with a primitive and the CP may perform more complex operations requiring use of multiple primitives.

An embodiment may include an LBA/LUN remapping primitive which is the primitive used by the FP and the CP to dispatch a received I/O to an LBA on a physical device. Additionally, this primitive also includes receiving a return data request and I/O completion status and, if successful, return success by the FP to the request initiator. Otherwise, control is passed to the CP for unmapped or unsuccessful I/Os. The LBA/LUN remapping primitive may be used in performing the virtual to physical address mapping using the Rmap and storage redirect tables described elsewhere herein. Whether an embodiment includes additional primitives depends on the functionality included in an embodiment.

For the LBA/LUN remapping primitive, the FP may accept an I/O from a host and perform a lookup using the mapping tables in the FP based on: whether it is a read or write operation, the starting and ending LBAs, and the destination or target virtual device ID. If there is no corresponding table entry, the I/O is forwarded to the CP for processing. If the I/O is Write and write operations may be performed for the particular LBA range, or the I/O is a read and read operations may be performed for the particular LBA range, then the downstream I/O is issued to the destination device, possibly with a new destination LBA. The foregoing steps are a portion of the processing steps previously described in connection with FIG. 7. Information about the I/O is recorded in the pending I/O lists described elsewhere herein. Information may include, for example, an exchange ID, that may be used by the CP if needed, for example, in connection with error processing for status return codes for the I/O operation.

It should be noted that for a read operation from a mirrored devices, the mapping tables may indicate that the read may occur from any one of N target devices. In this instance, the FP may implement a read load balancing policy.

If there is no response from a downstream device, the DVE may not know until the host (request initiator) sends an abort or a retry request. At that point, this request may be sent to the CP for error processing and redispatch a downstream I/O request. Upon completion of an I/O operation, a message is received from the downstream I/O device(s), the downstream and upstream pending I/O lists are cleaned up by removing entries as appropriate, and any success or other status is returned to the requestor/initiator, such as a host.

A second primitive, the I/O striping primitive, may be included in an embodiment that implements I/O striping. An embodiment may also perform multiple LBA/LUN remapping operations rather than use this I/O striping primitive since the I/O striping primitive is built on the LBA/LUN remapping primitive. However, there is more overhead involved in performing multiple lookups using the LBA/LUN remapping primitive than using the single I/O striping primitive. Information about the physical location of each of the disk stripes, for example, may be stored in the storage descriptor accessed by the redirect table with one access of the redirect table. The I/O striping primitive may be included in embodiments using RAID0 striping, for example.

This second primitive of I/O striping is an extension of the first primitive, LBA/LUN remapping in which a set of downstream devices may be specified and LBA computations performed by shifting and masking, for example, based on the size of the stripes. An embodiment may allocate processing of I/O operations spanning multiple stripe boundaries to the CP. It should be noted that a RAID5 format may be implemented using this second primitive for reads. In this instance, an embodiment may be initially written in RAID1 and then, using the CP, migrated to RAID5 as it falls out of use. The LBA Rmap and corresponding redirect table entries may be used to migrate the data back to RAID1 if the data was subsequently modified. In one embodiment, the write gate functionality may utilize an entry in the storage redirect table, as described elsewhere herein, such that a write operation causes a fault to the CP to migrate data back to a RAID-1 organization to allow the write operations.

An embodiment may also include a third higher level primitive called the write splitting primitive which is the ability to perform the LBA/LUN remapping of a virtual I/O and simultaneously initiate a second mapped write I/O to another physical device with the same data. This primitive may also include the ability to receive and correlate I/O completion status information from all devices written to and, if all are successful, return success to the request originator. Otherwise, control may be passed to the CP for processing. The FP performs local serialization of overlapping I/Os here for proper function.

A mapping table entry may indicate if a write operation to a particular virtual address needs to be split to one or more additional devices. When this happens, the original I/O is mapped and reissued using the first primitive. Additionally, one or more additional downstream I/Os are also issued with the appropriate mapping information for each device obtained from the mapping table. Multiple linked entries are made in the downstream pending I/O table, one for each downstream I/O. In one embodiment, the CP may use timer indicators, such as time stamps, for pending I/Os and the FP may record the fact that an I/O is pending. Time stamps may be stored with corresponding pending I/O entries when received by the FP. The time stamps may be used to indicate a relative age of the I/O operation and may be used by the CP in coordinating its own functions in connection with outstanding I/O operations. For example, prior to updating an Rmap entry, the CP determines whether there are any pending I/O operations referencing the Rmap entry. The CP waits until all pending I/O operations referencing the Rmap entry have drained prior to updating the Rmap entry. The CP may use the time stamp associated with a pending I/O operation in performing this coordination by comparing the timestamp of the pending I/O operation to the current timestamp. This may be used as an alternative to other techniques, for example, such as keeping a reference count in the FP for each of the Rmap entries which may require more storage.

A fourth and highest level primitive, the write journaling primitive, may also be included in an embodiment the extends write splitting (the third primitive) while maintaining a journal of writes that have occurred to each physical device. The journal, also described elsewhere herein, may be on media or some form of storage (for persistent resynchronization functionality). The journal may be fixed in size and writes to a full journal may be forwarded to the CP for processing. Typically, the CP will then "swap out" the full journal with an empty one so that the FP can keep running.

The destination of a write splitting operation may be either a nonjournalling device or a write journal device. A write journal may be characterized as a portion of media where a record is made of each write operation including, for example, a copy of the data, destination device and location information. Once the journal fills up, the write operation is transferred to the CP for processing. It should be noted that each FP may have its own journal to avoid locking issues between FPs.

A portion of the information needed to implement each of these primitives may be stored in the redirect table and the storage descriptor, such as related to the physical locations and policies of each system. Thus, when an incoming I/O is received by the FP, the FP may perform the I/O operation, for example, by dispatching a read or write operation using the first primitive above. If an embodiment includes striping, the FP may perform this operation using the second primitive. Similarly, if the I/O operation is to a device with mirroring, the write splitting primitive may be used. In an embodiment that includes the foregoing 4 primitives, an FP may support operations such as, for example, LUN pooling, multi-pathing, snapshots, on-line migration, incremental storage, RAID0 using I/O striping, RAID1 using the write splitting primitive to implement synchronous replication with a fast resynchronization, RAID10 using the I/O striping and write splitting, asynchronous ordered replication (AOR) using the write splitting and write journaling primitives, and others.

It should be noted that the CP may support operation of any functions not supported or performed by the FP, such as any optional primitive functionality of primitives 2-4 above not included in an embodiment.

An embodiment may implement primitives in any combination of hardware and/or software. One embodiment may implement the foregoing primitives in silicon or hardware to maximize speed. This may be particularly important, for example, in connection with FP processing since an embodiment may allocate to FP processing those I/O operations which are commonly performed. The processing typically associated with the FP may be characterized as "light weight" processing operations as well. An embodiment that allocates to the FP light weight processing operations associated with primitives and is interested in increased performance may choose to implement primitives completely in hardware.

It should be noted that in connection with performing I/O operations using the tables described in connection with FIG. 11, such as the storage redirect table, any vendor's storage descriptor may be used. In this particular embodiment, the storage descriptor information, such as an indicator for a particular vendor as to whether RAID0 or RAID1 and the like are supported, may be included in the storage redirect table 284.

In connection with the FP, caching techniques may be used such that the FP caches only a portion of the LBA map table 282 as needed. Any one of a variety of different caching techniques and policies may be included in an embodiment of the FP. For example, in one embodiment, the FP may implement an LRU or "least recently used" policy for determining which portion of the LBA map table to displace on loading a newer portion of the LBA map table. When a first accesses made to a particular volume segment or VSEG, the associated Rmap and redirect tables may be loaded into cache local to the FP. In one embodiment, the storage redirect table associated with the VSEG may be loaded along with an "empty" Rmap table that includes a single extent. Portions of the Rmap are loaded in as needed in connection with performing mapping for an I/O operation. The storage redirect table in its entirety is loaded on the first fault within the FP.

As described elsewhere herein, the LBA map table 282 is formed of one or more extents. The number of extents that are currently loaded for a particular FP may be referred to as the working set or size window. As known to those skilled in the art, a working set algorithm that may be used in connection with page replacement may be used in determining when to increase or decrease this size or window associated with the working set algorithm as used with the FP cache. It should be noted that a single extent is the smallest unit within an Rmap table.

Figure 19:
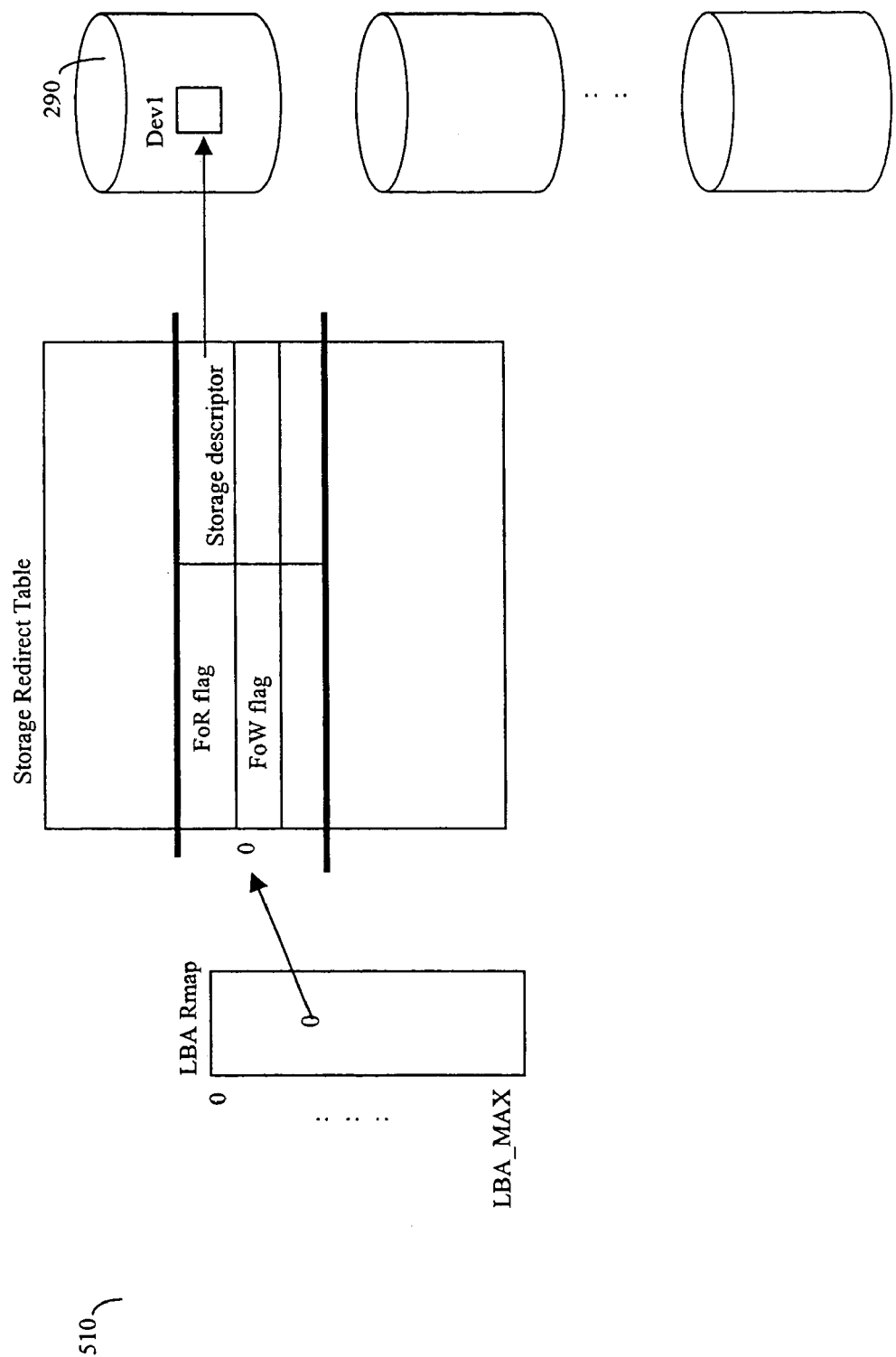
FIG. 19 is an example of an embodiment of mapping tables at initialization within the FP.

Referring now to FIG. 19, shown is an example of an embodiment of the mapping tables at initialization or start-up within the FP. Initially, the first time a VSEG or volume segment is loaded, the storage redirect table and an Rmap table having a single extent are loaded into the FP as shown in FIG. 19. As complex operations are performed, such as snapshots, migrations and the like, the number of extents within the Rmap table may increase as well as the number of entries in the storage redirect table in accordance with the different states of the different devices included in the computer system. For example, in connection with performing a migration, within the LBA map table there may be three extents to represent the states of virtualization. In particular, a first state of a first entry may represent those portions of a device that have already been migrated from one device to another, a second state of a second entry may represent those portions of a device that have not yet been migrated, and a third state may represent those portions of a device that are currently in the process of being migrated.

In connection with a snapshot operation, for example, there may be two states represented in the storage redirect table. A first state of a first entry may be associated with those portions on a device that have not yet been pushed to a snapshot device and a second state of a second entry in the storage redirect table may be associated with those portions of a device that have already been pushed to the snapshot device. A DVE may implement a copy on write operation in connection with performing a snapshot. Generally, a snapshot involves mapping two virtual volumes initially to the same physical storage. When the original virtual volume is subsequently written to, the old data that was "snapshot" is copied from the original physical storage to a backing or snapshot storage device.

In connection with FIGS. 20 and 21, what will now be described is a sample snapshot operation using the previously described VSEG mapping tables, the Rmap and redirect tables.

Figure 20:
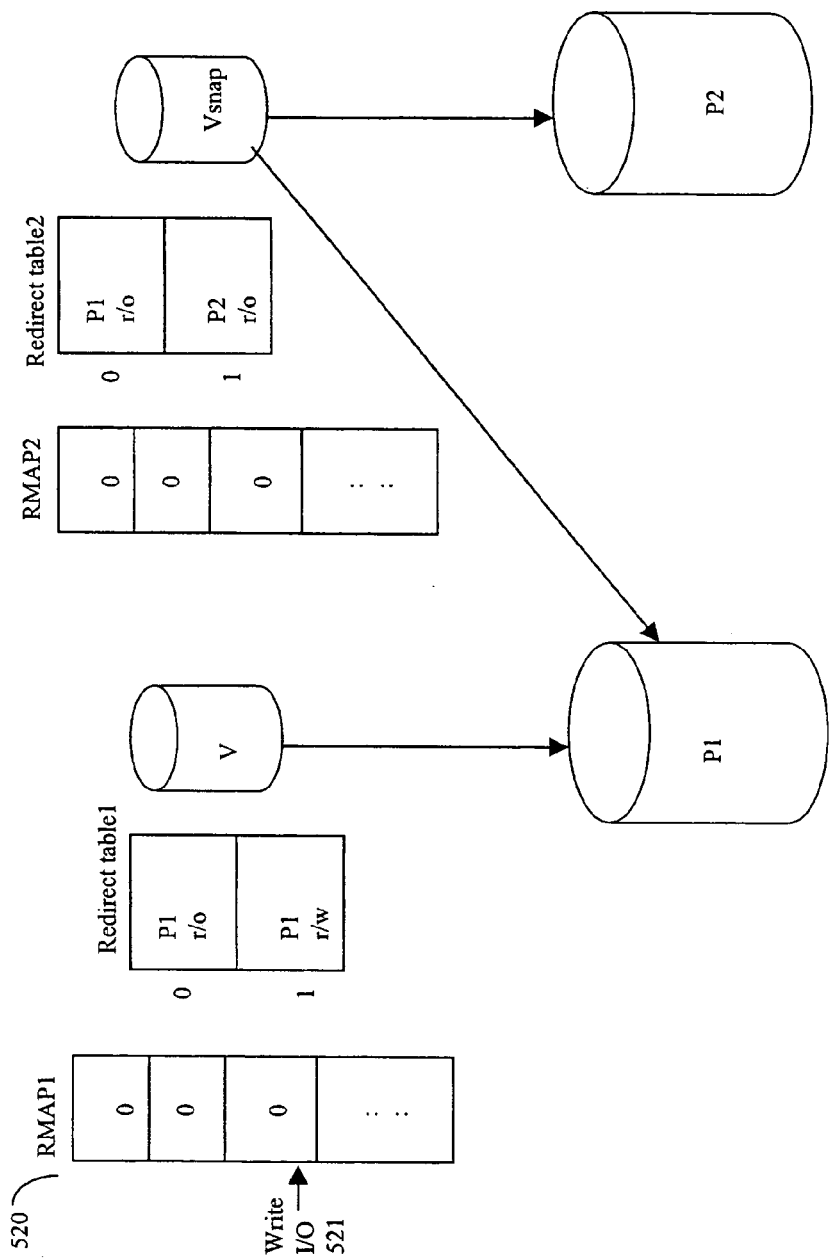
FIGS. 20-21 are examples of an embodiment of a snapshot operation within the computer system of FIG. 1.

Referring now to FIG. 20, shown is an example 520 that includes two virtual volumes V and V snap. V snap is a snapshot of the virtual volume V at a particular time T. At time T, all of V's Rmap entries in the table Rmap1 reference the redirect table1 entry zero. The redirect table1 entry zero indicates that only incoming I/O operations that are "read only" are directed towards P1. Additionally, all of V snaps Rmap2 entries reference redirect table2 entry zero also causing all "read only" operations to be mapped to physical device P1. V snap is then equal by definition to the virtual volume V. Physical volume P2 is initially unused. When a subsequent incoming write I/O operation is made to volume V as indicated by the Write I/O arrow 521 by Rmap 1 to a particular LBA address range, the FP faults to the CP since the Rmap1 entry for the corresponding logical block address (LBA) range includes zero identifying entry zero of the redirect table1.

Figure 21:
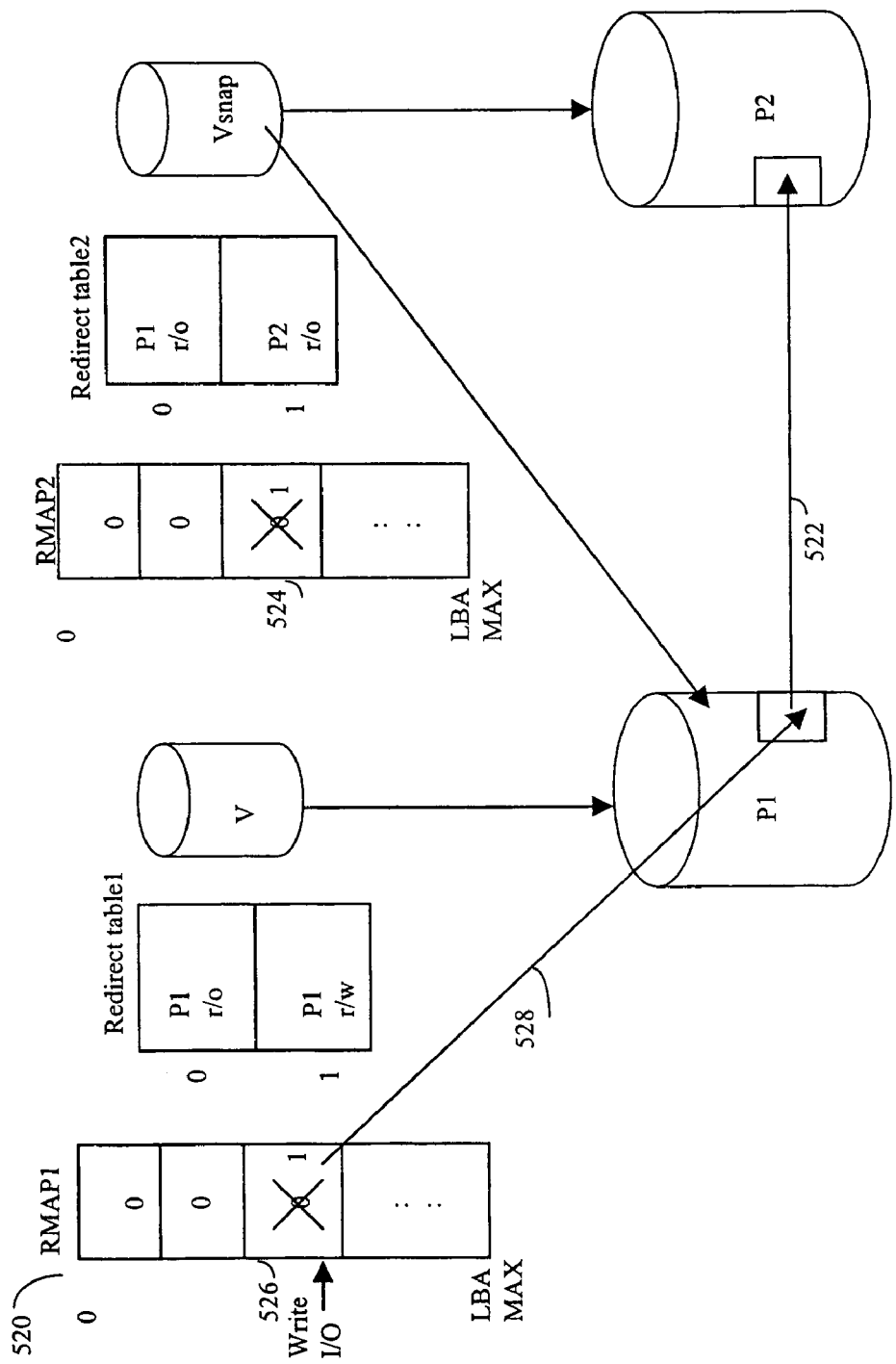

Referring now to FIG. 21, illustrated are subsequent steps involved in performing the snapshot operation in connection with the write I/O operation previously described in connection with FIG. 20. Subsequently, the CP then pushes the corresponding disk extent portion for the I/O operation corresponding to the write I/O from physical device P1 to P2 as indicated by arrow 522. The CP then changes V snap's Rmap2 entry, as indicated by element 524, from a zero to a 1 now indexing into the first entry of redirect table2. Redirect table2 entry 1 indicates that I/O operations are directed towards physical device P2 and this is for read only access thereby preserving V snap's view of the original virtual volume V data from time T. The CP also changes V's Rmap1 entry for the corresponding disk extent of the write I/O operation to identify entry 1 of redirect table 1 as indicated by element 526. Redirect table 1 entry 1 indicates that I/O operations are directed towards physical device P1 and that read and write operations may be performed to device P1. This particular write I/O operation, for example, is allowed to proceed onto device P1 as indicated by arrow 528. Additionally, any subsequent writes to that same extent in which the write I/O operation has previously been made are also allowed to proceed.

In the foregoing description, redirect table entry zero, such as redirect table1 entry 0, indicates the state of those portions of the disk that have not yet been pushed. Redirect table1 entry 1 is used and associated with those extents that have already been pushed to the snapshot device. If a write is made to a particular LBA, an entry in the Rmap table for the corresponding variable length extent is modified from a zero to a 1. It should be noted that as different write I/O operations are performed, a variable length extent may be formed in the Rmap table of a size equivalent to a particular write I/O operation. As additional data is pushed with subsequent copies on write operations, there may be neighboring extents within the Rmap table that may be coalesced or merged to form a single extent. Thus, as more write operations are performed in connection with the snapshot, there exists fragmentation within a particular embodiment of an Rmap table.

An embodiment may have a cleanup process in connection with this fragmentation of the Rmap table. In one embodiment, a completion thread may be executed and started when a snapshot actually begins. This completion thread, for example, may run as a background process within the FP and be scheduled so as not to interfere with other operations within a computer system. Generally, the completion thread may start at the top of the Rmap table at the beginning of an associated LBA range and push those portions associated with each extent that have not already been pushed to V snap. This allows for a closing up or coalescing of holes that may be created by write I/O operations. As the completion thread works its way through the Rmap table, it performs writes of any portions of the corresponding VSEG address space that have not been already pushed to the snapshot device.

At any particular time, the completion thread may be at a particular point P within the virtual address range [0 . . . LBAMAX] as represented by an Rmap. At this point P, the state of the LBA range up to point P may be represented in an Rmap by a single entry or single extent. This single extent corresponds to that portion or entry in the redirect table indicating that the data had already been copied to V snap. The source, or V's mapping tables, reference the source storage which in this case is P1 either through a read only or a read write redirect indicated by the LBA range in the Rmap1 depending on whether the snapshot data has already been pushed to the destination or not. The target or snapshot device's mapping tables, which in this example are Rmap2 and storage redirect table 2, indicate either the source storage P1 if the snapshot data has not yet been pushed, or the destination storage P2 if the data has already been pushed to the snapshot device.

As part of any cleanup or compression process described herein, entries in the storage redirect table may be combined if duplicates, and may also be removed once an operation is complete such that there are no longer any portions of a device in the state represented by a particular entry.

Mappings may be modified synchronously prior to the host completing. In the instance where multiple VE's write to the same source volume, only one of them at a time performs write operations. In the VE "fault handler", each VE must acquire a lock (an oplock for the LBA range of interest, as described in more detail elsewhere herein) and in doing so, will prevent "concurrent faults" to the same LBA range on other VEs. The first VE that acquired the lock handles the fault, pushes the snapshot data, and updates the LBA Rmap. All subsequent VEs, upon inspecting the LBA rmap, see that the data has already been pushed with the LBA Rmap also updated. The particular locking mechanism used in connection with this as well as other types of accesses is described elsewhere herein. As described elsewhere herein in more detail, the mapping tables are included in metadata that may be subject to modification by one or more processes in the computer system of FIG. 1. A locking technique may be used in connection with synchronizing accesses to shared metadata.

Figure 22:
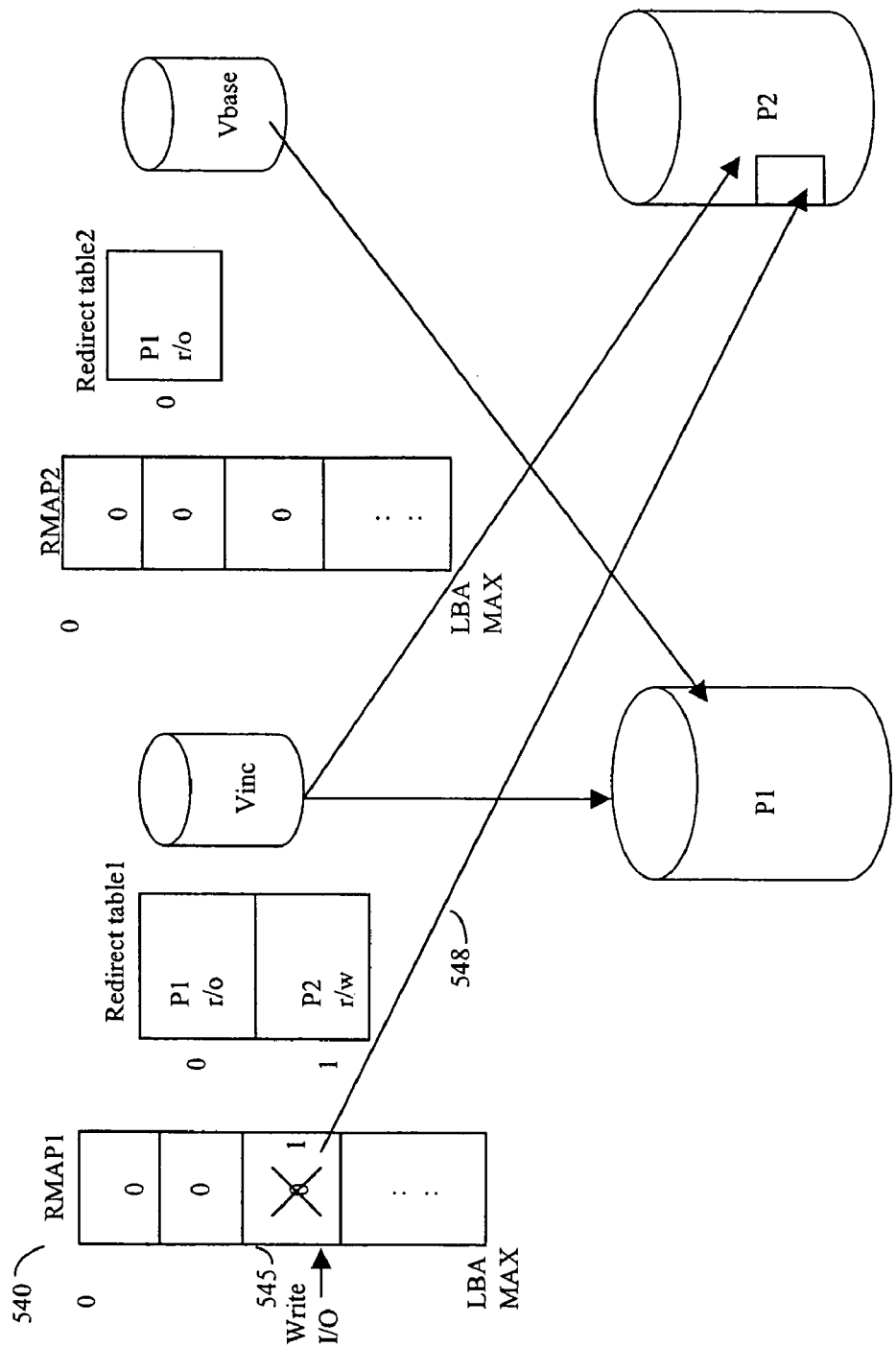
FIG. 22 is an example of an embodiment of an incremental operation of a virtual volume within the computer system of FIG. 1.

Referring now to FIG. 22, shown is an example 540 of how an incremental of a virtual volume may be implemented in connection with using the Rmap and redirect tables as included in the VSEG described elsewhere herein. The incremental of a virtual volume is similar to a snapshot operation by involving initially mapping two virtual volumes to the same physical storage. However, unlike the snapshot operation described previously, subsequent modifications to an original virtual volume may be stored in a private backing store rather than on an original physical volume. With an incremental operation, the original physical volume becomes read only. The fact that an original physical volume is now read only allows multiple incremental virtual volumes to be based on the same original physical volume all of which continued to be read write without adversely impacting each other. Incrementals may be used to allow multiple instantaneous copies of a single virtual volume to seamlessly diverge in time. Although the example 540 that will be described shows only a single incremental virtual volume, any number of incremental virtual volumes may be included in an embodiment.

It should be noted that in connection with FIG. 21, redirect table 2, entry P2 may be read/write rather than read-only allowing data to be directly written to the device P2. This allows an embodiment to utilize the incremental approach on the destination of the snapshot.

The incremental virtual volume in this example is denoted as V Inc and the original physical volume is denoted as V Base. When an incoming write operation is directed to an LBA having a corresponding Redirect table 1 entry of 0, as indicated by the write I/O operation to 545, a fault to the CP occurs because it is indicated by entry 0 of Rmap1 that only read operations are allowed to device P1 as may be performed by the FP. For all other operations, fault to the CP. The CP then modifies the entry in Rmap1 table as indicated by entry 545, from a zero to a 1, to allow read write operations to occur to device P2. By performing this operation of modifying the entry in the Rmap1 table from a zero to a 1, the write operation is "redirected" via the redirect table 1, to physical device P2. The write operation is then allowed to proceed as indicated by arrow 548.

Using the foregoing techniques, V Inc and V Base are initially set to the same physical storage. When an incoming write I/O operation occurs, the new data is rerouted to a second physical device. In connection with incremental operations, old data from V Base is not pushed. Rather, any new or incremental data is simply rerouted to an incremental or second device which in this case is indicated by VInc.

Figure 23:
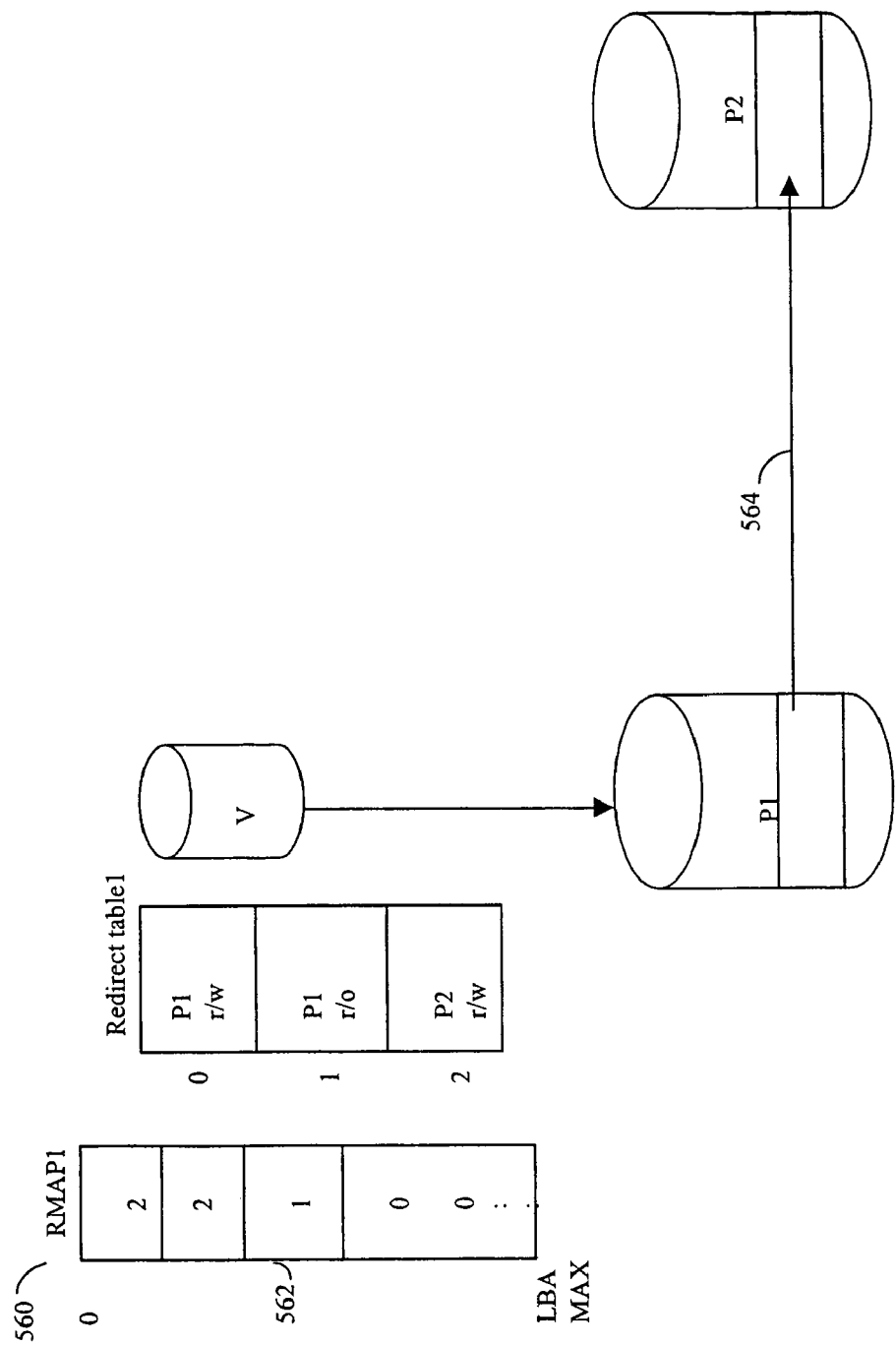
FIGS. 23 and 24 are examples of an embodiment of online migration.

Referring now to FIG. 23, shown is an example 560 using the Rmap and redirect tables of a VSEG in connection with performing an online migration. An online migration operation of physical storage for a virtual volume involves the use of a copy agent that may be included in the CP and three entries in the storage redirect table indicated in the redirect table 1 in this example. Entry 0 of the storage redirect table 1 indicates that for device P1, read and write operations are enabled. Entry 0 represents a state of data that has not yet been migrated from device P1 to P2. Redirect table entry 1 represents a state of data which is in the process of currently being migrated. Redirect table 1 entry 2 represents a state of data that has already been migrated. Using these three states of the redirect table1, the number of extents indicated by Rmap 1 may include at most three extents. The first extent are all of those portions of the Rmap 1 table indicated by entry 2 of the redirect table corresponding to data that has already been migrated. Data in the second extent represented by redirect table1 entry 1 may be referred to also as the copy barrier which indicates that portion of the data which is currently in the process of being migrated. Any data subsequent to that in a particular LBA range is indicated as being associated with redirect table entry zero representing that data which has not yet been copied.

It should be noted that the size of the second extent, for example as indicated by entry 562, may represent the granularity of the data that is currently being copied or migrated.

Referring to example 560, there is a single virtual volume V and two physical volumes P1 and P2. The CP is currently migrating data from physical volume P1 to P2. The CP is responsible for establishing a copy barrier range by setting the corresponding disk extent to having a redirect table entry of 1 indicating a read only operation for device P1. This is indicated by the entry 562. The entry 562 has a redirect entry 1. The CP then copies the data-in the copy barrier range from device P1 to P2 as indicated by the arrow 564.

Figure 24:
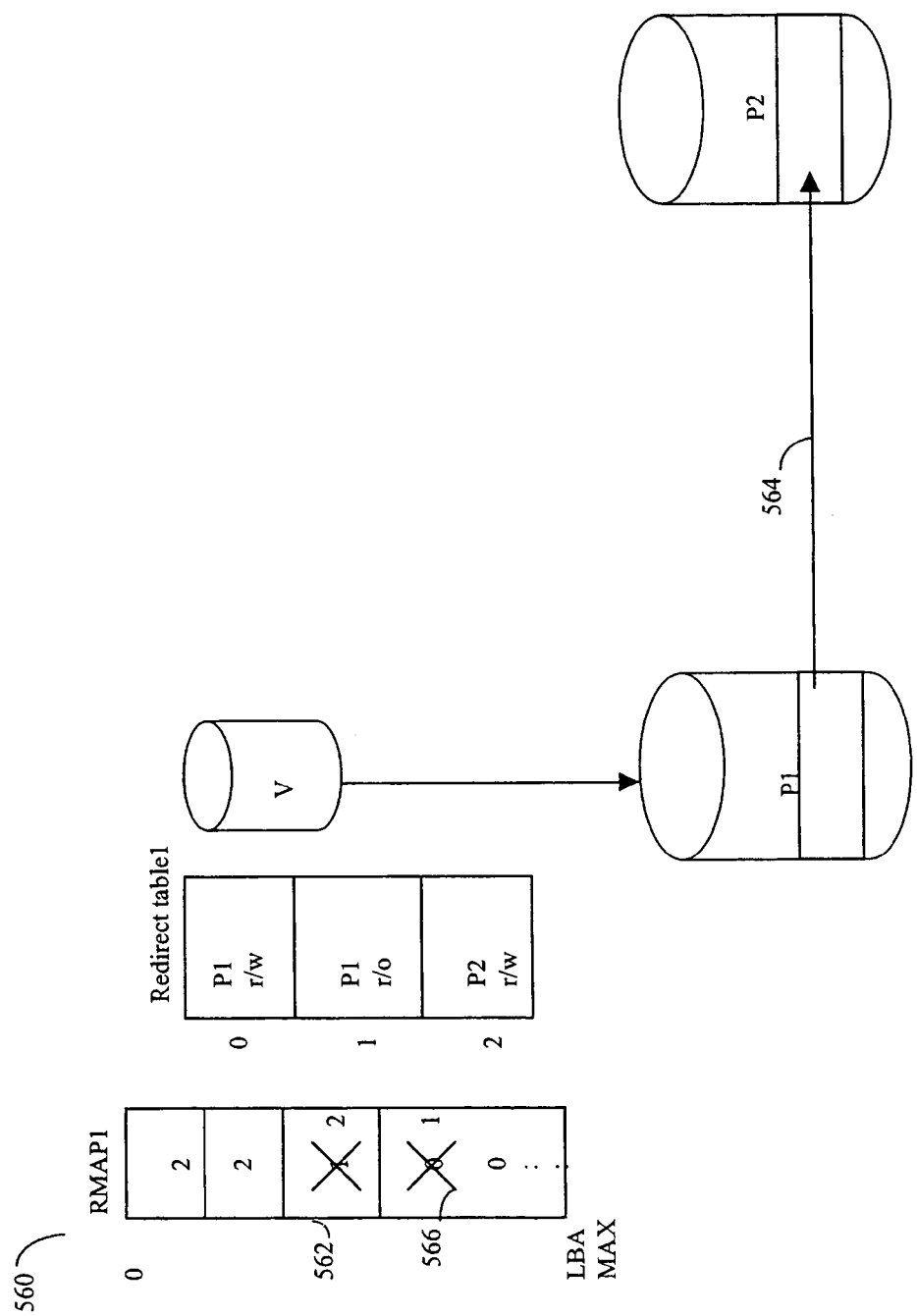

Referring now to FIG. 24, the CP may then advance the copy barrier range by 1) setting the rmap entry 562 to 1, 2) copying the data from P1 to P2, and 3) setting the rmap entry 566 to 2. Setting a corresponding disk extent indicated by the entry 562 in the table to refer to redirect table entry 2 causes read and write operations to proceed to the second device P2. Any data that has already successfully been migrated to device P2 is accessed through table entry 2. Any data that has not yet begun being migrated to the physical device P2 is accessed through table entry zero with read write operations to P1. Data that is in the process of being migrated within the copy barrier range is accessed through entry 1 with read only operations to device P1. This means that any accesses before or after the copy barrier range, as well as reads to the copy barrier range itself, are satisfied through the FP to P1 or P2. Only a write operation being performed to the copy barrier range itself is actually faulted to the CP to be later retried once the copy barrier range moves to a subsequent extent of the Rmap. The migration is complete when the entire Rmap1 references entry 2 of the redirect table1 at which time entries zero and 1 may be deleted or removed from the redirect table1.

It should be noted that in connection with pushing data for a snapshot or a migration, the granularity of data that is actually copied may vary in accordance with each particular embodiment. In one embodiment, for example, the amount of data pushed in a single instance may be a 64K byte size. Generally, when an incoming I/O operation occurs, it's size may be "bounded" in accordance with a granularity associated with data copy operations. In other words, even though a write operation may be, for example, writing a 10K byte block of data, the smallest amount of data that may be copied in connection with a snapshot or a migration may be a 64K byte block of data. Thus, the 10K byte write I/O operation may be bounded within a 64K byte block of data that is actually copied. The granularity size is 64K bytes in this example and may vary in accordance with each particular embodiment.

As described herein, data such as metadata, that may be used by FPs as well as by CPs within a single DVE may need to be coherent. Additionally, the same global metadata may be accessed for update by multiple DVEs also requiring synchronized access. Different types of synchronization and/or locking mechanisms may be used in performing intra-DVE and inter-DVE synchronization to manage the data coherency between copies of metadata.

Within a DVE, a single CP may manage one or more associated FPs to maintain CP and FP data coherency and synchronization, for example, in connection with metadata associated with a virtual volume descriptor, such as the RMAP and storage redirect tables. The CP may communicate with the one or more FPs and, for example, request that one or more FPs remove entries from their local FP caches. The FP and the CP may communicate using one or more APIs as also described elsewhere herein in connection with performing metadata accesses. In one embodiment, only CPs may modify global metadata that may require the CP to gain exclusive access over a portion of the metadata using a locking technique described in more detail elsewhere herein. Accesses to metadata may also involve reading, for example, which does not necessarily require exclusive access by a particular CP.

It should be noted that within a single DVE, there may be a plurality of CPs. However, an embodiment may have only a single CP active at a time. Other CPs may be included, for example, for redundancy and fault tolerance in case of CP or other failures. Accordingly, a single DVE may have a one-to-one relationship with a CP at execution time. It should be noted that this relationship may change over time, for example, when a CP fails. In discussions that follow, a CP may be used interchangeably with a DVE for purposes of this one-to-one relationship. For example, the foregoing paragraphs state that DVEs may communicate using a messaging protocol which means that CPs of each of the DVEs may communicate.

It should be noted that an embodiment may select to minimize the number of CPs such that there may be reduced inter-CP communication, for example, in connection with performing operations requiring cluster-like communications between CPs as described elsewhere herein. An embodiment may include multiple CPs within a single DVE to share the load within a single DVE, but from a viewpoint external to the DVE, there may be a single CP.

Figure 25A:
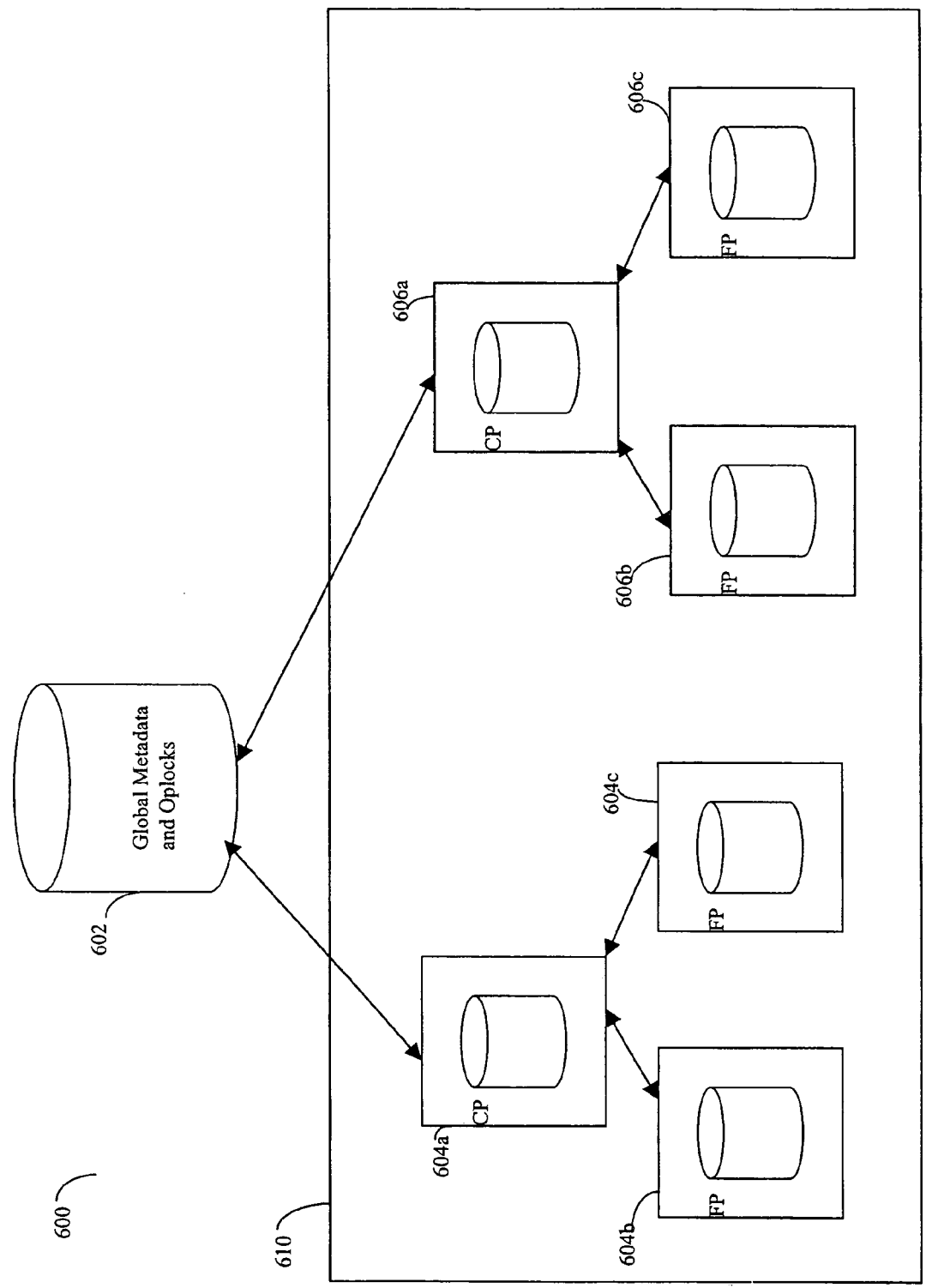
FIGS. 25A and 25B are examples of an embodiment of metadata.

Referring now to FIG. 25A, shown is an example of an embodiment 600 of how metadata may be distributed in an arrangement in the computer system of FIG. 1. It should be noted that although only a single DVE 610 is shown, an embodiment as described elsewhere herein, may include multiple DVEs each having a plurality of CPs and associated FPs. Also included in the embodiment 600 is a set of global metadata and oplocks 602. Included in the store 602 is global metadata which is maintained coherently between each of the CPs, for example, in connection with performing a write of particular metadata by a CP. Oplocks, which are described elsewhere herein, are the mechanism by which access to global metadata is synchronized and controlled to maintain data coherency of the metadata being accessed, for example, by multiple CPs in connection with write metadata operations. Each of the CPs, such as 604a and 606a, include may cache a local copy of metadata which may be a portion of the global metadata.

Each of the CPs may be associated with one or more FPs, for example, such as CP 604a may be associated with two FPs, 604b and 604b. Each of the FPs may also maintain in a local FP cache a portion or a subset of the metadata. In one embodiment, the FP caches the storage redirect table and a portion of the Rmap table that the FP is currently using. Caching techniques that may be used in an embodiment of an FP are also described elsewhere herein. The CP maintains cache coherency between the FP cache contents and the contents of the CP's own cache.

The arrangement 600 in FIG. 25A illustrates a hierarchical data arrangement in connection with metadata that may be included in an embodiment. The CP and its associated FPs maintain master/slave vertical coherency from the CP to the FP. In other words, any mappings found in the FP mapping tables are guaranteed to be valid by the CP which itself has populated the FP tables. Essentially, the FP mapping table is a cache or a subset of a portion of the information available within the CP. Additionally, CPs, of which there may be many, for example, in a distributed system, may maintain peer-to-peer horizontal coherency between themselves. In other words, they agree cooperatively using, for example, cluster semantics on what mappings are valid. In one embodiment as will be described herein, membership management and distributive techniques may be used in connection with the cluster-type environment. Each CP may be thought of as having a globally coherent copy of a subset of an authoritative mapping table and each FP as having a locally coherent subset of the table maintained by the CP with which it is associated. CPs may communicate with each other when necessary and scale horizontally in a symmetric distributed system. Each FP communicates with its associated CP. The FPs form an asymmetric distributed system off of each of the CPs.

As also described elsewhere herein, only the CP in one embodiment modifies the metadata information. The CP handles all I/O errors, all coherency and synchronization with other CPs, through the use of metadata and all inter-volume coherency. All errors returned to a host originate from the software CP. The FPs are not involved in synchronization or coherency issues in connection with the metadata. The CP, in direct contrast, is intimately involved in the synchronization and coherency of the metadata.

Intra-DVE locks are used to ensure only one thread within a DVE is modifying or accessing global metadata at a time. Inter-DVE locks are used to ensure that only one DVE is modifying or accessing a portion of global metadata at a time. Therefore, true mutual exclusion, from all threads on all DVEs, is obtained when a thread acquires both the intra-DVE and inter-DVE locks protecting a piece of global metadata.

In one embodiment, the intra-DVE locking technique may use mutual exclusion thread locks that may be included in a particular platform and may vary with embodiment in accordance with the functionality provided. Intra-DVE locks may be based upon metadata apportioned using the variable length extents described, for example, in connection with the Rmap table and the storage redirect table which are divided into variable length extents in RAM as used with mapping. The intra-DVE locks may be associated with each portion of metadata accessible for global access to maintain control of metadata within a DVE. As described elsewhere herein, there may be many processes within a single DVE competing for a single lock, such as sweep threads, migration threads and the like, all executing simultaneously. The intra-DVE locking mechanism is local to each DVE and may be stored in volatile storage, for example, such as RAM, rather than a form of persistent non-volatile storage, such as on media or disk, for use in connection with system failure and recovery operations. In one embodiment, critical sections may be used to implement exclusive access for intra-DVE locking. The critical sections may be used to lock a range of an rmap between contending threads. Other embodiments may use other techniques in connection with implementing an intra-DVE locking mechanism that may vary in accordance with each embodiment.

Figure 25B:
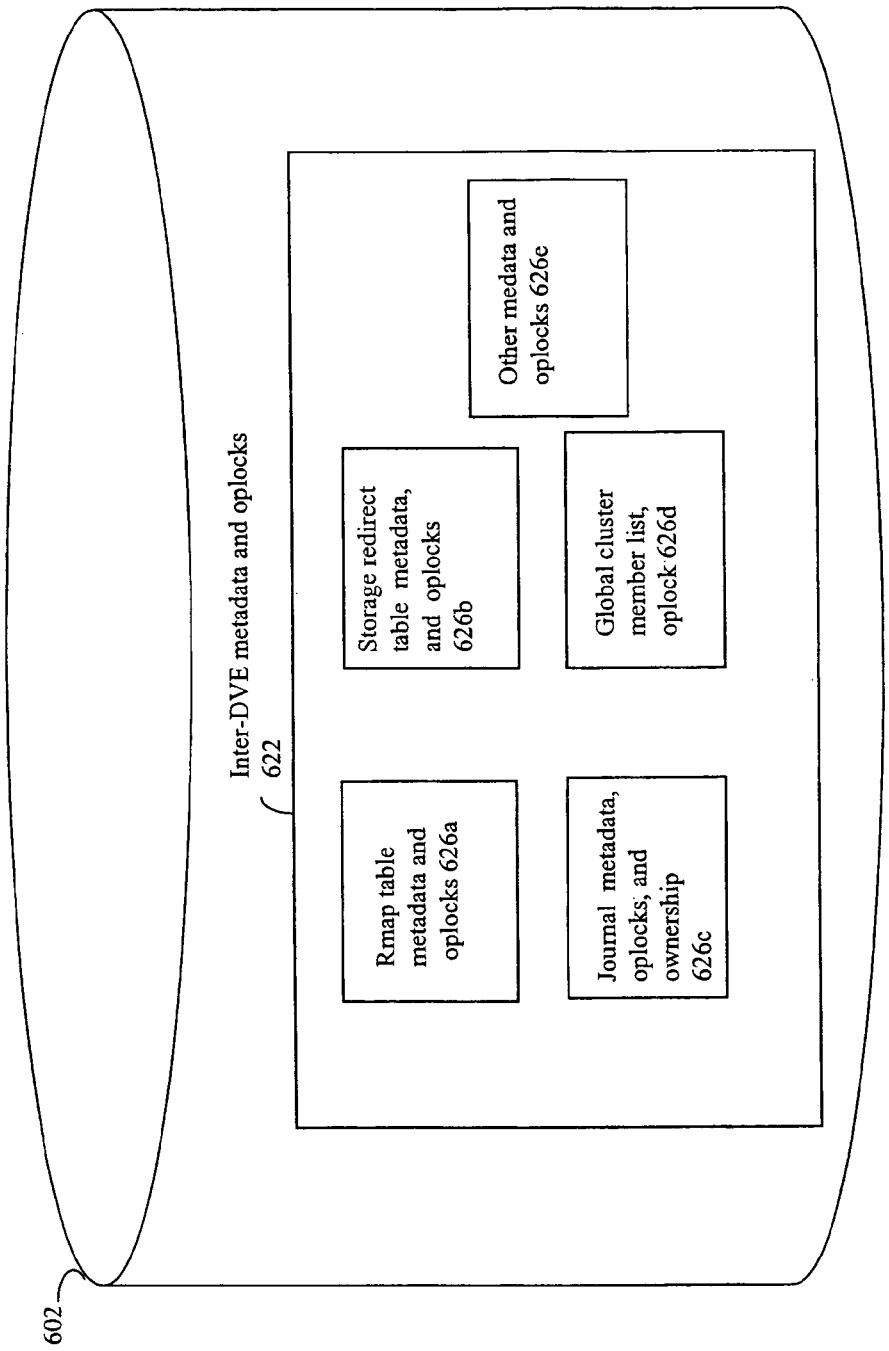

Referring now to FIG. 25B, shown is a more detailed representation of one embodiment of the global metadata and oplocks included in the global metadata and oplocks store 602. Included are examples of some of the inter-DVE oplocks and metadata 622. It should be noted that as described elsewhere herein, oplocks may be used as an inter-DVE locking mechanism in contexts for synchronization without being associated with metadata, such as with mirror write serialization operations. When a CP wants to modify a portion of metadata, the CP first acquires the corresponding intra-DVE lock and then acquires the inter-DVE oplock and corresponding global metadata. Each piece of data that is globally accessed by multiple DVEs may have an associated oplock.

Included in the global storehouse 602 may be, for example, LBA Rmap table metadata and oplocks 626a, storage redirect metadata and oplocks 626b, journal metadata and oplocks 626c, and global cluster membership, oplock and ownership 626d. The journal metadata and the global cluster membership are non-volatile. As described herein, a portion of data may be either volatile or non-volatile. Associated with each portion of data may be an oplock that is either volatile or non-volatile. Non-volatile data is recorded in some form of permanent storage that retains its state, for example, when there is a failure. For non-volatile oplocks, ownership information is recorded in an oplock journal also stored in metadata.

The LBA Rmap or rmap table metadata and oplocks 626a includes rmap metadata and associated oplocks. As described elsewhere herein, rmap metadata is non-volatile metadata because upon failure, a node performing clean-up operations needs to know, for example, which portions of an LV have already been migrated. For non-volatile oplocks, ownership information may also be recorded indicating which DVE is the current "owner" that has acquired the oplock. This may be used in connection with performing data recovery operations described elsewhere herein.

The journal metadata and oplocks 626c includes journal metadata and oplocks. A single journal may be associated with each DVE describing or journaling the operations performed by, or in the process of being performed by, each DVE as known to one of ordinary skill in the art. The journals may be stored in global storehouse 602 in non-volatile storage since these journals may be played back and used in performing data recovery. For example, a first DVE may "clean up" after a second DVE goes off-line. The first DVE may walk through the operations the second DVE was in the process of performing. Once the first DVE is done, the journal associated with the second DVE may be released. If the second DVE comes on-line/alive, prior to the first DVE completing the clean-up, the second DVE will have to wait until its journal is released by the first DVE. If the journal is not released in a timely manner, the second DVE may evict the first DVE from the cluster, and inherit its own journal back, as well as that of the newly failed first DVE.

As described elsewhere herein, the global storehouse may also include oplocks used for inter-DVE synchronization which may or may not be used in protecting associated metadata. The global storehouse may also contain other global metadata protected using other types of inter-DVE locking mechanisms. It may also contain global metadata that is not protected by a lock, for example, when machine instructions accessing the global metadata implicitly lock the data.

It should be noted that the global metadata and the oplocks 602 may be stored in any one of a variety of different locations. For those oplocks that are non-volatile, a persistent storage location may be used to store the oplocks, ownership and associated information used in connection with performing data recovery operations. The global metadata and the oplocks may be stored in any location and may be provided by a service, for example, in connection with APIs, to modify and access the data. It should be noted that within a particular embodiment of a computer system, there may be multiple information stores including multiple copies, as well as different portions of, the global metadata and oplocks 602.

Communications between DVEs in which there is one CP active per DVE, such as in a peer-to-peer relationship, is described in more detail elsewhere herein. What will now be described is the process of coherently maintaining data between a CP and each of its FPs.

In the process of, for example, removing or modifying an entry from a global mapping table, each CP must insure that each of its slave FPs have already removed the entry from their own FP tables after obtaining the corresponding locks, such as intra-DVE locks and inter-DVE oplocks. Note that adding entries to an FP mapping table can be done as needed since the worst case is that there is no matching entry and the I/O would be handled by the CP.

The CP may coherently modify an FP table entry from an upstream source to a downstream destination by first deleting the old FP table entry, such as an entry, for example, may be that used in connection with an RMAP or the storage redirect table. By deleting the old FP entry, new I/Os are prevented from being started with the old mapping. Any subsequent initiations or accesses to this particular entry from the upstream source will be forwarded to the CP as a fault will occur in the FP since there is no current entry. Next, the CP may query the FPs pending I/O list to determine if there are any I/Os that are outstanding on the downstream pending I/O list for this particular FP entry. If there are any pending I/Os, the I/O operations may be aborted and the entry in the pending I/O table may also be deleted or removed, or the CP may wait for those operations to fully complete. This prevents pending I/Os from resuming or henceforth completing using the old mapping. The CP may delete its own copy then of a particular entry in a table. The CP may then further synchronize with the other CPs, such as using messaging, to make the new CP entry valid and modify, for example, the global metadata using the inter-DVE oplocks. Subsequently, the CP modifies its own copy of the data and traditionally updates any copy of this particular table entry in each of the FPs.

There is a potential problem when a mapping is changed while I/Os are outstanding, for example, when an I/O is dispatched to a downstream device as a result of a mapping. The I/O has not yet completed but the mapping has changed and the mapping table entry is deleted. This problem may occur because there is no positive acknowledgement to an abort command and the DVE may not be sure that the I/O is not still being processed. This problem may be referred to as the ghost I/O problem in which I/Os, such as write operations, may be initiated by a DVE but not complete prior to a DVE going off line, or being unavailable. An embodiment may attempt to prevent such I/Os from completing. When a DVE failover occurs, an embodiment may attempt to abort ghost I/Os using any one or more of a variety of different techniques having different associated costs-and conditions. For example, an embodiment may abort all I/O operations for a particular target device, or initiated by a particular device for a specified time period. This may be performed by coordinating with other DVEs to stop I/O operations in accordance with certain conditions. Subsequently, messaging, as described elsewhere herein, may be used to coordinate a restart of sending I/O operations among DVEs. If any I/O operations have been aborted that should not have been, the initiator may subsequently detect the abort and reissue the I/O operation. Other techniques may be employed in an embodiment.

In one example in connection with accessing the global metadata and the oplocks, a host may issue a write I/O request causing a fault to the CP. The CP may then obtain exclusive access to a particular portion of the global metadata by obtaining the intra-DVE and inter-DVE locks needed. As will be described in more detail elsewhere herein, the CP communicates to those CPs using only the particular portion which the first CP wishes to lock.

Portions of metadata may have an associated inter-DVE oplock. Additionally, there may be a list of those nodes that maintain a copy of the metadata locally in memory of all of the DVEs that are caching that particular metadata. In order for a CP to modify a particular piece of global metadata, it obtains the corresponding oplock for that metadata by obtaining permission through messaging techniques described elsewhere herein.

Included in the global metadata 602 are RMAPs and storage redirect tables each having associated volatile oplocks. One point to note is that the LBA RMAP or RMAP tables of a volume segment descriptor include variable length extents when represented in memory. However, the metadata RMAP is divided into fixed size portions or chunks rather than variable length extents. Similarly, each oplock or locking mechanism is associated with a fixed corresponding RMAP portion. The variable length extents included in an RMAP, for example, as may be maintained within a CP or an FP may be mapped to one or more fixed size chunks within the global metadata. In order to modify, for example, RMAP information associated with a variable length extent that stands three chunks or portions, the CP obtains the volatile oplocks for the fixed size portions associated with the corresponding metadata.

Figure 26:
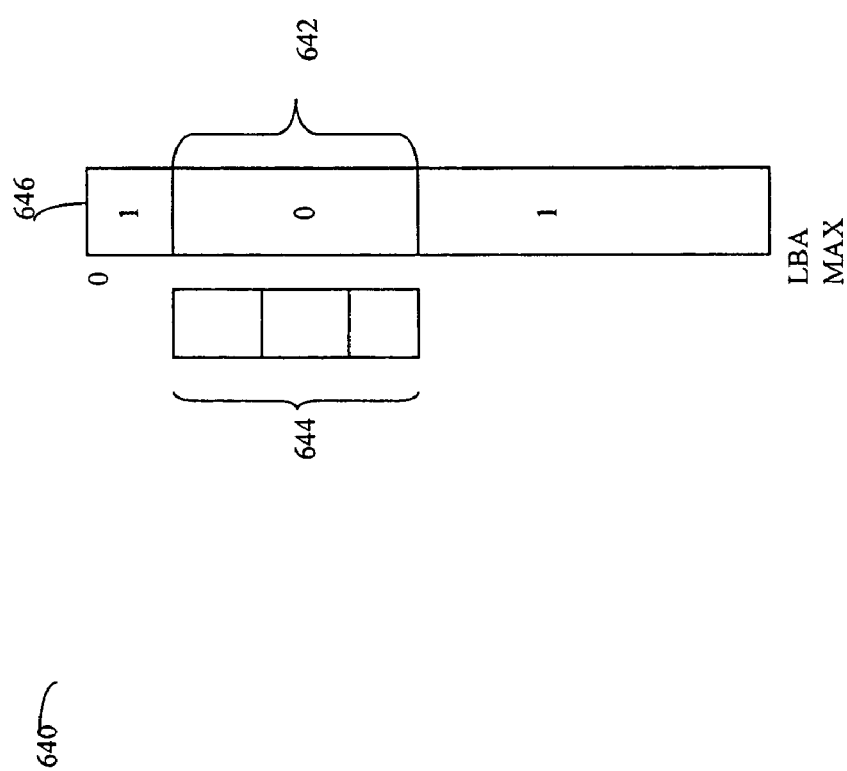
FIG. 26 is an example of an embodiment of how a variable size extent maps to fixed portions of metadata.

Referring now to FIG. 26, shown is an example 640 of how a variable size extent may map to one or more chunks or portions. The illustration 640 shows an RMAP 646 that includes three extents of variable lengths. Extent noted by element 642 may need to be accessed by a CP, for example, in connection with modifying the contents of the RMAP referring to a particular entry in the storage redirect table. In order for a CP to modify the value denoted in the RMAP 646 by element 642, the CP obtains access to the oplocks corresponding to the portion 644. The portion 644 represents three fixed size segments or portions each having their own associated oplock. The CP obtains each of the three oplocks associated with the portion 644 in order to modify the global metadata corresponding to portion 642 which it may store locally within the CP itself.

The boundaries of a particular oplock may be referred to as lock boundaries. In the event that a CP wishes to obtain the lock for a portion of metadata that does fall evenly on an oplock boundary, the CP may obtain the oplock to the next successive boundary including the LBA range desired.

Figure 27:
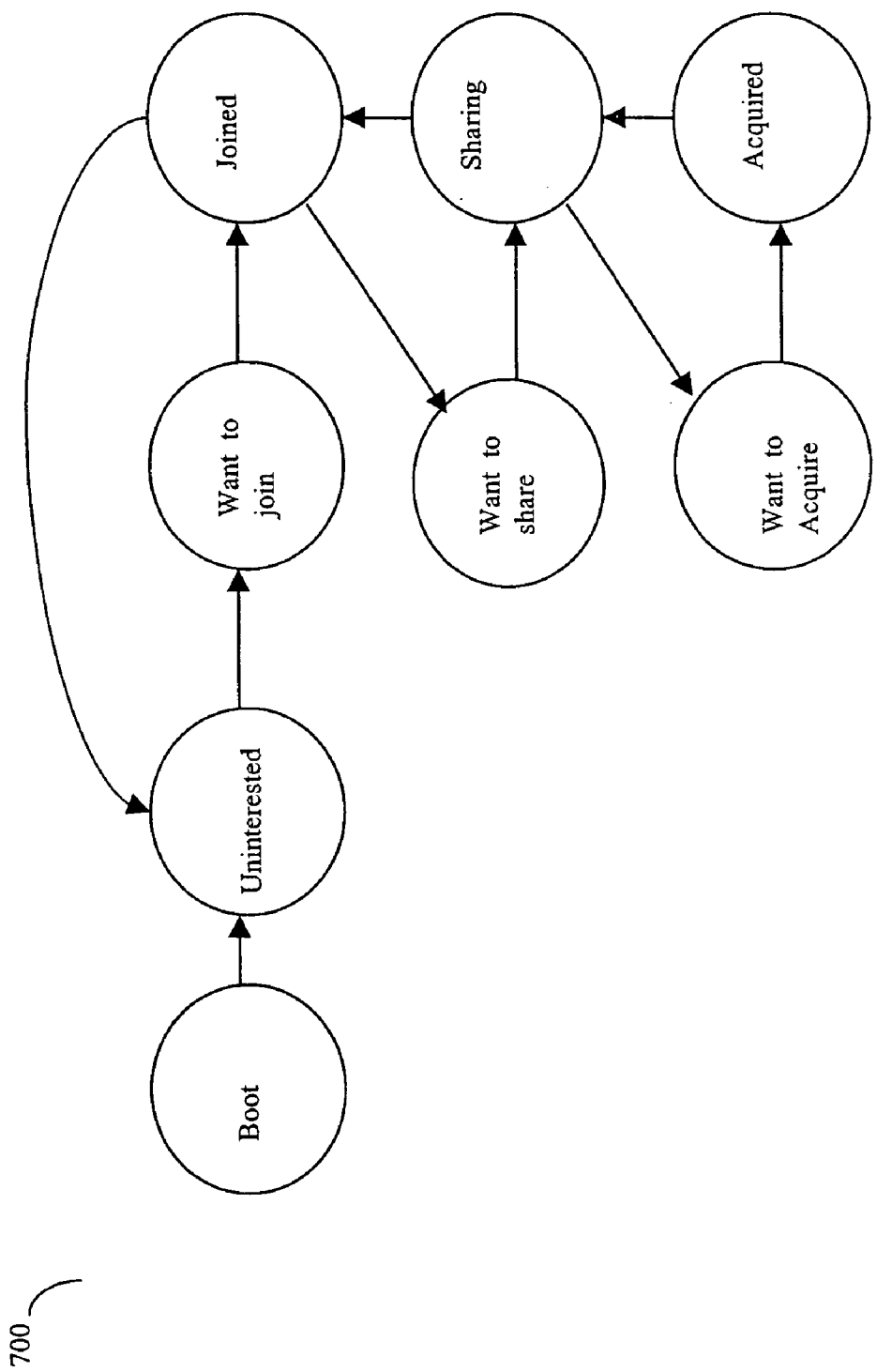
FIG. 27 is an example of a state transition-diagram that may be associated with a distributed virtualization engine (DVE)

Referring now to FIG. 27, shown is a state transition diagram 700 of the different states that may be associated with a particular oplock within a particular DVE. Associated with each of the different oplocks for each particular piece of metadata, a list of DVEs in a particularly relevant state may be maintained. This may be stored in volatile memory local to each DVE. For example, in connection with performing a write operation, it may be desirable to know who is sharing or using a particular portion of metadata. When a DVE initially boots or starts up, it progresses from the boot to initially the uninterested state where it is not part of the cluster and does not care to know or be communicated with regarding metadata modifications. The DVE may then want to join the cluster and progress to the joined state. When in the joined state, a DVE is part of the cluster but has not yet begun using or accessing any of the metadata the oplock may be protecting. From the joined state, a DVE may want to move to the sharing state to indicate that they are caching or accessing metadata that the oplock may be protecting.

Sharing, for example, may be associated with performing a read operation and accessing that part of the metadata. From the sharing state, a DVE may want to acquire the particular oplock or other type of lock associated with that particular metadata for example in performing a write of the metadata associated with, for example, an RMAP table entry. This DVE may then progress to the acquired state.

In order to communicate with other DVEs in connection with transitioning between these different states, different messages may be exchanged or broadcast between DVEs when a DVE wants to change its state, such as, for example, acquire a lock.

In one embodiment associated with the foregoing states, a "join" list and a "share" list may be maintained locally in each DVE in volatile memory. Each DVE may use its own list, for example, in determining to what other DVEs to send an acquire message request. As a DVE changes state, for example, from "joined" to "shared", the DVE may broadcast state change messages to other DVEs in the "join list".

The DVEs may communicate using the VI or Virtual Interconnect messaging protocol which is an ordered reliable datagram messaging mechanism. This is only one type of messaging protocol and mechanism that may be used to facilitate communications between each of the DVEs in its cluster-like environment. Messages that may be included and exchanged between different DVEs may include a "join" message notification when a DVE wants to join the cluster protocol. There may also be a corresponding complementary operation of "leave" for when a DVE leaves the cluster indicating that the DVE is no longer interested in information regarding the shared metadata. When a particular DVE begins caching data, the DVE may enter the sharing state and accordingly send a corresponding share message to other DVEs. Similarly, a complimentary unshare operation may be exchanged between DVEs when a particular DVE ceases caching metadata associated with a particular oplock. Acquire may be a message sent from one DVE to other DVEs indicating that the DVE sending the acquire message wishes to acquire the oplock for a particular metadata. Release may be a message exchanged between CPs to indicate that a particular CP that is sending the message has released the metadata from update. It should be noted that an embodiment may not include an explicit release message. Rather, an oplock may be considered taken by a first requester until it is next requested and acquired by a second requester. Alternatively, the first requester may release the oplock when the first requester is done with the metadata by issuing an explicit release message. An example of the former technique for acquiring/releasing an oplock is described in more detail elsewhere herein.

There may be also be acknowledgment messages, such as a positive acknowledgment and a negative acknowledgment message included in an embodiment. One of the acknowledgment messages may be sent from a CP for example in response to another CP's request to acquire a particular oplock to modify metadata.

An oplock is used cooperatively among the one or more DVEs for inter-DVE coherency and synchronization of metadata. An oplock is hosted for example on the DVE that acquired it most recently. That DVE can often reacquire the oplock with a simple write to a private journal to take the oplock or reacquire the oplock. If the oplock is volatile, there is no need to write to a journal. A DVE may communicate with the oplock's DVE host and thereby become the oplock's new DVE host.

What will now be described is one embodiment of the inter-DVE and intra-DVE oplock structures. In the global storehouse 602, the global cluster membership list may be denoted as a "jlist" of all the nodes (DVEs) in the cluster having an associated lock referred to as the "jlock". Also included in the global storehouse may be an eviction list or "elist" to which DVEs are added when they are to be evicted, such as when a first DVE does not receive an acknowledgement message from a second DVE in response to a message from the first DVE. The first DVE may conclude that the second DVE is offline and begin cluster eviction and recovery.

In one embodiment, an inter-DVE lock associated with the global cluster membership list 626*d* may be represented as:

jlock—oplock for jlist
jlist—"join broadcast list" (lists all nodes) This is the global cluster list or membership list of DVEs.
elist—"eviction list"
elock—oplock for eviction list It should be noted that an embodiment may use a different locking mechanism besides oplocks in connection with the locks for the jlist and the elist referenced above.

As described in more detail elsewhere herein, an oplock may be a particular lock optimized for distributed access where some locality of reference exists. An embodiment may use oplocks for inter-DVE locks. Oplocks may be volatile or non-volatile. If an oplock is volatile, there is no backup media copy. Alternatively, if an oplock is non-volatile, there is a backup copy stored, an identifier as to which DVE is the owner, and a journal of oplock operations. If a node goes off-line such as in the event of a disaster, another node inherits the off-line node's journals and performs any clean-up needed for any non-volatile oplocks, such as may be associated with mirrored writes. In the event that a DVE goes off-line, its volatile locks are automatically released by virtue of the protocol described elsewhere herein in that a DVE acquires a lock by obtaining permission from all other DVEs in the sharing state for the associated data.

Oplocks may be used as an alternative to other locking mechanisms, such as critical sections, semaphores and the like. The use of oplocks keeps a list of all readers. When one DVE decides that it needs to write to the commonly accessed data, it obtains permission from all other readers first. In other words, with oplocks, only writers need to acquire and release the locks. This policy is in contrast to an embodiment using an alternative locking mechanism, such as a critical section, in which both readers and writers acquire and release a lock when accessing the shared resource to ensure exclusive access to a shared resource for both reading and writing.

Additionally included in the global storehouse 602 as described elsewhere herein are the oplocks for each piece of metadata, such as a fixed portion of the Rmap table which include an indication of who is the acquirer or owner of the oplock. It should be noted that the acquirer or the owner of the oplock may also be referred to as a host of the oplock.

Each of the non-volatile inter-DVE oplocks may be represented by the following:

owner (current and recent, if known)
slist—"share broadcast list" (all joined DVEs)
alist—"acquire broadcast list" (all sharing DVEs)
dirty—indicates dirty (unrestrictive) metadata needs to be flushed Note that slist and alist may be maintained privately (per-node), in-memory and per-oplock. Current owner is the present owner of the oplock. Recent owner may refer to a previous owner, as in the instance where a node goes down and the current owner is performing cleanup for the recent owner. In the foregoing, Jlist is the list of all possible nodes in the cluster. "join" requests are broadcast to the DVEs in this list. Slist is the subset of nodes which have actually "joined" the cluster to which "share" requests are broadcast. Alist is the further subset of nodes which are actually "sharing" access to metadata. "acquire" requests are broadcast to these DVEs. jlock is a lock that protects access to the Jlist. It should be noted that volatile oplocks may be represented by a slightly modified version of the above structure described for non-volatile oplocks. The volatile oplock structure may be the above structure without the ownership information.

An update to data associated with an oplock may be characterized as unrestrictive (dirty) or restrictive. With a restrictive update, a requesting node acquires the associated lock, notifies all other nodes of the update. All other nodes stall the I/O operations until the update is performed. With an unrestrictive update, I/O operations are not stalled. The update may be performed by each node at some point, for example, as performed by a background task update when there are idle processor cycles. Generally, an unrestrictive acquisition and update may be associated with locks for metadata which grant new or additional authority. A restrictive acquisition and corresponding restrictive update may be associated with locks for metadata which restrict or take away authority. For example, an Rmap update may be a restrictive update performed by the CP such as when an Rmap entry is updated to further restrict the types of operations that may be performed by the FP (e.g., change from "FP can perform R and W operations" to "FP can only perform read operations"). In contrast, an unrestrictive Rmap entry update may be, for example, a modification by the CP of an entry to increase the types the operations that the FP may perform (e.g., change from "FP can perform only read operations" to "FP can perform read and write operations"). With restrictive updates, all copies of associated data as referenced by all CPs are invalidated and replaced with the new updated version prior to performing additional I/O operations.

For example, consider an unrestrictive update by node B in which node B must obtain node A's permission to acquire the lock. Node B sends a message to node A requesting to acquire a lock. Node A sends an acknowledgement to node B. Node B updates the metadata and this is a restrictive update. Node B sends node A a message regarding the unrestrictive update of the metadata. Node A records the unrestrictive update in node A's journal and sends an acknowledgement back to node B. Node A then purges all outdated copies of the metadata as time allows.

Following are pseudo-code representations of processing steps as may be performed by a DVE when the DVE is in a particular state as described elsewhere herein in connection with FIG. 27 when different messages are received by the DVE.

```
Boot state
on "join" received, respond with "nak" (not interested);
main {
  acquire global jlock;
  if (not already in global jlist) {
    add self to global jlist;
  }
  release global jlock;
  goto Uninterested;
}
```

-continued

```
Uninterested state (primary dormant state for oplocks of unshared
metadata)
on "join" received, respond with "nak" (not interested);
on "leave" received, ignore;
main {
  if (need to access metadata) {
    clear slist;
    clear alist;
    goto Want to join;
  }
}
Want to join state
on "ack" received, add sender to slist; notice below;
on "nak" received, ignore (sender is not interested);
on "join" received, add sender to slist; respond with "ack";
on "leave" received, remove sender from slist;
on "share" received, add sender to alist; respond with "ack";
main {
  forever {
    broadcast "join" to jlist;
    if (final ack received) {
      goto Joined;
    } else if (ack/nak timeout) {
      broadcast "leave" to current broadcast set;
      clear slist;
      evict timed out sender(s) to elist;
    }
  }
}
Joined state (primary dormant state for oplocks of shared metadata)
on "join" received, add sender to slist; respond with "ack";
on "leave" received, remove sender from slist;
on "share" received, add sender to alist; respond with "ack";
main {
  if (need to cache metadata) {
    goto Want to share;
  }
  if (no longer need any access to metadata) {
    async broadcast "leave" to slist;
    goto Uninterested;
  }
}
Want to share state
on "ack" received, add sender to alist; notice below;
on "nak" received, notice below;
on "join" received, add sender to slist; respond with "ack";
on "leave" received, remove sender from slist;
on "share" received, add sender to alist; respond with "ack";
on "unshare" received, remove sender from alist;
on "acquire" received, respond with "ack";
main {
  forever {
    broadcast "share" to slist;
    if (final ack received) {
      goto Sharing;
    } else if (nak received) {
      async broadcast "unshare" to current broadcast set;
      wait for retry signal;
    } else if (ack/nak timeout) {
      async broadcast "unshare" to current broadcast set;
      evict timed out sender(s) to elist;
    }
  }
}
Sharing state
on "join" received, add sender to slist; respond with "ack";
on "leave" received, remove sender from slist;
on "share" received, add sender to alist; respond with "ack";
on "unshare" received, remove sender from alist;
on "acquire" received, notice below;
main {
  if (acquire received) {
    PURGE METADATA CACHE;
    async broadcast "unshare" to alist;
    if (dirty) {
      FLUSH METADATA JOURNAL;
      dirty = false;
    }
    owner = invalid;
    respond with "ack" and "old dirty"; /* old dirty is the value of the
    variable dirty
                                prior to being updated above. */
    goto Joined;
  }
  CACHE METADATA;
  if (need to update metadata) {
    goto Want to acquire;
  }
  async broadcast "unshare" to alist;
  goto Joined;
}
Want to acquire state
on "ack" received, notice below;
on "nak" received, notice below;
on "join" received, add sender to slist; respond with "ack";
on "leave" received, remove sender from slist;
on "share" received, respond with "nak";
on "unshare" received, remove sender from alist;
on "acquire" received, notice below;
on "release" received, signal retry;
main {
  forever {
    purge = false;
    broadcast "acquire" to alist;
    if (ack received) {
      if (ack was dirty) {
        purge = true;
      }
      if (final ack received) {
        goto Acquired;
      }
    } else if (nak received) {
      async broadcast "release" to current broadcast set;
      wait for retry signal;
    } else if (acquire received) {
      if (other node preempts us) {
        async broadcast "release" to current broadcast set;
        if (dirty) {
          FLUSH METADATA JOURNAL;
          dirty = false;
        }
        owner = invalid;
        respond with "ack" and "old dirty";
        wait for retry signal;
        purge = true;
      } else {
        respond with "nak";
        keep waiting for final ack, above;
      }
    } else if (ack/nak timeout) {
      async broadcast "release" to current broadcast set;
      evict timed out sender(s) to elist;
    }
  }
}
Acquired state
on "join" received, add sender to slist; respond with "ack";
on "leave" received, remove sender from slist;
on "share" received, respond with "nak";
on "acquire" received, respond with "nak";
main {
  if (purge) {
    PURGE CACHE;
  }
  if (owner != self) {
    owner = self;
    host = owner; // update on-media records
  }
  if (non-volatile) {
    JOURNAL ACQUIRE;
  }
  if (unrestrictive update) {
    dirty = true;
    UPDATE METADATA JOURNAL;
  } else {
    UPDATE METADATA;
  }
```

-continued

```
if (non-volatile) {
  JOURNAL RELEASE;
}
async broadcast "release" to alist;
goto Sharing;
}
```

In the foregoing, the variable "purge" is set to indicate that the oplock was successfully acquired but that the previous node holding the oplock flushed some dirty metadata that was protected by the oplock prior to releasing the oplock. Accordingly, the current node purges the cached metadata and rereads the metadata from the media or non-volatile storage. Purge is set in the "Want to acquire" description elsewhere herein when the previous lock owner released the lock. "Non-volatile" is a characteristic of an oplock specified when the oplock was previously created such that a record of the oplock is stored, such as on media, in the event of node owner failure.

As described elsewhere herein, an oplock acquisition may be done in a restrictive or unrestrictive manner for each acquire. An unrestrictive acquisition may be characterized as stating that metadata is being updated by a first node but if the other nodes do not need to learn about this update immediately. This allows communication to other nodes that the lock was acquired and metadata changed in less restrictive fashion. An unrestrictive acquisition may be used, for example, in connection with metadata updates that grant new authority to other DVEs in the cluster, as opposed to revoking existing authority.

It should be noted that an explicit release of a lock in this embodiment triggers a retry for other nodes attempting to share or acquire a lock that another node has already acquired. In another embodiment without explicit releases, other nodes may retry after a predetermined time period.

In one embodiment, a metadata structure may be one or more arrays associated with a device. Each array associated with a device may correspond to a logical device identifier. A particular portion of metadata may be accessed by a triple represented as:

global_id, local_id, index where
global_id corresponds to a volume segment number,
local_id corresponds to a particular attribute, and
index corresponds to a particular portion, such as a particular 32 megabyte extent.

Local_id may correspond to a particular attribute, such as rmap information for a particular volume segment. In one embodiment, the metadata structure may be a two-dimensional array in which an element is accessed by [first_index, second_index]. The global_id and local_id may be used in obtaining a hash value corresponding to the first_index value. Any one of a variety of different hashing techniques may be used. For example, if the metadata structure is a 2-dimensional array, the global_id and local_id may be used to obtain a first_index value such as represented by:

(global_id+local_id) MOD (first_index_range+1)

to obtain a value in the range of 0 . . . first_index_range. The value of the second_index may be that of the index included in the triple above. In the embodiment described herein, an oplock may be similarly referenced by the tuple and each oplock may be a record or structure including the ownership information, and the like, as described elsewhere herein.

It should be noted that the level of granularity associated with an oplock may vary with each embodiment. An oplock may be associated with an element in the array, an entire array, or an entire instance of metadata.

An embodiment may represent metadata and oplocks using data structures other than those described herein as known to those of ordinary skill in the art.

It should be noted that if a physical volume or device that includes the metadata is not fully accessible to all the DVEs needing the access the metadata, there may be a need to provide an alternate interprocedural call (IPC) to acquire the metadata, such as, for example, using a proxy or passthrough DVE.

In one embodiment, the data structure used to implement DVE oplocks allows access to a particular oplock by a guid.luid[index] tuple as described elsewhere herein in connection with a metadata data structure. RMAP metadata, for example, may include an array of redirect values, whose elements are addressed by VSEGguid.RMAPluid[BBAindex/BLOCKSIZE] in which VSEGguid is the volume segment identifier, RMAPluid refers to the RMAP identifier, BBAindex refers to the beginning block address index, and BLOCKSIZE refers the size of a block of data. There is a corresponding oplock for each element in the RMAP metadata array. When multiple nodes want to coordinate the access to shared RMAP metadata, the following RMAP oplock policy may be employed cooperatively between nodes:

To read (or cache) the RMAP metadata, a DVE is in a sharing state for the corresponding oplock.

To write the RMAP metadata, a DVE acquires the corresponding oplock. This causes copies of the metadata to be "purged" from all the RMAP caches of other reading nodes (peers) sharing the oplock. If the oplock is acquired with a restrictive update, the peers also synchronize waiting for all upstream I/Os that might be using the old RMAP redirect value to complete (based on RMAP VSEG, upstream I/O BBA range, and upstream I/O timestamp). Once all peers have acknowledged the purge (and synchronization) as complete, the node now owning the oplock can update the RMAP metadata knowing no other node is using it. When the oplock is finally released, reader nodes may return to reading the metadata as in the corresponding "shared reader" state of the oplock. Note that if only one node is using an oplock, all subsequent transitions from shared to acquired state require no inter-node coherency traffic.

In connection with processing an I/O operation, an upstream I/O is timestamped prior to reading the (potentially cached) redirect values from the RMAP metadata. As described elsewhere herein, the timestamp may be used to "synchronize" I/Os that might be using old RMAP redirect values when making restrictive updates to the RMAP metadata. In other words, prior to updating the RMAP value to a new value, pending I/Os referencing the old value drain prior to the RMAP update to a new value. The timestamp is used in determining which I/Os need to drain by comparing the I/O's timestamp to a current timestamp value for those I/Os referencing the RMAP value being updated. The timestamp may be used as an alternative to a usage count on each and every generation of RMAP redirect values.

It should be noted that the use of timestamps may have an advantage of reducing the amount of memory used within an FP.

An embodiment of a system, such as the computer system of FIG. 1, may utilize many oplocks. The RMAP metadata described above is an oplock protecting each array element of each VSEG's metadata RMAP state. Oplocks may also be used for other "lba range" specific functions, like mirror write serialization oplocks, as well as oplocks protecting various fields of LV, VSEG, and SD metadata state. It should be noted that although oplocks may be used to protect metadata state associated with DVE objects, oplocks may be used in connection with other data objects, such as in the case of the mirror write serialization oplocks as an "lba range" mutual exclusion access mechanism for concurrent mirror writes.

If one node has acquired the oplock and one of the remaining nodes fails, the acquired oplock and metadata are not affected as part of the recovery process of the failed node. If the node that has acquired the oplock fails, the recovery processing steps taken depend on whether the oplock is volatile or non-volatile.

In the case of a volatile oplock, the oplock is implicitly released and some other node can immediately acquire it. This presumes that the failed node (that previously owned the oplock) needs no other cleanup. In the case of a non-volatile oplock, the failed node may have left the collective system in a state that needs cleaning up. When the failed node is subsequently evicted from the cluster, the recovering node performs cleanup prior to explicitly releasing the non-volatile oplock. Additional processing steps as may be performed by a recovering node are described elsewhere herein in more detail.

It should be noted that volatile oplocks are released not by an explicit "release" message being broadcast, but rather in that another node is now free to request and acquire the oplock when a current owner no longer refuses another's request to acquire the lock. A message may be broadcast when a node that has acquired the oplock is done in order to signal other nodes that they may now attempt to acquire the oplock and also obtain a new copy of the data associated with the oplock. If nodes attempt to acquire the lock based on a self-invocation or self-awakening, such as retrying to acquire the lock at predetermined time intervals, and also obtain a copy of the data, an embodiment may not broadcast a cluster-wide message when a node that has acquired the lock is done. However, an embodiment may choose to broadcast such a message as a way to notify other nodes that they may try to acquire the oplock. In the instance where a DVE goes off-line, an embodiment may use a self-awakening of retrying and predetermined time intervals for retries by other nodes.

A single DVE at a time may make changes to particular shared objects. The other DVEs may pause I/Os to the affected objects waiting for the single DVE to complete its metadata updates, at which time the "following" DVEs will reload the affected objects, in a restrictive or unrestrictive fashion.

Oplock broadcasts messages may be used in performing a DVE cluster node eviction. When a DVE broadcasts an oplock request (join, share, or acquire) to a set of peers, and one or more of the peers do not respond, those peers may be "evicted" from the DVE cluster. An embodiment may use other cluster techniques, such as quorum rules for performing an operation. It should be noted that when a node is evicted, the evicting (or "recovering") node becomes the caretaker of the evicted node's cluster resources. If a cascaded eviction occurs, the evicting node may become caretaker of the evicted node's resources and also any nodes evicted, directly or indirectly, by the evicted node.

Oplocks as described herein may be volatile or non-volatile. For volatile oplocks, when the node owning the oplock dies, the oplock is implicitly released since an oplock is only owned by virtue of the owning node defending the oplock against other peer node's "share" or "acquire" requests with a negative response. Non-volatile oplocks, on the other hand, behave exactly like volatile ones, except a) their ownership records are recorded in a journal (for performance) backed by metadata, and b) the most recent owner of an oplock is always considered a member of the "join set", and hence is always included in subsequent requests to "share" the oplock. This ensures that if the most recent owner node has failed, the owner node is evicted from the cluster as a result of the next attempt to share the oplock. The node that does the evicting "cleans up" the failed node before the oplock can subsequently be shared (or acquired).

It should be noted that an evicting node defends the non-volatile oplock while the evicting node is cleaning up for the evicted node. Eviction attempts of a given node may be globally serialized, and if two nodes attempt to evict the same other node, only one of them actually performs eviction steps and performs any clean-up needed before the other evicted node can re-attempt its oplock broadcast. If an oplock broadcast results in an eviction, the broadcast processing may be retried from the beginning.

The oplock state hierarchy described elsewhere herein may minimize inter-node coherency traffic in the performance path. These tiers correspond to, for example, "joining" an oplock, "sharing" an oplock (for caching), and "acquiring" an oplock (for update). At each tier, to elevate to the next tier requires a broadcast message. The set of recipients at each level is always a subset of the set of recipients at the previous level. In the ideal case, the "shared" to "acquired" transition will require no inter-node coherency traffic at all.

As described elsewhere herein, a node can "join" (express interest in potentially later sharing) an oplock with a broadcast to the entire set of potential peers. The response from each peer to the broadcast indicates if the peer "cares" about the join. A join may occur only at boot/configure time. Typically, a node "joins" oplocks for all VSEGS that it has configured. It should be noted that the "working set" of VSEGS for a node may be pre-configured at boot time with additional VSEGS configured on-demand, such as in connection with a first I/O operation to a particular VSEG's LV.

A node can "share" (express interest in potentially later acquiring) an oplock with a broadcast to the set of nodes that want to know, such as those nodes in a "join" state.

A node can "acquire" an oplock with a broadcast message to the set of nodes that are currently sharing the oplock. In the ideal case, this is just the node itself, so no inter-node coherency traffic is required. For example, consider a pair of hosts in a cluster accessing LVs through a pair of DVEs. Each host has a single path to one of the DVEs. One host accesses the LV while the other is waiting. This means that the active host's DVE shares the oplock (is in the sharing state). The other host's DVE is in the join state since it is servicing no I/O operations. The active host's DVE can then "acquire" the associated lock without talking to the passive host's DVE, since the broadcast to elevate to the "acquired" tier is only made to the set of nodes currently "sharing" the oplock.

Following is a list of DVE oplocks that may be included in an embodiment. Oplocks are volatile unless otherwise specified.

| Oplock name | How it may be addressed? guid.luid[index] | What metadata state it protects? |
| --- | --- | --- |
| Mirror Side State Changes | MIRROR_LUID | mirror state for all mirror sides of the SD as well as a generation number (possibly per-DVE) |
| Mirror Write Serialization (non-volatile) | VSEG.RMAP_LUID [BBA/BLOCKSIZE] | NA |
| RMAP | VSEG.RMAP_LUID [BBA/BLOCKSIZE] | RMAP values |
| Redirs | VSEG.DIRS_LUID | dirs array (i.e., the interpretation of RMAP values) |
| SCSI Reserve | LV.RESERVE_LUID | list of hosts that have the LV reserved |
| Unit Attention Conditions | LV.UALIST_LUID | list of hosts that need to receive Unit Attention for the LV |
| Group Atomic Operations | LV.PAUSE_LUID | NA |
| LV Reconfig | LV.RECONFIG | set of VSEGs associated with the LV |
| MigrationThread(taskset) (non-volatile) | TS | NA |

As described elsewhere herein, an oplock may be used as a locking mechanism to synchronize access to associated data, which may be volatile or non-volatile. Additionally, an oplock may not be used to synchronize access of any particular piece of data, such as the migration thread (task set) oplock above. In this instance, the oplock's function may be characterized as a flag used in process or thread restart, for example, in the event that a DVE fails. All of the foregoing metadata associated with the oplocks in the table is non-volatile metadata in this embodiment except for the Mirror Write serialization, Group Atomic Operations and Migration Thread oplocks. The former two are volatile metadata in this embodiment. Other embodiments may have other metadata characterized as volatile or non-volatile in accordance with the requirements of each embodiment.

Each of the foregoing oplocks included in the table is discussed in more detail in following paragraphs. It should be noted that although each of these are discussed individually, many of the functions and operations are dependent on others. For example, when changing the state of a mirror, the associated RMAP for the volume segment(s) is also updated.

It should be noted that an embodiment may include different oplocks than as described above in accordance with each particular embodiment. The specific reference above regarding how the oplock may be addressed may vary with the oplock data structure included in each embodiment. The particular oplock structure referenced in the foregoing table is described elsewhere herein in more detail.

As described elsewhere herein, an agelist maybe used in recording differences in mirror sides and used in connection with resynchronizing a mirror side brought back on-line. The value stored in an age list may be referred to as a generation number. In addition to the generation number, a DVE identifier corresponding to the DVE which updated the age list may be stored. The particular generation number may be valid only when associated with that particular DVE. The current DVE generation number is incremented whenever a mirror side state change occurs. Whenever a mirror side dies, the Rmap values for the remaining live sides of the mirror (i.e., for the mirror's VSEG) may be updated to fault on write for all extents, and the current DVE generation numbers is incremented. On the fault encountered on the first subsequent write to each extent, the live mirror side's age list is updated to the current (new) generation number, and then the Rmap value for the faulted extent is updated to allow subsequent writes without faulting In connection with mirroring in this embodiment, only a single DVE may update a specific LBA range of a mirror at a time. This embodiment allows only one DVE to write to a given range of a mirror, and further only one FP within that single DVE. In addition, the DVE updates its per-DVE current generation number. The global copy of the RMAP metadata may be set to fault-on-write for all extents if the embodiment also supports fast resynchronization, as described elsewhere herein.

Mirror side state changes and the use of the associated oplock will now be described. For purposes of illustration and example, assume the system is in steady state, and all DVEs are sharing the Mirror Side State Change oplock. A mirror side state change from "alive" to "dead" may be initiated by the notification of a failed write I/O to a mirrored side device. It should be noted that a failed read need not technically change the state of the mirror, but an embodiment may prevent other unsuccessful reads when a failure of a first read has been determined. The CP indicates to the FP which mirror sides may be read from and which ones may be written to. This information may be included, for example, in the storage redirect table. The state change from "alive" to "dead" for a mirror side is completed before upstream status can be returned for the failed write I/O.

The DVE that detects a failed write I/O may acquire the mirror side state change oplock. If, upon acquiring the oplock, it finds that the mirror side has already been declared "dead" by some other DVE, then this is a "false alarm", so it reloads the metadata for the mirror side, releases the oplock, and continues. The metadata which is reloaded may be characterized as storage descriptor metadata that describes which mirror sides are "dead" or inactive, and which are "alive" or active. It should be noted that another DVE has already declared a particular mirror side as "dead" and has already completed the appropriate processing steps.

If, upon acquiring the oplock, the DVE that detects a failed write I/O finds that the mirror side is still "alive", then the DVE performs steps in connection with declaring the mirror side "dead" or off-line. At this point, all of the "other" DVEs have been notified to pause I/Os to the virtual volume segment or VSEG, unload the mirror side metadata state information from all cache copies, and then wait on resharing the oplock, reloading the metadata, and unpausing I/O operations to the mirror side. The DVE which acquired the oplock also pauses I/O operations to the mirror side and unloads all copies of associate metadata.

The DVE that has acquired the lock then increments the generation number, and sets the RMAP for the live sides of the mirror to fault-on-write, so that new writes are intercepts and fault to the CP and record the fact that the dead mirror side is now out-of-date. This may include making a copy of the current "age list" for the dead mirror side, if one was not being currently maintained. The DVE that has acquired the oplock marks the mirror side as "dead" by, for example, updating metadata included in the storage redirect table. The oplock may then be released, and the operations may continue using the new state information from the storage descriptor, as pointed to by the redirect table entries described herein. Upstream status for the failed write I/O may then be returned.

If a DVE goes off-line while performing this process of marking a down mirror side as "dead", no status has been returned for the failed I/O yet, and processing steps may be performed and repeated by the next DVE to encounter a failed write I/O.

It should be noted that if multiple RMAP entries result in writes being delivered to the live sides of the mirror via the fastpath, then all of these entries are set to fault-on-write initially.

What will now be described is handling Mirror Write Serialization (and Reconciliation) which, in this embodiment, utilizes a non-volatile "mirrored write" oplock covering each extent (fixed size) of each mirrored VSEG's lba range. Sharing this oplock gives a DVE "write authority" for that extent of the mirrored VSEG's lba range. Intra-DVE locks are used to distribute write authority further among the FP's that may be associated with each CP.

When a DVE wants to write to an extent of the mirrored VSEG, the DVE acquires the oplock, thereby revoking sharing authority from any peer DVEs. It releases the lock immediately (still sharing it), and thereby implicitly keeps write authority until another has acquired the associated lock. A DVE "shares", "acquires" and "releases" before it can assume it has write authority.

If the DVE goes off-line while writing the extent (or more precisely, while holding the lock giving it write authority over the extent), the records of the non-volatile oplock ownership are in the DVE's journal. The evicting DVE performs mirror reconciliation at failover time by copying from one side of the other mirror sides, and then releases the oplock.

As described elsewhere herein, non-volatile oplocks, including the mirrored write oplocks, are swept or unshared so that a DVE only has records of owning oplocks for extents that were recently written, for example, in the last minute.

Ownership records for non-volatile oplocks may be updated by the owning node at acquire time. The ownership information may change, for example, when the lock is unshared as by the sweep process, or acquired by another node.

Handling an RMAP state change in connection with the Rmap metadata and associated oplocks is described elsewhere herein. In connection with processing redirect entries as may be referenced in an Rmap entry, a redirect entry is created before any RMAP entries or Rmap values reference a particular redirect entry. RMAP values, in addition, can only be changed by a fault handler in the CP. A redirect entry cannot be free until there are no RMAP value references to the particular redirect entry.

A pause/reload technique may be used in connection with the redirect entries. Initially, assume the system is in steady state, and all DVEs are sharing the Redirs oplock. When a high-level function, such as a snapshot or migration thread, need to create a new redirect entry, the function acquires the oplock. At this point, all of the "other" DVEs pause I/Os to the VSEG and then wait on resharing the oplock, reloading the redirs, and unpausing the VSEG. The local DVE (which acquired the oplock) similarly pauses its I/O operations. The acquiring DVE then updates the redirs metadata and released the oplock. Operations may be resumed using the new updated information. If a DVE goes off-line or dies during this process, the steps may be performed by the next DVE to receive the request to perform the high-level function.

Metadata may also be maintained in connection with each LV in which a list is associated with each LV of hosts currently allowed to access each LV. This involves using the previously listed SCSI reserve oplock. Reservation conflicts may be handled when an I/O is faulted to the CP and also in the FP. In one embodiment a LUN Masking FP API may be used to indicate to an FP using a mask which hosts hold a reservation to perform fastpath I/O. Other hosts' I/Os fault to the CP. It should be noted that any host may issue a SCSI "reserve" command to a disk to say that it wants to access the disk also to prevent any other host from accessing the disk. Once this has been done, if another host tries to access the disk, the other host receives a special return error status which may be referred to as a "reservation conflict" indicating that the other host's request to access the disk is denied.

As an example, assume the system is in steady state, and all DVEs are sharing the SCSI Reserve oplock for the LV. When a reserve or release command is received, if successful, the command changes the reservation state of the LV. When a reserve or release command is received, such as in connection with a SCSI device, an intra-DVE lock may also be acquired to ensure mutual exclusion within a DVE. To change the reservation state of an LV, the a device module, such as a SCSI device module, acquires the SCSI Reserve oplock for the LV. At this point, all of the "other" DVEs have disabled the FP from processing I/Os for the LV, and then wait on resharing the oplock, reloading the LUN Masking information from the global copy of the associated metadata, and unpausing the LV. The local DVE which acquired the oplock has to perform similar processing steps of prior to acquiring the oplock. The acquiring DVE then updates the reservation list and releases the oplock and operations may resume. If a DVE dies during this process, all of the rest of the steps can safely be repeated by another DVE.

What will now be described are handling LV Unit Attention Conditions and its associated oplock. In a clustered environment, where multiple DVEs are may be accessing the same LV, when the LV experiences a Unit Attention condition. An embodiment may receive this condition, for example, if removable medium has been changed on a device. Others accessing this LV may be notified accordingly since, for example, the previously sent write I/O may be meant for another piece of media that was removed. The metadata is a list of associated nodes that are notified upon the occurrence of such a condition. An embodiment may respond with Check Condition/Unit Attention to only the first I/O from each initiator to the LV, regardless of which DVE the I/O was subsequently processed by. The list of hosts indicated by the associated metadata indicates which nodes are notified and subsequently, the host is removed from the list. The list may be initially the set of logged in hosts at the time of the condition.

In connection with pausing I/O operations to a particular LV, an associated oplock may be used in connection with handling this and other group atomic operations. Group atomic operations may be characterized as a set of operations that are perceived as occurring atomically. For example, taking a snapshot of a set of devices associated with a database may be perceived as an atomic operation by pausing I/O operations to the devices, taking a snap shot of each device and then restarting or resuming I/O operations. In connection with the foregoing, consider performing a snapshot of a group of VSEGs atomically at once. The following may be performed:

a) pause the corresponding LVs at the FPs and CPs of all DVEs (this does not imply waiting for already issued I/Os to drain, necessarily, except as required by snapshot processing described elsewhere herein;
b) take the snapshot;
c) resume the I/O operations to the LVs.

Use of this oplock is similar to others described herein.

If a DVE fails while the LVs are paused, it is the responsibility of the recovering DVE (which evicted the failed DVE) to continue the operation and resume the LVs. The LVs are not available during this time (however long it takes to detect the previous DVE had failed). These particular oplocks are volatile, which means that in order to support failure recovery, the DVE may first acquire some other non-volatile oplock (typically for the taskset) before entering into the a), b), c) sequence above.

What will now be described is processing in connection with the LV Reconfig oplock. This oplock may be used, for example, when adding a VSEG to an LV (growing the volume). This oplock may also be used, for example, to split a VSEG in two (not changing the volume, but changing the number of VSEGs) or to merge a VSEG. All of the foregoing may be coordinated between DVEs using this oplock. In other words, a DVE may acquire this lock when performing one of these or possibly other operations in connection with an LV when the set of VSEGS associated with an LV are being updated.

Like the group atomic operations described elsewhere herein, there is an associated taskset that is non-volatile. If a DVE fails in the middle and has acquired this lock, the processing is performed by the recovering DVE. As part of the LV reconfiguration processing, I/O operations to the LV are paused as well.

In one embodiment utilizing Group Atomic Operations oplock, the LV reconfigure oplock and the task set or migration set oplock, the former two may be implemented as volatile oplocks and the latter oplock as a non-volatile oplock. The former two oplocks are acquired as part of the taskset oplock and are accordingly reacquired and re-released in connection with a failed DVE.

In connection with migration threads and other threads as may be associated with a particular task set, an embodiment may have a migration thread and others as described elsewhere herein executing on each DVE node, for example, when performing clustered migrations. An oplock may be associated with a task set including a migration thread that is non-volatile such that if a node goes off-line, another node detecting that a failed node is off-line, takes of the failed node's migration process. An embodiment may associate a single non-volatile oplock with a taskset, and the node with the thread running acquires the oplock. If that node dies, the evicting node restarts the migration thread and possible others associated with the taskset when performing cleanup for the dead node (since it will find that oplock in the dead node's journal). In this example, the migration thread and others included in the taskset are able to execute on any node. Other embodiments may require that a migration thread execute on a particular DVE and accordingly may require modifications that may vary from what is described herein.

As described herein, a taskset may be referred to as a set of tasks to be performed. The set of tasks may include, for example, relatively "quick" or short tasks, such as a snapshot, or relatively "slow" tasks, such as migration which may take hours to complete. Once a DVE that has commenced performing a taskset fails, another DVE picks up and continues completion of the taskset on another DVE. By commencing operation of the taskset, there is an expectation of the host or other caller to complete the taskset. Since there is a non-volatile oplock associated with each taskset, if an executing DVE fails, a recovering DVE will replay the taskset of the failed DVE.

A DVE may acquire a taskset oplock (non-volatile) when a taskset is started, and release the associated oplock (and unshare and leave) when the taskset has completed. If the DVE goes off-line prior to this, a recovering DVE continues the taskset, such as perform an ongoing migration, or complete a partially completed group atomic operation. It should be noted that taskset oplocks are not contended for, that is, no two DVEs start the same taskset except during failover recovery when one of the DVE's is off-line.

What will now be described are some examples and how the locking mechanism described herein may be used in connection with performing different operations such as a snapshot.

Figure 28:
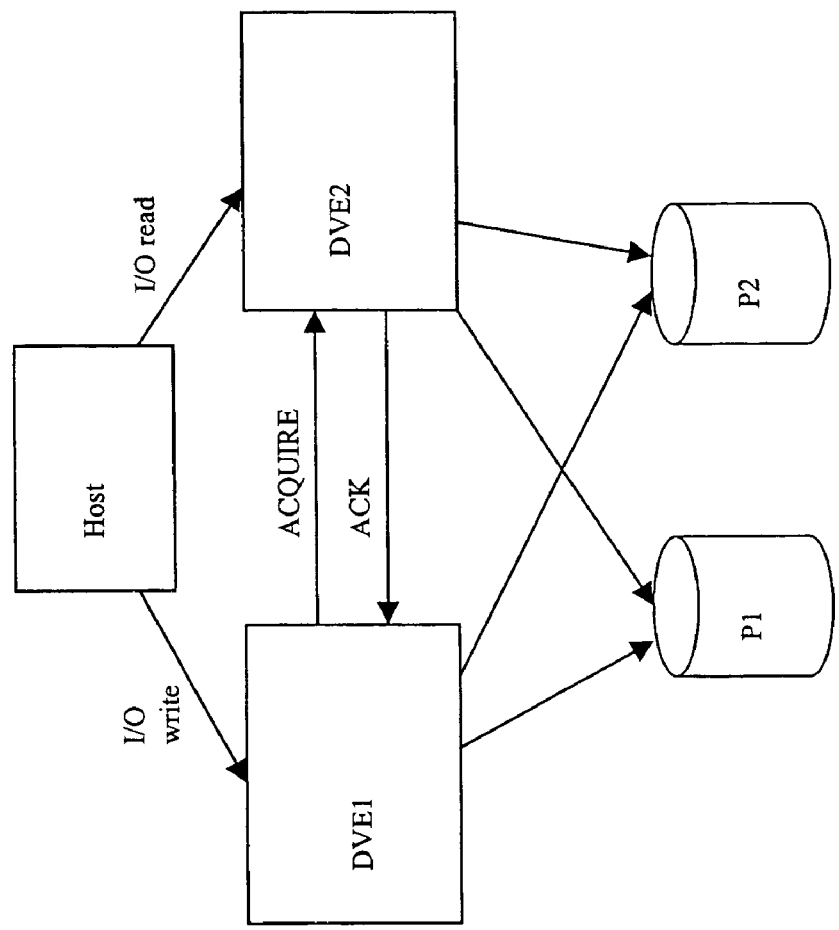
FIG. 28 is an example of an embodiment of two DVEs exchanging messages in connection with acquiring lock.

Referring now to FIG. 28, shown as an example of an embodiment 750 that includes two DVEs that handle an I/O request from a host. It should be noted that the example shown in the illustration 750 is a simplified view of how different DVEs may access physical devices. In other words, the actual mapping mechanism is not shown as part of the DVE accessing particular physical device. Additionally, the details within a particular DVE such as whether there are one or more CPs in the FPs are not shown in detail. The oplock mechanism for modifying global data will be explained on the level of inter-DVE communication. It is assumed that each particular DVE monitors all intra DVE communication and access these for synchronizing access to any type of data.

In this example, assume that each of the DVEs, DVE 1 and 2, both have copies of the same RMAPs in connection with a V and a V Snap (snapshot) device as described elsewhere herein in connection with performing a snapshot operation, copy on write. In connection with performing a snapshot operation as described elsewhere herein, both the RMAP and the storage redirect tables may be modified in connection with performing a snapshot operation. Also recall that the RMAPs that are in the metadata use fixed length extents, and those RMAPS which are in the memory, for example, within the DVEs corresponding to the V and the VSnap devices, use variable length extents as also described elsewhere herein.

In this example, the host issues both a read and a write operation simultaneously. The host writes to a part of virtual volume through DVE 1 which ends up faulting to a CP within DVE 1 since a snapshot is being performed for two virtual devices using physical devices P1 and P2. Simultaneously, the host issues an I/O read request to DVE2 to the same portion of a physical device. The FP of DVE2 may be used to do the read operation. When a read and a write operation occur at the same time, it is indeterminant as to which one will complete first or be performed first. In one example, assume that the write is pending in DVE1. DVE1 issues a message to acquire the corresponding oplock associated with the particular RMAP portions for the extent associated with the I/O write operation. DVE1 may broadcast a point-to-point message to all DVEs indicated with sharing this particular portion of the global metadata using its local share list. Essentially, DVE1 is asking permission to acquire the lock for particular metadata portions or RMAP portions it needs to perform its modifications on the metadata. The acquire message that is sent to DVE2 is also a request for DVE2 to invalidate its corresponding portion of the RMAP and its cache as well as take care of synchronizing any other references to that particular RMAP portion in CP and FP portions included within the DVE2. In response to receiving the acquire message, DVE2 purges RMAP portions requested included those within the CP and the FP. When all of the portions or copies have been purged within the DVE2, DVE2 then sends to DVE1 a message indicating acknowledgment that DVE1 may acquire the lock and update the metadata. In connection with performing a snapshot operation, DVE1 performs a write operation to update portions on P1 and P2 corresponding, respectively, to portions for V and V Snap.

It should be noted that in connection with performing processing associated with a release operation, a DVE releasing a lock may broadcast a message to all other nodes having a local copy or those other nodes that have registered themselves as wanting to receive such notification. Upon receiving this release notification, a node may reshare and reread the updated data from the global storehouse described elsewhere herein.

After DVE1 acquires the lock for a portion of the virtual device on P1, DVE1 also acquires the corresponding lock on V snap which, in this instance, is device P2. Data is then pushed from physical device P1 to P2 if the global Rmap entry indicates a state of zero such that the data has not yet been copies. Subsequently, the Rmap in the global metadata for device P2 is then modified to reflect the state change that the data has now been copied to the snapshot device P2. DVE then also updates its portions internally which reference this particular Rmap location, such as within the CP and the FP. DVE1 may now release the lock associated with the Rmap portion on device P2. Part of releasing the lock may mean that another may acquire the lock rather than P2 issuing an explicit release lock message. Subsequently, DVE1 waits for the reads to device P1 to drain and then changes portions of the global Rmap table of device P1 to have the appropriate redirect table entry indicating that the data has been pushed from P1 to P2. Note that this update has been to the global metadata. Simultaneously, DVE1 again may update any local copies of CP or FP data to this portion of the Rmap and then DVE1 may release the lock, for example, by allowing another DVE to acquire the lock to the corresponding Rmap portion.

Figure 29:
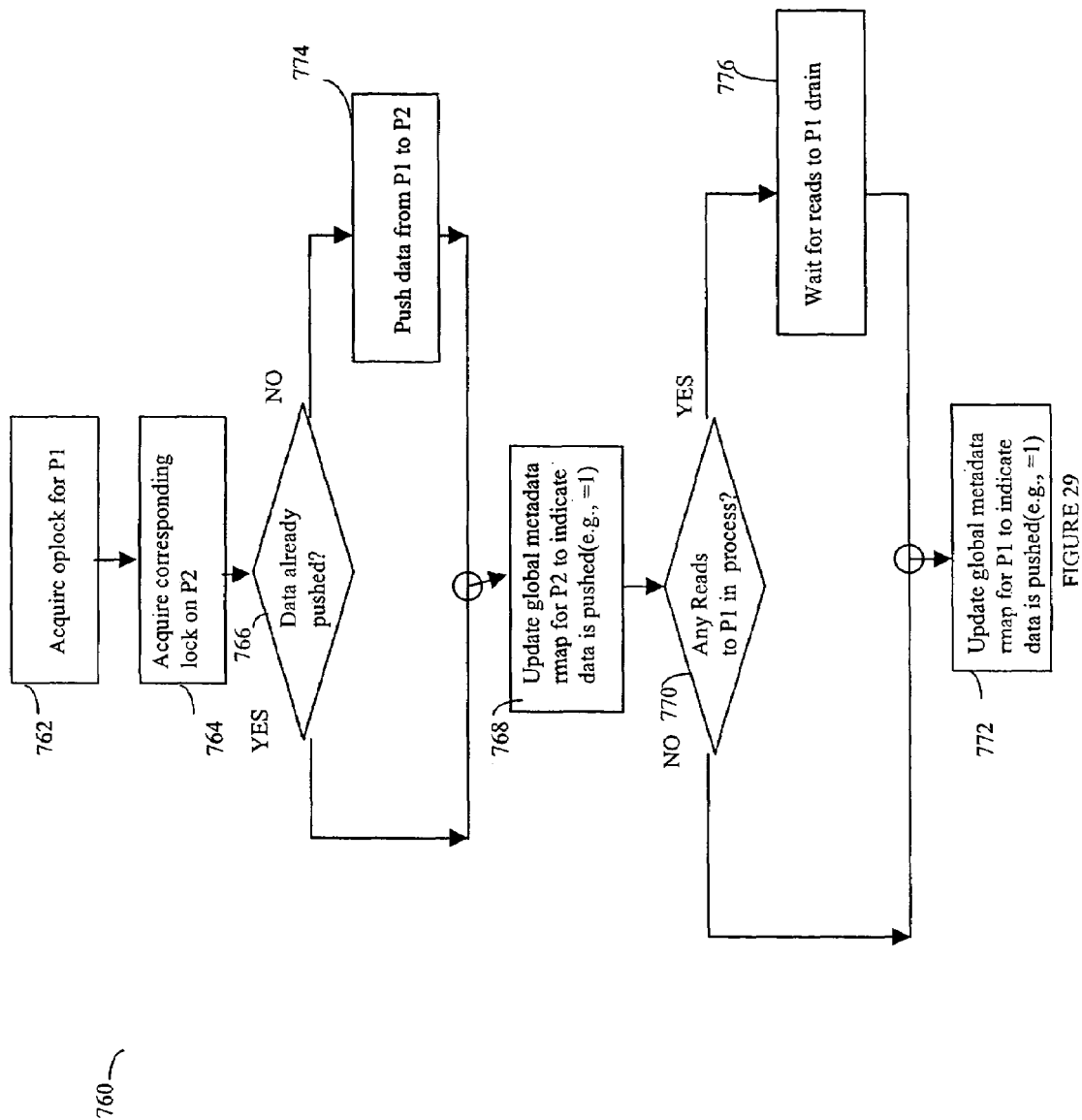
FIG. 29 is an example of a flowchart of steps in connection with performing a snapshot operation.

Referring now to FIG. 29, shown is a flowchart 760 of steps summarizing processing just described in connection with performing a snapshot operation and acquiring the necessary locks by DVE1 in connection with the write operation of the global metadata. At step 762, DVE1 attempts to acquire the oplock for P1, for example, by issuing an acquire message and receiving the appropriate acknowledgement back from the other DVEs. At step 764, DVE1 also attempts to perform and acquire the corresponding lock on physical device P2. At step 766 the determination is made as to whether the data has already been pushed from device P1 to P2. If not, control proceeds to step 774 where the data is pushed from device P1 to P2. Control proceeds to step 768 where the global metadata for the Rmap of P2 is updated to indicate that the data has been pushed, for example, by updating the particular Rmap entry index to be one. Control proceeds to step 770 where it is determined if any reads to device P1 are in process of being performed. If so, control proceeds to step 776 where DVE1 waits for the reads to device P1 to drain. Control proceeds to step 772 where the global metadata Rmap portions for device P1 are updated to indicate that the data has been pushed to device P2.

RMAP values may be updated in a restrictive and an unrestrictive fashion as described elsewhere herein. When making a restrictive update to an rmap value as described above, the DVE must wait for all I/Os that were issued using the old rmap value to drain. This must occur prior to making any subsequent changes to the system state that are dependent on the new rmap value.

For example, when faulting writing to the source of a snapshot, a) the snapshot data is pushed and then b) the destination rmap is updated to reflect the new location of the data (and that writes are now allowed), and c) the source rmap is updated to reflect that the write is now allowed (to the original location of the data). In this embodiment, the steps are performed in the foregoing order. Additionally, after step b), and before proceeding to step c), there is a wait for any I/Os issued referencing the destination rmap to the old location to drain. Otherwise at step c), writes to data may be allowed that the destination side of the snap is still reading resulting in corruption. The foregoing also applies on a larger scale in embodiments using a single DVE and a single CP execution thread, as well as multiple CP execution threads, such as migration threads and fault handler threads.

It should be noted that in connection with the prior discussions elsewhere herein, the lock for the portion of the global metadata on P2 may be released after step 768 and similarly, the lock for the global metadata portion on device P1 may be released after step 772. In this particular embodiment using a volatile oplock, a lock is released not by the action of sending a particular message from a first DVE currently holding the lock to other DVEs. Rather, one of the other DVEs may now successfully acquire the lock in connection with the particular metadata portions from the first DVE. Any message sent in connection with a release operation is not an explicit release of the lock. Rather, it may serve as a signal to "wake up" other nodes that they may now attempt to acquire the lock and should accordingly obtain a fresh copy of the global data. If the node that has acquired the lock goes down, the volatile oplock may be automatically released in that now another node is free to acquire the lock. An embodiment may have other nodes routinely retry to acquire the lock after a certain amount of time has past from a prior acquisition attempt. Thus, the sending of the release message may be omitted from an embodiment, for example, if the other nodes attempt to retry to acquire a lock and otherwise obtain an updated global copy of the data.

It should be noted that in one embodiment, when a DVE that has acquired a volatile oplock is done, the DVE may broadcast a message (e.g., asynchronously at a lower priority) so that other DVEs know in a timely manner that they may attempt to acquire the volatile oplock. Relying solely on timeouts for the retries may be not as efficient as the broadcast technique. However, in the instance where a DVE that has acquired a volatile oplock goes off-line, timeouts may be relied on for subsequent attempts to acquire the oplock since the volatile oplock is released when the DVE goes off-line using the technique of acquiring the lock by obtaining permission from all others in the shared state as described elsewhere herein.

A DVE, such as DVE1, may be turned off or inaccessible, for example, in connection with a power failure. Assume that a host, for example, has not received an acknowledgement that a previously requested write operation has successfully completed. Subsequently, the host may retry the write operation if there is a time out and reissue the write request. If, for example, DVE1 has a power failure, all intra-DVE oplocks and volatile inter-DVE locks of DVE1 are released as they are volatile or non-persistent. However, non-volatile inter-DVE locks that have been acquired by DVE1 are still locked. Using these acquired inter-DVE locks, another DVE may perform "clean-up" operations in connection with DVE1.

Another DVE may be elected, as a member of the cluster, to clean up after another DVE, such as DVE1, that has failed. The DVE performing the cleanup may be a predetermined cluster member, or it may be the first DVE that determines that DVE has failed and evicts the failed DVE from the cluster. This may vary in accordance with policies included in each embodiment.

The cleanup may be performed by using the list of inter-DVE non-volatile oplocks which DVE1 had acquired. If DVE2 is performing the cleanup of DVE1 upon DVE1 failing, DVE2 first inherits all of DVE1's non-volatile inter-DVE oplocks. DVE2 implicitly acquires each of the oplocks by inheriting those of the failed node. In other words, DVE2 acquires the locks without DVE2 first asking and obtaining permission from all the other nodes. DVE2 is recorded as the owner in the ownership information for the non-volatile inter-DVE oplock. DVE2 now defends the implicitly acquired locks.

Using any journalling information, DVE2 examines the list of inter-DVE non-volatile oplocks and, for each non-volatile inter-DVE oplock owned by the failed DVE, completes the write, update of the global metadata, or other operation associated with the oplock. DVE2 then releases the locks implicitly acquired. Only non-volatile locks, non volatile locks, play a role in recovery operations as described above.

A DVE that is returning to service after a failure performs operations similar to those in connection with a DVE coming online initially; the DVE joins the cluster. When a DVE starts up or boots up, such as initially or subsequent to going off-line, the DVE performs certain steps that may be represented as follows for DVE A coming on-line:

1. if another node has acquired DVE A's journal (is currently indicated as the owner), DVE A waits a predetermined time period to acquire own journal 2. if the predetermined time period has passed, evict the node X that has acquired DVE A's journal and DVE A inherits all of X's journals, locks, etc. including DVE A's own journal. All the journals are read-only accessible.

3. If DVE A's journal indicates a "dirty" shutdown with tasks that were in progress, replay the corresponding journal entries for those tasks.

4. If any of the journals that DVE A inherited also show a dirty shutdown, replay the corresponding journal entries for those tasks.

5. Release any journals belonging to other DVEs that have been replayed so that the other DVEs may also boot.

6. Open DVE A's journal for writing

7. DVE A comes on-line

If a first DVE sends a message to a second DVE that never responds, the first DVE evicts the peer from the cluster. As part of performing the clean-up, the first DVE acquires all of the second DVE's journals, locks, etc., and performs clean-up operations, including processing of steps 4 and 5 above. The first DVE does this clean-up while continuing itself to run on-line as a member of the cluster. As described elsewhere herein also, the evicting DVE inherits responsibility for all journals of the DVE that has been evicted. This may be characterized as a cascading eviction. For example, A evicts B and A goes off-line before cleaning up B. C evicts A and then C performs clean-up operations for A and B. As known in the art, journals record important operations in progress, such as write operations, that either may be re-issued or "undone" in the event that the DVE performing them goes off-line.

When a particular DVE fails, for example, as when a DVE experience a power failure, any mirror reconciliation is also be performed. If there was a mirroring operation being performed, only a portion of the mirroring operation or update may have been performed. For example, there may be two mirroring devices, M1 and M2. In connection with performing a write operation, the DVE 1 may update mirror device M1 but DVE1 failed prior to completing the write to device M2. When DVE1 fails, if DVE1 was potentially writing to a mirror, there may be a need to reconcile the mirroring devices such that the data on the mirroring devices is coherent.

When performing a mirroring operation, a DVE acquires the necessary locks, such as the inter-DVE non-volatile oplocks, in order to write for all mirroring devices. Only one FP is allowed to write at a time to a particular mirror or mirroring device. The locks are acquired and held until another node issues a request to obtain the lock. With this in mind, an embodiment may include a sweeping process that runs on each of the DVE's. The sweeping process may be executed, for example, each minute to release the inter-DVE non-volatile oplocks. The DVE may reacquire the locks as needed. As described elsewhere herein, a non-volatile inter-DVE oplock may be released by clearing the ownership information.

A DVE returning to service may perform recovery operations for mirrored devices, for example, such that the DVE coming on line may be brought up to date with the operations that have occurred while offline or out of service.

In connection with performing mirroring operations, when a DVE goes off-line or fails, an embodiment may not want to reconcile the entire volume or device for all mirroring devices. A fast reconciliation may be desirable by only copying those portions that have changed. As described herein, reconciliation occurs when a DVE fails and uses non-volatile oplocks. Resynchronization occurs when a mirror side fails and comes back on line. Age lists may be used in performing the resynchronization operation when a mirror side comes back on-line. An embodiment may include and utilize and age list in connection with performing a fast resynchronization for failed mirroring devices brought back on-line. An example of a failed write in connection with a mirrored device will now be described. A host initiates a write request to a DVE which causes multiple downstream write I/O requests to a plurality of mirror devices, Ma and Mb. During the write operation, Mb goes off line due to a device failure. When Mb comes back on-line, the copy of Mb's data needs to be resynchronized with the other mirror devices, such as Ma. A technique will now be described using age lists that provides for a fast resynchronization of data on the mirror devices to copy those portions to Mb from Ma that are out of date since Mb was off-line.

Each of the mirroring devices has an associated age list that includes fixed size extents in metadata. The agelist may be stored as inter-DVE metadata with associated locks in persistent storage. When a write operation is being performed, the agelist remains the same. Initially, all elements of the agelist are assigned the current age. A DVE has the concept of a current age counter which may be initially 0. This counter is used in connection with indicating an age of the mirror data. When a mirror device, such as Mb, is disconnected or fails, the DVE is so notified and updates the current age counter, such as updates the age counter by 1. At this point, the DVE modifies the Rmap entries of the associated down mirror device to cause a fault to the CP when there is a write operation. As described elsewhere herein, the DVE obtains the necessary intra-DVE and inter-DVE locks to modify the Rmap table to indicate a different redirect table entry causing a CP fault on a write operation to the mirror device. Upon a write operation occurring, there is a fault to the CP. The CP then updates the agelist entry or entries corresponding to the address for the particular write operation to be the updated current age, which is 1 in this instance. When Mb comes back on line, all of Mb's extent portions having a corresponding agelist entry not equal to 0 are updated by migrating data from Ma to Mb. This may be done using the migration thread, for example, to push data from Ma to Mb for each entry in the agelist not equal to 0. In other words, when a mirror side is being resynchronized with a live mirror, the DVE performing the clean-up must update all extents on the mirror side whose age list generation numbers do not match the generation number of the live side mirror. The age list generation numbers may be maintained on a per-volume basis rather than a per-side/device basis. It should be noted that the agelist metadata may be associated with fixed size extents portions of a mirrored storage device.

In one embodiment, reads to a mirror may be load balanced round-robin between mirror sides with the best load balancing priority as may be specified in the mapping table. This may be implemented in an embodiment using the storage redirect table by maintaining an index of the last mirror side to receive an operation. The index may be incremented to indicate the next mirror to use for the next I/O operation. When the index reaches the number of mirror sides, the index may be reset to indicate the first side mirror. Other embodiments may use other techniques to implement a load balancing. This technique allows the CP to have the ability to specify and modify which mirror sides are remote, and accordingly, a high "cost" to use, but also whether any form of round-robin or other balancing technique is appropriate. If each mirror side is given a unique value or cost, then the lowest cost mirror side may be selected.

Mirroring operations may be implemented using the write splitting functionality, such as the write splitting primitive, described elsewhere herein. The CP may implement locking for shared mirrors, which may be accessed by multiple FPs, such that only one FP is enabled for write at any given time for an extent of a virtual volume included in a mirror. The locks for shared mirrors may be implemented as inter-DVE oplocks described elsewhere herein in mode detail.

In connection with mirroring devices, reads to an extent are not synchronized with writes. In other words, if reads and writes are currently outstanding, the reads may return old data, new data, or a combination of old and new on a block-by-block basis. The combination of mix of data returned for a read may change over time so that two concurrent reads to the same portion may return different data if there are also outstanding writes completing as data is being read. Once a write operation to an extent is complete and there are no other pending writes, read operations to the extent return the same data.

In the case where a DVE fails or goes off-line, another DVE may remove the failed DVE from the cluster, such as described elsewhere herein. The recovering DVE may assume ownership of all the failed DVE's inter-DVE oplocks in addition to its journals. The failed DVE may also have outstanding writes which may result in a mirror being out of synchronization with other sides of the same mirror. As with rules for concurrently outstanding I/Os above, order of completion in this embodiment is unspecified and read return data is unspecified. If a write was outstanding to a mirror device on the failed DVE, the requester may eventually time out and/or abort the write, and reissue the write. The write operation may then be blocked since the recovering DVE cleaning up after the failed DVE blocks writes to the mirror until the mirrors are resynchronized. However, writes may be allowed.

A more detailed generalized example in connection with the foregoing mirror and synchronous replication will now be described in detail.

Figure 30:
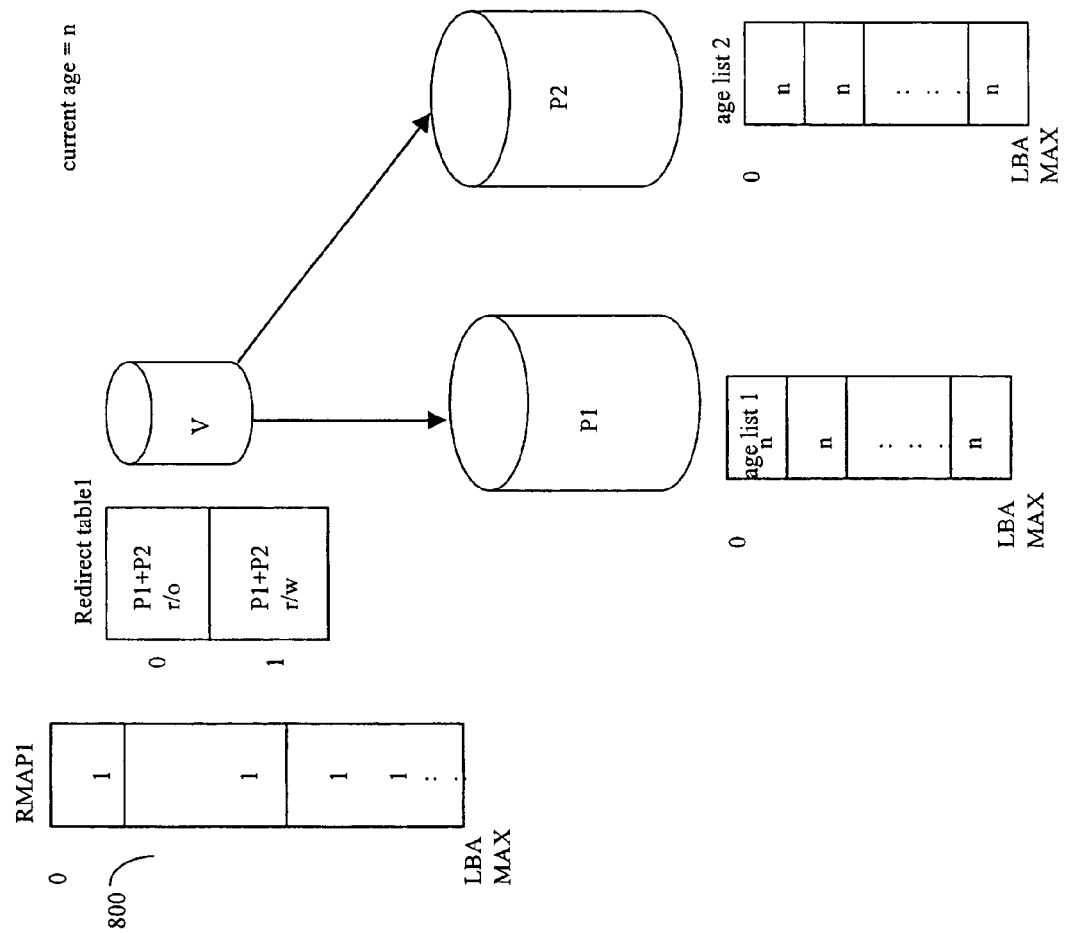
FIGS. 30 and 31 are examples of an embodiment in connection with performing operations with mirrored devices.

Referring now to FIG. 30, shown is an example of an embodiment of a device V that has two corresponding mirror devices P1 and P2. Initially, both P1 and P2 are on-line and Read and write operations are allowed to the devices and both mirror sides are up-to-date. Assume P2 fails. This initial state is shown in FIG. 30.

Figure 31:
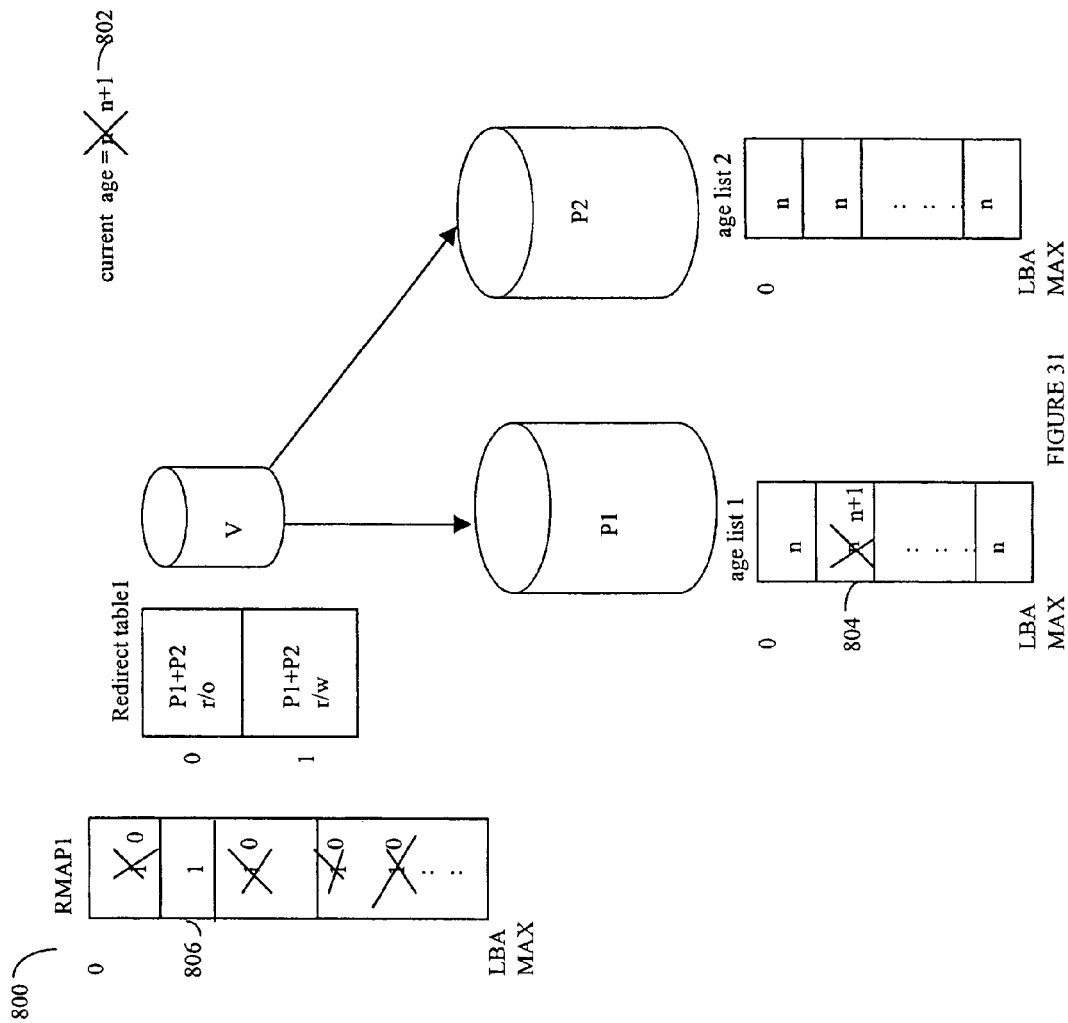

Referring now to FIG. 31, additional processing steps are illustrated when a write is subsequently issued to P2 and there is a fault to the CP. The CP then marks P2 as DEAD status/offline and updates the generation number to "n+1", as indicated by 802. The CP then updates P1's age list to indicate, using the new generation number, that P1 has newer data for the extent just faulted on when writing, as indicated by 804. The CP then marks all the Rmap entries, except the one just faulted on as indicated by 806, to indicate that a resynchronization is to be performed if the mirror side is subsequently brought back online. The CP then allows the write operation to complete.

The penalty for supporting fast resynchronization, as above, is that the first write to the extent following a mirror side state change of either ALIVE to DEAD, or DEAD to RESYNC, causes a fault to the CP with other writes using the FP. Later, when a write is made to an extent after P2 has been declared DEAD or offline, as above, there is a fault to the CP and P1's age lists are updated to reflect the new dirty regions.

Fast resynchronization may be implemented by the CP by comparing age lists when P2 is brought back online. Fast resynchronization involves resynchronizing the mirrors to have the same set of data. The Resynch state of P2 allows P2 to participate in write splitting without being involved in processing read operations until P2 is brought back on-line.

As described herein, an age map may be used in synchronous mirroring as described in connection with, for example, FIGS. 30 and 31. The relative age of extents of various mirror sides may be recorded. If one mirror side is off line and operations are performed to other mirror sides, when the down mirror side is brought back on-line, it is resynchronized with other mirror sides. In one embodiment, this may be performed using the technique described herein which that only the extents that are out of date are copied. This may also be referred to as a fast resynchronization. When a mirror side is offline and the remaining mirrors are updated, a new generation number may be assigned to the age maps. The current generation number is incremented whenever any mirror side changes state. Subsequently, the first write to the remaining mirror sides are intercepted and the age map is updated to indicate that the remaining mirrors have been modified relative to the offline mirror side.

Fast reconciliation involves reconciling shared metadata using the inter-DVE oplocks held by the DVE to extents for which writes may have been outstanding when the DVE failed. As described elsewhere herein, the DVE performing the cleanup of the failed DVE inherits the failed DVE's inter-DVE oplocks and therefore knows which extents are suspects for reconciliation. The inter-DVE oplocks may actually be implemented so as to journal their state sequentially to media, like traditional DRL, while offering significantly more flexibility at failover time. The inter-DVE locking techniques that may be used in an embodiment are described elsewhere herein.

Within an embodiment, each DVE may have its own non-volatile oplock journal. Additionally, a data journal may be maintained for each FP. It should be noted that the per-DVE non-volatile oplock journal and the per-FP data journals are maintained independently of one another. The non-volatile oplock journals may be used in connection with performing recovery operations for a failed DVE. The data journal of an FP may be used for asynchronous ordered replication.

There may be a need to merge FP data journals in embodiments allowing asynchronous I/O operations. In one embodiment, asynchronous I/O operations are recorded in the journal and then to the actual device. Inbound I/Os for each FP may be paused at discrete points in time, such as every minute or other time interval in accordance with system parameters, such as incoming P/O rate, bandwidth, and the like. Existing journals for each FP may then be swapped out and inbound I/Os then resumed. I/O operations subsequent to the resume may be redirected to a new journal. Meanwhile, there is a wait for the existing journal I/O operations to commit to the existing FP journals. These I/O operations as recorded in the existing journals are sent to another site that may be remote for reconstruction by being applied to a copy of the actual data.

It should be noted that during the reconstruction process, the FP journals are merged. As part of this merging process, there may be a determination for a given location whether there are multiple write operations, and which of these is the last write operation in time. The last write operation may then be applied to the given location. This may be performed as an alternative to actually applying all the write operations. An embodiment may include this and other processing as part of the merging process. It should be noted that as described elsewhere herein, if a request being processed by an FP is determined to overlap an LBA range as being performed by another FP, control faults to the CP. Thus, any FP journaled I/O operation is for a non-overlapping LBA range.

Figure 32:
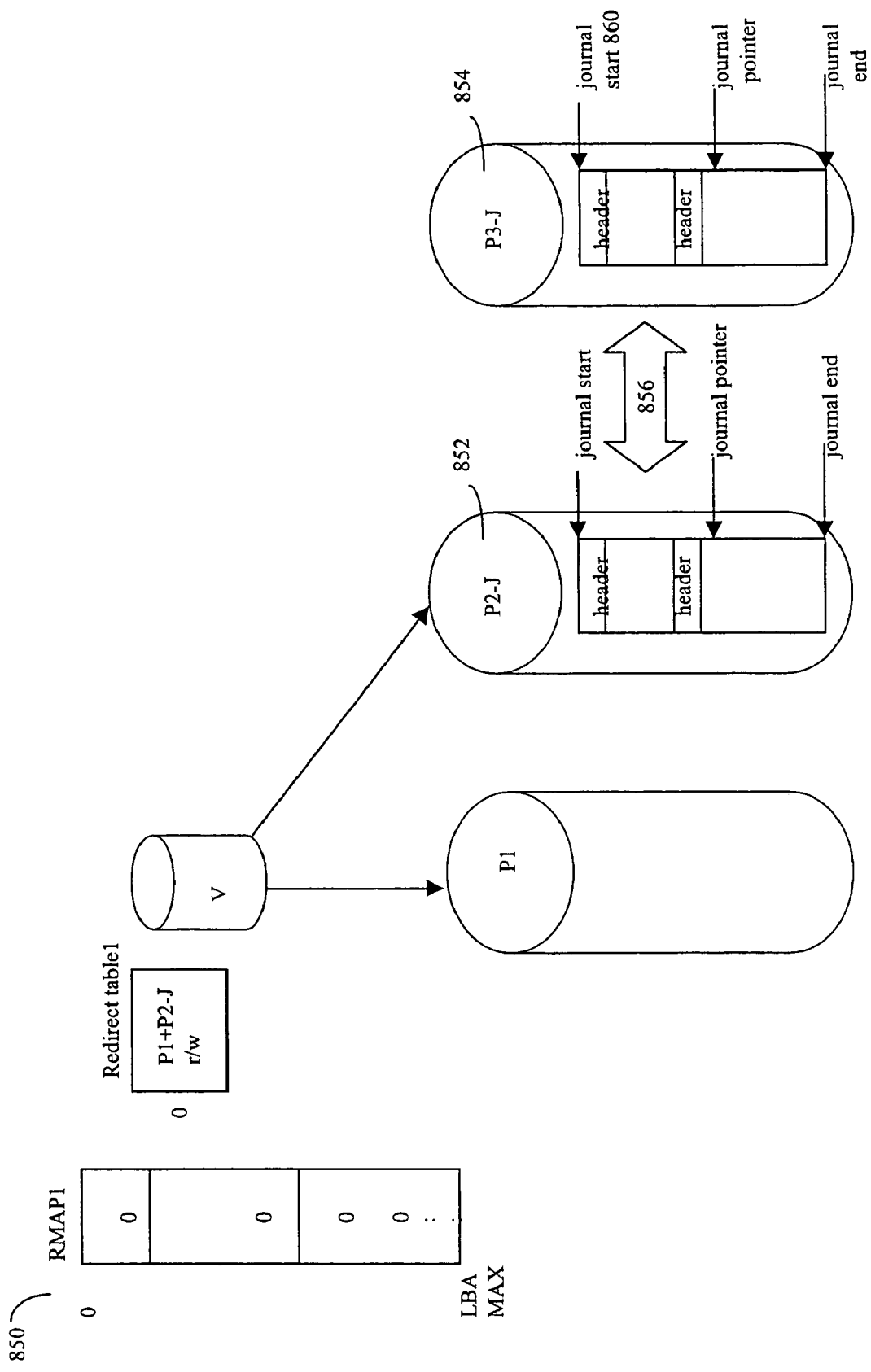
FIG. 32 is an example of an embodiment in connection with performing an asynchronous replication operation.

Referring now to FIG. 32, shown is an example of an embodiment 850 in connection with performing an asynchronous replication operation for FP journalling as described above. In this instance, there are some aspects (such as write serialization at the FP) similar to that previously described in connection with mirroring in that writes to virtual device V are split to two physical devices P1 and P2. Writes to P1 are delivered natively, that is, writes are performed on P1. On P2-J, the location on P2 where the second set of writes are performed, the write entries are journalled to journal entries. Each entry as shown in 852 has a header indicating where the write entry is supposed to go, such as the logical block address. When both the write to P1 and the entry to P2-J are complete, a message that the operation is complete is sent back to the caller. If P2-J reaches the end of the journal, there is a fault to the CP as if writing in a read-only context. The CP then waits for any pending I/Os to the journal to complete, as by checking the downstream pending I/O list, and then swaps in a new journal resetting the journal pointer in the FP to the beginning of the new journal. The new journal may be, for example, at device P3-J 854 and may be swapped in place of P2-J as the journal, as indicated by arrow 856, when the journal 852 is full. The FP journal pointer is then reset at 860 as indicated so the FP can resume journalling. The CP may then send the P2-J journal 852 to an asynchronous copy agent for delivery to a remote site where the data may be reassembled.

The foregoing allows for asynchronous ordered replication of a set of volumes in a distributed system. A database, for example, may be implemented on more than one volume and may involve multiple servers. The foregoing may be used as an alternative, for example, to ordering all I/O operations through a central point that may become a bottleneck in performance. Alternatively, the foregoing techniques may be used to provide synchronization at discrete points in time that may be selected in accordance with parameters that may vary with each embodiment to minimize any negative performance impact.

The foregoing asynchronous mirroring may be implemented using the write splitting and write journaling primitives described elsewhere herein. The FP may synchronously split writes to a private journal using a private index as described in connection with FIG. 33. When the journal fills, control is passed or faulted to the CP which exchanges a new, empty journal for the old journal. The CP may then copy the journal contents to a remote location using an asynchronous copy agent. It should be noted that in one embodiment, data from the journal is not being moved through the CP.

Multiple journals may be synchronized periodically. Multiple journals may occur, for example, with multiple volumes, or multiple FPs or DVEs to the same volume. The multiple journals may be synchronized by revoking mapping entries for all journals and waiting for downstream I/O operations to the journals from the FP to complete. The journals may then be swapped out and copied to a remote location followed by a synchronization barrier. The copy agent on the remote side knows that the remote image set is only valid when a barrier is reached. In one embodiment, journals may be implemented per-DVE or per FP such that no DVEs and FPs communicate with each other to do journalling. Otherwise, there may be performance penalties. Synchronization may be performed at discrete points in time that are predefined as described elsewhere herein.

In the case where a DVE fails, the recovering DVE takes over the data journals of the failed DVE, as well as the non-volatile oplock journals. When a DVE fails, its journals may have incomplete data for I/Os for which a status has not yet been returned to the host. For those I/Os, the state of the actual disk blocks on the data storage device may be characterized as "unknown". The host may issue a retry of the I/O operation. In the case of synchronous mirroring on failover, differences are detected and reconciled between the N sides of the mirror. Similar reconciliation may be performed for journals. The DVE performing cleanup in connection with a failed DVE, through non-volatile oplocks, knows which block ranges the failed DVE may have been modifying and may read the data from the device and write to the journal making the journal complete for those block ranges. Reconciliation for a failed DVE being brought up to date may use the non-volatile oplocks as a form of dirty region logging to detect those portions. In other words, when DVE A is cleaning up after failed DVE B, DVE A may traverse the list of non-volatile oplocks to identify those which DVE B owned when it failed. Accordingly, DVE A may update DVE B's journal for any write operations, for example, that DVE B may have been in the process of completing. All volatile inter-DVE oplocks are released when DVE B goes off-line.

Figure 33:
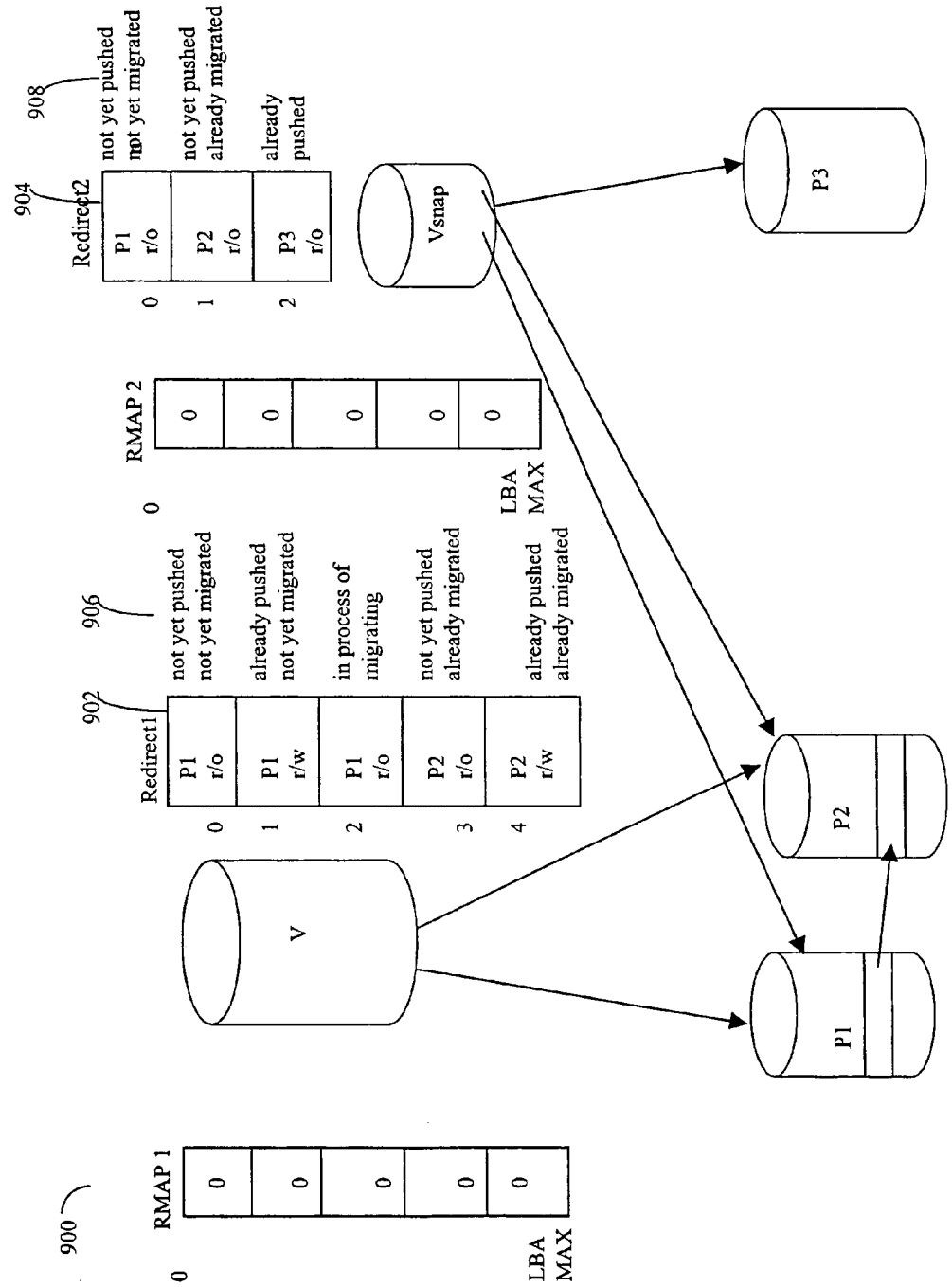
FIG. 33 is an example of an embodiment of a compound example of a snapshot during a migration.

Referring to FIG. 33, shown is an embodiment 900 of a compound example of performing a snapshot during a migration. The example 900 illustrates an initial state of the rmap1 and rmap2 tables. Data is being migrated from P1 to P2 and V snap is also a snapshot of V. The maps are modified in accordance with the state changes as described elsewhere herein in connection with performing the snapshot and migration operations, for example, when there is a write operation to a portion of data in V. The foregoing illustrates that the FP can handle more complex and compound examples such as depicted in FIG. 33. It should be noted that entries 0 and 2 in redirect table 2 may be combined if the CP can handle this compression since these entries are the same in this example.

It should be noted that in the foregoing examples, the Rmap describes the variable length extents included in the VSEG descriptors LBA range. The Rmap shown is also a cache in the FP which is a portion of the potentially larger RMAP included in the CP, which itself may be implemented as a cache of media-based Rmap information. The Volume to VSEG descriptor mapping has been eliminated as if there is only a single Volume Segment per Volume to keep the foregoing examples simple. Additionally, the foregoing examples treat each physical volume (P) as if fully consumed without having some offset into the device as the base address. However, these examples are in a system that uses the three-level caching of variable length extents described herein.

In connection with the foregoing for both volatile and non-volatile oplocks, an acquiring DVE obtains all necessary locks, purges its local cache and all copies of the data cached elsewhere, such as by other DVEs, updates the global copy of the associated data, if any, and issues a broadcast to signal to other nodes that the lock is now available and that a new global copy of the associated metadata is also available. If there is no such broadcast sent to interested nodes (sharing list nodes), such as when an acquiring node has failed, other nodes may have individual timers. These timers may be used by each node as a default signaling mechanism to attempt to acquire locks.

What will be described in following paragraphs is an embodiment of an Rmap data structure. The Rmap data structure is shown elsewhere herein, for example, in FIG. 9 as element 242.

Figure 34:
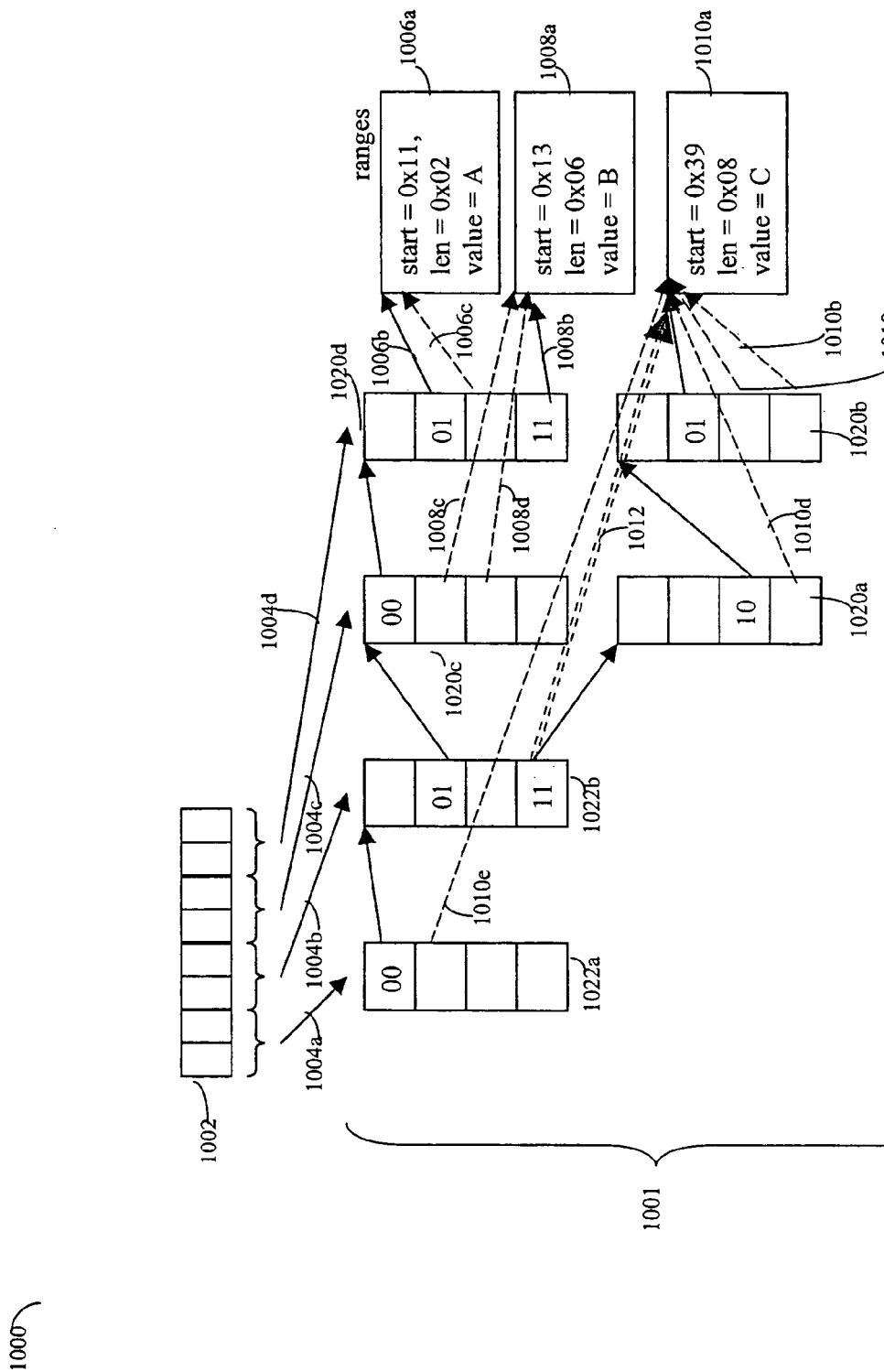
FIG. 34 is an example of an embodiment of a data structure for the rmap table.

Referring now to FIG. 34, shown is an illustration 1000 that includes an embodiment of an rmap data structure 1001 and a key value 1002. The key value 1002 may be a value, such as an LBA. The rmap data structure 1001 in this example may be implemented as a multi-level page table structure in which successive portions of the key 1002 are used as indices into a series of cascaded arrays. The arrays at a first level point to other arrays at a next level until a leaf is reached. As known to those of ordinary skill in the art, this may be referred to as a trie data structure. In this example, for a given key value 1002, a look up in the rmap data structure 1001 may be performed to determine a particular defined range, if any, into which the key value falls.

For an rmap table 1001, one or more ranges of values may be defined, such as 1006a, in which a starting value, length and associated value are specified. In this example, each range may correspond to an LBA range of each extent, for example, as in the rmap 242 described previously in connection with FIG. 9. The value, such as "A" in 1006a, may correspond to the index into the storage redirect table, as also described elsewhere herein. These ranges are the leaf nodes of the trie. Bits of a key value 1002 are used in traversing a path of connected arrays at each level. In this example, the key includes 8 bits having a degree of $\log_2 (8)=3$. This particular key value 1002 as described herein is a small key value for purposes of illustrations. Embodiments may use other key values including a varying number of bits, such as 16 or 256.

In this example, 2 bits of the key value 1002 are used to map and determine which next array, if any, to follow in determining whether, for a given key value, there is defined range and obtaining associated information regarding that range, such as the value A of 1006a which may correspond to the index into the storage redirect table for a given LBA address. The rmap 1001 includes arrows with solid lines defined when traversing the arrays with a starting value of one of the ranges. Additionally, the rmap 1001 includes single dashed line arrows defined providing paths to the range leaf nodes, such as 1006a, for values of each range other than the starting value. For example, if a key value is 0x11 having the binary representation "0001 0001", the first two bits of the key value "00" are used to select the corresponding element of 1022a which points to 1022b. The next two bits of the key value "01" of 1022b point to 1020c. The next two bits of the key value "00" point to array 1020d. The final two bits of the key value "01" point to the leaf range 1006a via the solid arrow 1006b. For a key value is 0x12, the final two bits of the key value "10" lead to 1006a via final connector 1006c. For a key value of 0x10, there is no arrow from the first array element of 1020d corresponding to the two bit key value "00". Accordingly, a determination is made that there is no defined range that includes the key value 0x10.

If a given two-bit of the key value at a current level may only be associated with one leaf node range, intervening arrays between the current level array and the leaf node may be omitted and a direct connection may be made to the leaf. For example, for a key of 0x14 having a binary representation of "0001 1000", arrow 1008d provides a direct connection to the corresponding leaf range node 1008a. A lookup is then performed to determine if the key value is indeed included in the range of 1008a since more than one key value may be possible depending on the current level and not all key values may actually be included in the range of leaf node 1008a.

This trie may also be further compressed and collapsed in that arrays 1020a and 1020b and all pointers included therein may be omitted and replaced with double dashed arrow 1012. All valid key values with the first four bits of "0011" fall within the range of leaf node 1010a. All valid key values with the first two bits "01" may also be mapped directly to 1010a. A determination is then made as to whether the key is actually in the range by obtaining information from the leaf node and determining if the key is within the range "start value+length−1". As just described, the rmap 1001 may be referred to as a compressed trie in which arrays at intervening levels may be removed as a space optimization also providing a time saving optimization when performing a look-up.

The foregoing description uses a technique in which "legs" of the trie may be pruned if the leg has only a single hit by collapsing the leg up to the parent pointer.

Other data structures may be used in an embodiment to represent the rmap and other embodiments may also optionally include other space and time saving optimizations.

It should be noted that portions of the foregoing embodiment may be implemented using the C programming language or other language that may vary in accordance with each embodiment. In one embodiment, the C language fault handler performs the updating of the global metadata and pushing snapshot data, for example in connection with performing a write using a snapshot device described elsewhere herein.

Described herein are a "fast path" (FP) and a "control path" (CP) for data processing, with an interface between them. The FP in an embodiment may implement one or more "primitive" operations. The primitive operations, used as building blocks, may be used together to perform more complex operations. The CP, for example, utilizing an FP interface, may issue instructions to the FP to perform a set of the primitives in a carefully orchestrated way, so as to perform higher level data operations, such as snapshots, migrations, replications, and other operations. The CP can do the foregoing such that multiple FPs and CPs can provide access to the same data concurrently and redundantly.

In the foregoing coordination controlled by the CP, the FP does not have specific knowledge as to what particular more complex data operation may be performed. Rather, the CP has knowledge of the how the individual primitive operations piece together to complete the more complex data operation. The CP invokes the one or more FPs to perform the various primitive operations as may be defined in accordance with the FP API as described elsewhere herein.

Other embodiments may perform I/O operations using a volume manager rather than using the CP and FP techniques as described herein. In a traditional volume manager, there may be independent modules used to perform different complex operations, such as snapshot, migration, mirroring, striping, and the like. Each of the foregoing modules may perform independent virtual to physical LBA translations. Each of these independent modules may be called in a predetermined sequence in connection with performing any I/O operation. Each module may accordingly perform the relevant processing in connection with the current I/O operation.

However, this may be inefficient in that a predetermined generic path or series of routines may be invoked for all I/O operations incurring much overhead in processing I/O operations. In other words, all I/O operations are performed by executing a same set of routines associated with the same software call stack. Additionally, coordination and synchronization is performed at a local level of each of the modules.

In the foregoing FP and CP technique, the CP determines what particular I/O primitives and computations from virtual to physical LBA translates are necessary to complete a particular I/O operation. These I/O primitives may be implemented in hardware and/or software. Consider, for example, the following. An incoming I/O operation may be initially routed to the FP which faults to the CP because it is too complex in accordance with one or more conditions described elsewhere herein. In connection with the I/O operation, the CP then determines that the following translations from virtual LBAs to physical LBAs are needed to complete the incoming I/O operation:

| Virtual address: | Physical Address: |
|---|---|
| v1-v100 | -> p201-p300 |
| v101-v300 | -> p501-p700 |
| v301-v400 | -> p301-p400 |
| v401-v500 | -> FAULT |
| v501-v600 | -> p401-p500 |

The CP determines the foregoing translations and associated states of the LBA Rmap table entries prior to invoking any FPs for processing. Since the CP has knowledge about what other processes or threads may be accessing a particular LBA range, device, etc., the CP may coordinate activities to be performed by the FPs in connection with completing this I/O operation as well as other ongoing activities. In this instance, the CP may determine that the foregoing virtual address LBA ranges may be accessed and used in connection with performing this current I/O operation. The CP may then invoke and authorize multiple FPs to perform, in parallel, the translations and associated I/O operation for the above virtual addresses, except v401-v500. As indicated by the "fault" above, the CP may need to perform an action, such as load a table entry, prior to authorizing an FP to perform an operation in connection with virtual addresses v401-v500.

The use of the foregoing CP and FP may be characterized as different from the architecture associated with a volume manager which sends every I/O operation through a central code path. In contrast, the CP and FP embodiment separates the I/O operations into those that may be performed by the FP and those that may not. In general, most I/O operations may be processed in a streamlined fashion as described herein by the FP. The foregoing provides a scaleable technique for use with I/O operations.

The relationship between the CP and one or more associated FPs may be characterized as a master-slave relationship. The CP is the master that coordinates and controls the one or more FPs to perform tasks. The CP's responsibilities include coordination of FP processing to perform an I/O operation. Additionally, the CP may be deemed a taskmaster and coordinator in connection with other operations that need to be performed in a system, such as migration. The CP enlists the assistance of the one or more FPs also in performing the migration, for example. The CP coordinates and balances the performance of other tasks, such as migration, and incoming I/O operations.

When the CP instructs an FP to perform an operation, such as perform a mapping primitive operations, the CP grants authority to the FP to perform the operation. The FP as described herein also has its own local cache that may include data used by the FP in performing the operation. The FP continues to operate using the current data in its local FP cache independent of other FP caches and the CP cache until the CP revokes the authority of the FP, for example, by invalidating the contents of the FPs local cache. The FP may then continue to complete its current I/O operation but not begin any new I/O operations. The FP may subsequently acknowledge the invalidation message by sending an acknowledgement to the CP. The CP then takes appropriate subsequent action. For example, the CP may wait for pending I/Os to drain from the FP and CP's pending I/O lists if there is a restrictive update being performed. In connection with the foregoing, the FP does not synchronize its cache with any other FP cache providing each of the FPs with the independence needed to make the CP and FP techniques described herein scalable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system for processing a data operation comprising:
   determining if said data operation has at least one predetermined criteria characterizing said data operation as being a commonly performed non-complex data operation using a primitive operation; and
   routing said data operation to a fast path for processing if said data operation has said at least one predetermined criteria, and routing said data operation to a general control path for processing otherwise.

2. The method of claim 1, wherein said predetermined criteria is one of: said data operation is within a single logical volume, said data operation involves data from within virtual address boundaries of a single mapping table entry, said data operation is a read operation, and said data operation is a write operation.

3. The method of claim 1, wherein said predetermined criteria is one of: said data operation is indicated as allowable in accordance with information included in a mapping table used in mapping virtual to physical locations for said data operation, and said data operation does not cause a serialization conflict in connection with a mirrored device.

4. The method of claim 1, further comprising:
   routing said data operation to said general control path by causing a fault if said data operation does not have said at least one predetermined criteria.

5. The method of claim 1, further comprising:
   routing said data operation to said general control path in accordance with information included in a mapping table associated with a virtual address to physical address translation of an address of said data operation.

6. The method of claim 5, further comprising:
   determining a volume segment descriptor associated with said data operation, said volume segment descriptor including said mapping table.

7. The method of claim 1, wherein said data operation is issued by said fast path if said data operation has said at least one predetermined criteria and is otherwise issued by said general control path.

8. The method of claim 1, wherein said data operation is an upstream data operation from a host and the method further comprising:
   producing at least one downstream data operation to a physical device associated with said data operation corresponding to said upstream data operation; and
   creating an element on a pending data operation list corresponding to said data operation.

9. The method of claim 1, further comprising:
   routing return data operation data using said fast path to a host that issued said data operation if there is no error, and otherwise routing return data operation data using said general control path to a host that issued said data operation.

10. A computer program product tangibly embodied a computer-readable medium, for processing a data operation, the computer program product including instructions being operable to cause data processing apparatus to:
    determine if said data operation has at least one predetermined criteria characterizing said data operation as being a commonly performed non-complex data operation using a primitive operation; and
    route said data operation to a fast path for processing if said data operation has said at least one predetermined criteria, and routing said data operation to a general control path for processing otherwise.

11. The computer program product of claim 10, wherein said predetermined criteria is one of: said data operation is within a single logical volume, said data operation involves data from within virtual address boundaries of a single mapping table entry, said data operation is a read operation, and said data operation is a write operation.

12. The computer program product of claim 10, wherein said predetermined criteria is one of: said data operation is indicated as allowable in accordance with information included in a mapping table used in mapping virtual to physical locations for said data operation, and said data operation does not cause a serialization conflict in connection with a mirrored device.

13. The computer program product of claim 12, further operable to cause the data processing apparatus to:
    determine a volume segment descriptor associated with said data operation, said volume segment descriptor including said mapping table.

14. The computer program product of claim 10, further operable to cause the data processing apparatus to:
    route said data operation to said general control path by causing a fault if said data operation does not have said at least one predetermined criteria.

15. The computer program product of claim 10, further operable to cause the data processing apparatus to:
    route said data operation to said general control path in accordance with information included in a mapping table associated with a virtual address to physical address translation of an address of said data operation.

16. The computer program product of claim 10, wherein said data operation is issued by said fast path if said data operation has said at least one predetermined criteria and is otherwise issued by said general control path.

17. The computer program product of claim 10, wherein said data operation is an upstream data operation from a host and the computer program product further operable to cause the data processing apparatus to:
    produce at least one downstream data operation to a physical device associated with said data operation corresponding to said upstream data operation; and
    create an element on a pending data operation list corresponding to said data operation.

18. The computer program product of claim 10, further operable to cause the data processing apparatus to:
    route return data operation data using said fast path to a host that issued said data operation if there is no error, and otherwise route return data operation data using said general control path to a host that issued said data operation.

* * * * *

UNITED STATES PATENT AND TRADEMARK OFFICE
CERTIFICATE OF CORRECTION

PATENT NO. : 7,280,536 B2
APPLICATION NO. : 11/522260
DATED : October 9, 2007
INVENTOR(S) : Testardi It is certified that error appears in the above-identified patent and that said Letters Patent is hereby corrected as shown below:

In claim 10, column 66, line 1, add --in-- after "embodied"

Signed and Sealed this

Eighteenth Day of March, 2008

JON W. DUDAS
*Director of the United States Patent and Trademark Office*